(12) United States Patent
Komatsu et al.

(10) Patent No.: US 12,337,475 B2
(45) Date of Patent: Jun. 24, 2025

(54) REPAIR WELDING SYSTEM

(71) Applicant: Panasonic Intellectual Property Management Co., Ltd., Osaka (JP)

(72) Inventors: Takamichi Komatsu, Osaka (JP); Toshinari Mohri, Osaka (JP); Kazuki Hanada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 844 days.

(21) Appl. No.: 17/548,862

(22) Filed: Dec. 13, 2021

(65) Prior Publication Data

US 2022/0097225 A1 Mar. 31, 2022

Related U.S. Application Data

(63) Continuation of application No. PCT/JP2020/023284, filed on Jun. 12, 2020.

(30) Foreign Application Priority Data

| Jun. 14, 2019 | (JP) | 2019-111616 |
| Jun. 14, 2019 | (JP) | 2019-111617 |
| Jun. 14, 2019 | (JP) | 2019-111618 |

(51) Int. Cl.
*B25J 9/10* (2006.01)
*B23K 9/095* (2006.01)
(Continued)

(52) U.S. Cl.
CPC ............. *B25J 9/10* (2013.01); *B23K 9/095* (2013.01); *B23K 9/10* (2013.01); *B23K 31/00* (2013.01); *G05B 19/4093* (2013.01)

(58) Field of Classification Search
CPC . B25J 9/10; B25J 9/1682; B25J 9/0084; B25J 9/1664; B23K 9/095; B23K 9/10;
(Continued)

(56) References Cited

U.S. PATENT DOCUMENTS

| 4,712,722 A | 12/1987 | Hood et al. |
| 6,153,848 A | 11/2000 | Nagae et al. |

(Continued)

FOREIGN PATENT DOCUMENTS

| JP | 06-278063 | 10/1994 |
| JP | 2000-167686 | 6/2000 |

(Continued)

OTHER PUBLICATIONS

Communication pursuant to Article 94(3) EPC issued Nov. 3, 2023 in corresponding European Patent Application No. 20821607.7.
(Continued)

*Primary Examiner* — Robert G Bachner
(74) *Attorney, Agent, or Firm* — Wenderoth, Lind & Ponack, L.L.P.

(57) ABSTRACT

The repair welding system includes an inspection device and a welding device. The inspection device determines whether there is a defective portion in a welded portion. In a case that there is the defective portion in the welded portion, the inspection device extracts at least defect type information of the defective portion and inspection coordinate system defective portion position information, converts the inspection coordinate system defective portion position information into position information corresponding to a coordinate system of the welding robot and generates welding coordinate system defective portion position information, and transmits the defect type information and the welding coordinate system defective portion position information to the welding device. The welding device instructs execution of a (Continued)

repair welding on the defective portion based on the defect type information and the welding coordinate system defective portion position information.

18 Claims, 30 Drawing Sheets

(51) Int. Cl.
  *B23K 9/10* (2006.01)
  *B23K 31/00* (2006.01)
  *G05B 19/4093* (2006.01)
(58) Field of Classification Search
  CPC .... B23K 31/00; B23K 9/0956; B23K 9/1274; B23K 9/16; B23K 9/0953; B23K 31/125; G05B 19/4093; G05B 2219/45066; G05B 2219/45104; G05B 19/41875
  See application file for complete search history.

(56) References Cited

U.S. PATENT DOCUMENTS

| | | | |
|---|---|---|---|
| 6,330,493 | B1 | 12/2001 | Takahashi et al. |
| 6,949,005 | B1 * | 9/2005 | Larsen .................... B24B 5/047 451/259 |
| 2006/0213888 | A1 | 9/2006 | Suzuki et al. |
| 2009/0292541 | A1 * | 11/2009 | Daya ..................... G10L 15/063 704/E15.005 |
| 2012/0045854 | A1 * | 2/2012 | Matsuoka ............ G11C 29/006 716/52 |
| 2016/0023355 | A1 | 1/2016 | Komatsu et al. |

FOREIGN PATENT DOCUMENTS

| | | |
|---|---|---|
| JP | 2001-150372 | 6/2001 |
| JP | 2005-262369 | 9/2005 |
| JP | 2006-247663 | 9/2006 |
| JP | 2012-037487 | 2/2012 |
| JP | 2013-226602 | 11/2013 |
| WO | 2018/215047 | 11/2018 |

OTHER PUBLICATIONS

Extended European Search Report issued Jul. 11, 2022 in corresponding European Patent Application No. 20821607.7.
International Search Report issued Aug. 11, 2020 in International (PCT) Application No. PCT/JP2020/023284.

\* cited by examiner

REPAIR WELDING SYSTEM

CROSS-REFERENCE TO RELATED APPLICATIONS

This is a continuation of International Application No. PCT/JP2020/023284 filed on Jun. 12, 2020, and claims priority from Japanese Patent Application No. 2019-111616 filed on Jun. 14, 2019, Japanese Patent Application No. 2019-111617 filed on Jun. 14, 2019, and Japanese Patent Application No. 2019-111618 filed on Jun. 14, 2019, the entire contents of which are incorporated herein by reference.

TECHNICAL FIELD

The present disclosure relates to a repair welding system.

BACKGROUND ART

JP-A-2012-37487 discloses a shape inspection device that inspects a shape of an object to be inspected using an imaging optical system. The shape inspection device includes a projection unit configured to project slit light onto the object to be inspected, an imaging unit configured to image shape lines sequentially formed on the object to be inspected by scanning the object to be inspected with the slit light, a point cloud data acquisition unit configured to acquire a three-dimensional shape of the object to be inspected as point cloud data based on imaging data of the shape lines, a cutting setting unit configured to set a cutting line different from the shape lines formed by scanning the object to be inspected with the slit light on the object to be inspected that is displayed based on the point cloud data in response to an input, and a cross-sectional shape calculation unit configured to calculate a cross-sectional shape of the object to be inspected at the cutting line based on the point cloud data corresponding to the cutting line.

JP-A-2001-150372 discloses a synchronous or cooperative operation control device for a plurality of robots. A plurality of robot mechanism units are controlled by respective robot control devices, and the robot control devices are connected to one another via a communication path. The robot mechanism units operate in synchronization with or in cooperation with one another to execute desired work. In the synchronous or cooperative operation control device for a plurality of robots, at least one of the robot control devices that are connected to one another via the communication path is set as a master robot control device, and a part of the other robot control devices that are connected via the communication path is set as a slave robot control device. Data related to a position of a robot is transmitted from the master robot control device to the slave robot control device via the communication path corresponding to a teaching point or an interpolation point of a master robot program, and the slave robot control device uses the data to operate a robot mechanism unit controlled by the slave robot control device in synchronization with or in cooperation with a robot mechanism unit controlled by the master robot control device.

SUMMARY OF INVENTION

An object of the present disclosure is to provide a repair welding system that can execute an inspection and a repair welding by different robots and a welding device can execute a repair welding without using position information in an inspection robot coordinate system.

According to the present disclosure, there is provided a repair welding system. The repair welding system includes an inspection device configured to be connected to an inspection robot and configured to inspect a welded portion of a workpiece, and a welding device configured to be connected to a welding robot and configured to instruct execution of a repair welding on the workpiece based on an inspection result of the inspection device. The inspection device determines whether there is a defective portion that does not satisfy a determination standard in the welded portion. In a case that there is the defective portion in the welded portion, the inspection device extracts at least defect type information of the defective portion and inspection coordinate system defective portion position information that is position information of the defective portion based on a coordinate system of the inspection robot, converts at least the inspection coordinate system defective portion position information into position information corresponding to a coordinate system of the welding robot and generates welding coordinate system defective portion position information, and transmits at least the defect type information and the welding coordinate system defective portion position information to the welding device connected to the welding robot. The welding device instructs execution of a repair welding on the defective portion based on at least the defect type information and the welding coordinate system defective portion position information.

According to the present disclosure, there is provided a repair welding system. The repair welding system includes an inspection device configured to be connected to an inspection robot and configured to inspect welded portions of a workpiece, and a welding device configured to be connected to a welding robot and configured to instruct execution of a repair welding on the workpiece based on an inspection result of the inspection device. The inspection device determines whether there is a defective portion that does not satisfy a determination standard in the welded portion. In a case that there is the defective portion in the welded portion, the inspection device transmits at least defect type information of the defective portion and inspection coordinate system defective portion position information that is position information of the defective portion based on a coordinate system of the inspection robot to the welding device. The welding device converts at least the inspection coordinate system defective portion position information into position information corresponding to a coordinate system of the welding robot and generates welding coordinate system defective portion position information, and instructs execution of a repair welding on the defective portion based on at least the defect type information and the welding coordinate system defective portion position information.

According to the present disclosure, there is provided a repair welding system. The repair welding system includes an inspection device configured to be connected to an inspection robot and configured to inspect a welded portion of a workpiece, a welding device configured to be connected to a welding robot and configured to instruct execution of a repair welding on the workpiece based on an inspection result of the inspection device, and an integrated control device configured to be connected to the inspection device and the welding device, configured to acquire an inspection result of the inspection device, and configured to notify the welding device of the inspection result. The inspection device determines whether there is a defective portion that does not satisfy a determination standard in the welded portions. In a case that there is a defective portion in the welded portions, the inspection device transmits at least defect type information of the defective portion and inspection coordinate system defective portion position information that is position information of the defective portion based on a coordinate system of the inspection robot to the welding device. The integrated control device converts at least the inspection coordinate system defective portion position information into position information corresponding to a coordinate system of the welding robot and generates welding coordinate system defective portion position information, and transmits at least the defect type information and the welding coordinate system defective portion position information to the welding device. The welding device instructs execution of a repair welding on the defective portion based on at least the defect type information and the welding coordinate system defective portion position information.

According to the present disclosure, an inspection and a repair welding can be executed by different robots, and a welding device can execute a repair welding without using position information in an inspection robot coordinate system.

Figure 1:
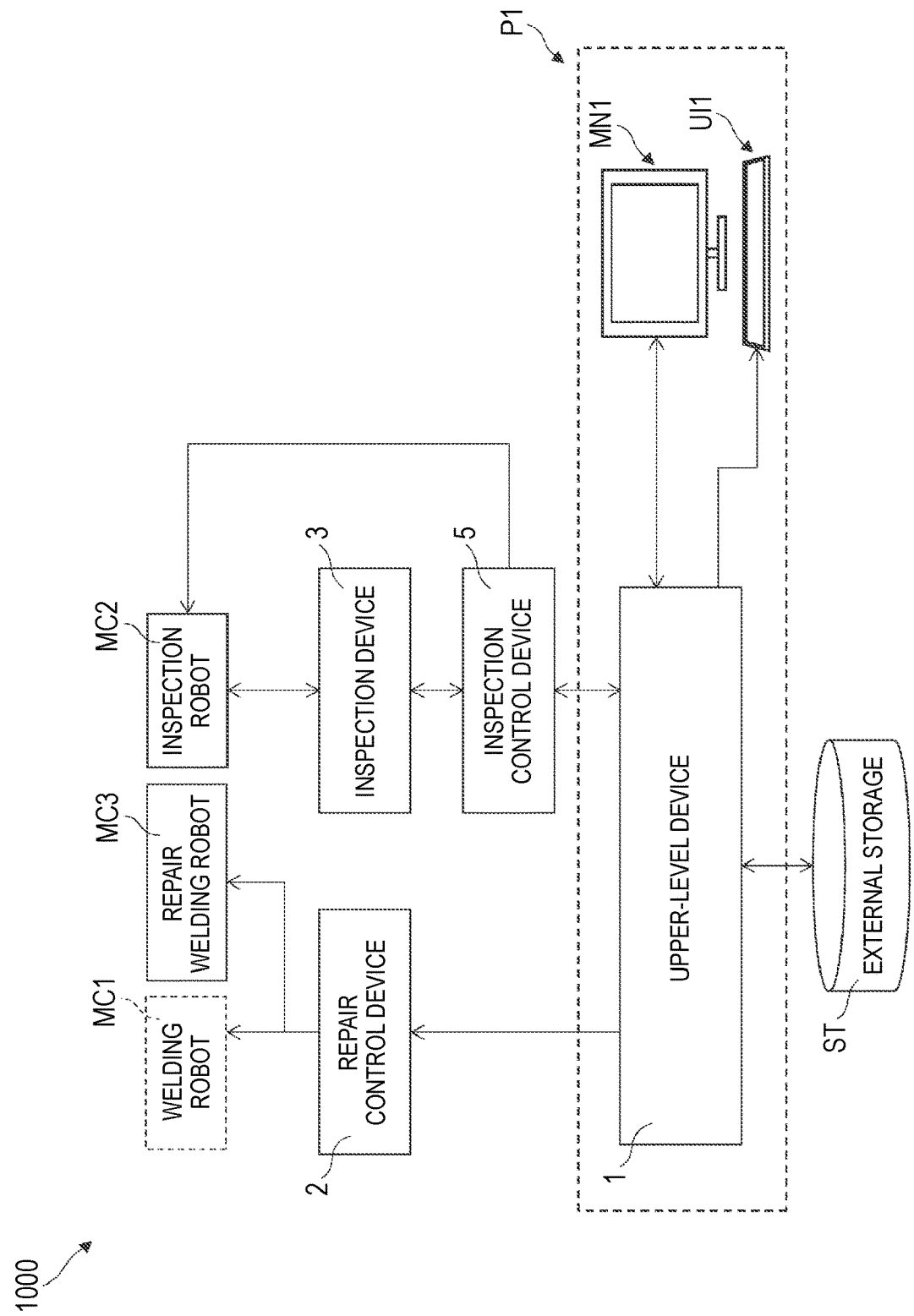
FIG. 1 is a schematic diagram showing an example of a use case of a welding system according to a first embodiment.

DESCRIPTION OF EMBODIMENTS (Background Leading to Contents of First Embodiment)

JP-A-2012-37487 discloses a shape inspection device that inspects a shape of an object to be inspected (welded portions) by using an imaging optical system. The shape inspection device images shape lines formed by projecting slit light onto the object to be inspected (welded portions), acquires a three-dimensional shape of the object to be inspected (the welded portions) as point cloud data based on imaging data of the shape lines, sets a cutting line different from the shape lines in response to an input, and calculates a cross-sectional shape of the object to be inspected (the welded portions) on the cutting line. Accordingly, the shape inspection device can inspect the cross-sectional shape in a cross-sectional line. On the other hand, such an inspection on the object to be inspected (the welded portions) has been required to be executed automatically in recent years. However, in the shape inspection device according to JP-A-2012-37487 a user needs to inspect a cross-sectional shape by inputting a cross-sectional line into the point cloud data of the object to be inspected (the welded portions). Therefore, the inspection cannot be executed automatically.

JP-A-2001-150372 discloses a synchronous or cooperative operation control device for a plurality of robots. A plurality of robot control devices that controls a plurality of robot mechanism units are connected to one another via a communication path, and the plurality of robot mechanism units operate in synchronization with or in cooperation with one another. The synchronous or cooperative operation control device for a plurality of robots sets at least one of the plurality of robot control devices as a master robot control device and sets a part of the other robot control devices as a slave robot control device. Data related to a position of a robot is transmitted from the master robot control device to the slave robot control device corresponding to a teaching point or an interpolation point of a master robot program. Accordingly, the synchronous or cooperative operation control device for a plurality of robots can operate a robot mechanism unit controlled by the slave robot control device in synchronization with or in cooperation with a robot mechanism unit controlled by the master robot control device.

On the other hand, when processings from executing an inspection to executing a repair welding are automatically executed in a welding system, an inspection robot configured to execute an inspection and a repair welding robot configured to execute a repair welding may be different from each other. In such a case, when the repair welding robot detects an abnormal portion (for example, a portion that is determined not satisfying a predetermined quality level at the time of executing an inspection) of an object to be inspected (welded portions) received from an inspection device that controls the inspection robot and a position of the abnormal portion does not match a position in a coordinate system set in the repair welding robot, a repair-welded portion may be deviated.

An example of a repair welding system will be described in the following embodiments, in which an inspection and a repair welding are executed by different robots and a welding device can execute a repair welding without using position information in the inspection coordinate system.

Hereinafter, embodiments specifically disclosing a configuration and an operation of a repair welding system according to the present disclosure will be described in detail with reference to the drawings as appropriate. Unnecessarily detailed description may be omitted. For example, detailed description of a well-known matter or repeated description of substantially the same configuration may be omitted. This is to avoid unnecessary redundancy of the following description and to facilitate understanding of those skilled in the art. Note that the accompanying drawings and the following description are provided for a thorough understanding of the present disclosure by those skilled in the art, and are not intended to limit the subject matter recited in the claims.

First Embodiment

FIG. 1 is a schematic diagram showing an example of a use case of a welding system 1000 according to a first embodiment. The welding system 1000 according to the first embodiment is a system that executes an inspection on welded portions of the workpiece Wk1 and executes a correction welding (hereinafter, referred to as a repair welding) on a defective portion determined to be defective among the welded portions, based on information input by a user or a preset welding. The number of welded portions and defective portions to be described below may be one or more.

The welding system 1000 serving as an example of a repair welding system includes a monitor MN1, an interface UI1, an upper-level device 1, an external storage ST, a repair control device 2, an inspection device 3, an inspection control device 5, a welding robot MC1, an inspection robot MC2, and a repair welding robot MC3. Although the welding robot MC1 shown in FIG. 1 is shown as a robot separate from the repair welding robot MC3, the welding robot MC1 is not an essential component and may be omitted when the welding system 1000 according to the first embodiment executes an inspection and a repair welding on a workpiece Wk1 that was welded.

Further, the welding robot MC1 may be integrated with the repair welding robot MC3 or the inspection robot MC2. For example, the repair welding robot MC3 may execute a welding for welding the workpiece Wk1 and a repair welding for correcting a defective portion among welded portions welded by the welding by using the same robot. For example, the repair welding robot MC3 may execute a welding for welding the workpiece Wk1 and an inspection of determining whether there is a defective portion among welded portions welded by the welding by using the same robot.

In the welding system 1000 shown in FIG. 1, the number of each of the welding robots MC1, the inspection robots MC2, and the repair welding robots MC3 is not limited to the number shown in FIG. 1. For example, the number of each of the welding robot MC1, the inspection robot MC2, and the repair welding robot MC3 may be plural and may not be the same. For example, the welding system 1000 may include one welding robot MC1, three inspection robots MC2, and two repair welding robots MC3. Accordingly, the welding system 1000 can be configured adaptively according to a processing range, a processing speed, or the like of each robot as necessary.

The upper-level device 1 serving as an example of an integrated control device is communicably connected to the monitor MN1, the interface UI1, the external storage ST, the repair control device 2, and the inspection control device 5. Although the upper-level device 1 shown in FIG. 1 is connected to the inspection device 3 via the inspection control device 5, the upper-level device 1 may be directly connected to the inspection device 3 in a communicable manner without passing through the inspection control device 5.

The upper-level device 1 may be a terminal device P1 that includes the monitor MN1 and the interface UI1 in an integrated manner, or may further integrally includes the external storage ST. In this case, the terminal device P1 is, for example, a personal computer (PC) used by a user (an operator) to execute a welding. The terminal device P1 is not limited to the PC described above, and may be a computer having a communication function, such as a smartphone, a tablet terminal, and a personal digital assistant (PDA).

The upper-level device 1 generates a control signal for executing a welding on the workpiece Wk1, an inspection on a welded portion, and a repair welding on a defective portion based on an input operation of a user (an operator) or welding conditions preset by the user (operator). The upper-level device 1 transmits, to the repair control device 2, the generated control signal for executing a welding on the workpiece Wk1 and the generated control signal for executing a repair welding on a defective portion. The upper-level device 1 transmits a control signal for executing an inspection on a welded portion welded by the welding to the inspection control device 5.

The upper-level device 1 collects an inspection result of the welded portion received from the inspection device 3 via the inspection control device 5. The upper-level device 1 transmits the received inspection result to the external storage ST and the monitor MN1. Although the inspection device 3 shown in FIG. 1 is connected to the upper-level device 1 via the inspection control device 5, the inspection device 3 may be directly connected to the upper-level device 1 in a communicable manner.

The monitor MN1 is configured with, for example, a display such as a liquid crystal display (LCD) or an organic electroluminescence (EL). The monitor MN1 displays an alert and the inspection result of the welded portion received from the inspection device 3. The monitor MN1 may be configured with, for example, a speaker (not shown), and may notify a user of an alert by voice when an alert is received.

The interface UI1 is a user interface (UI) that detects an input operation of a user (operator), and is configured with a mouse, a keyboard, a touch panel, or the like. The interface UI1 transmits an input operation based on an input operation of the user to the upper-level device 1. The interface UI1 receives, for example, an input of a welding line, setting of an inspection condition for each welding line, an operation of starting or ending an operation of the welding system 1000, and the like.

The external storage ST is configured with, for example, a hard disk drive (HDD) or a solid state drive (SSD). The external storage ST stores the inspection result of the welded portion received from the upper-level device 1.

The repair control device 2 serving as an example of a welding device is communicably connected to the upper-level device 1, the welding robot MC1, and the repair welding robot MC3. The repair control device 2 receives control information that is related to the welding and is received from the upper-level device 1, and controls the welding robot MC1 based on the received control information to execute the welding on the workpiece Wk1.

The repair control device 2 receives control information that corresponds to a repair welding condition and is received from the upper-level device 1, and controls the repair welding robot MC3 based on the received control information to execute the repair welding on the defective portion that was determined to be defective by the inspection device 3 among the welded portions.

The repair control device 2 shown in FIG. 1 controls the welding robot MC1 and the repair welding robot MC3. The welding system 1000 according to the first embodiment is not limited thereto, and for example, the welding robot MC1 and the repair welding robot MC3 may be controlled using different control devices. Further, in the welding system 1000 according to the first embodiment, the welding robot MC1, the inspection robot MC2, and the repair welding robot MC3 may be controlled by a single control device.

The inspection control device 5 is communicably connected to the upper-level device 1, the inspection device 3, and the inspection robot MC2. The inspection control device 5 receives a welding condition (for example, position information of a welded portion) for each welded portion received from the upper-level device 1. The welded portion includes a welded portion (that is, a portion welded by a welding) on the workpiece Wk1 and a welded portion corrected and welded by a repair welding. The inspection control device 5 controls the inspection robot MC2 based on the received welding condition for each welded portion to detect a shape of a weld bead in the welded portion. The inspection control device 5 transmits the received information about the welded portion to the inspection device 3 that inspects a shape of the welded portion. The inspection control device 5 transmits an inspection result received from the inspection device 3 to the upper-level device 1.

The inspection device 3 is communicably connected to the inspection control device 5 and the inspection robot MC2. The inspection device 3 inspects (determines) whether there is a defective portion in the welded portion based on the information about the welded portion received from the inspection control device 5 and shape data of the weld bead of the welded portion acquired by the shape detection unit 500. The inspection device 3 transmits information (for example, a defective section, position information of the defective section, a defect factor serving as an example of a defect type, and the like) about the defective portion determined to be defective among the welded portions to the inspection control device 5 as an inspection result. The inspection device 3 may be directly connected to the upper-level device 1 in a communicable manner. In this case, the inspection device 3 may be able to transmit the inspection result to the upper-level device 1 without passing through the inspection control device 5.

The welding robot MC1 is a robot that is communicably connected to the repair control device 2 and executes a welding on a workpiece that has not been subjected to a welding processing. The welding robot MC1 executes a welding on the workpiece Wk1 based on a control signal received from the repair control device 2.

The inspection robot MC2 is communicably connected to the inspection control device 5 and the inspection device 3. The inspection robot MC2 acquires the shape data of the weld bead of the welded portion based on the control signal received from the inspection control device 5.

The repair welding robot MC3 serving as an example of a welding robot is communicably connected to the repair control device 2. The repair welding robot MC3 executes a repair welding on the defective portion based on the inspection result of the welded portion (that is, information about the defective portion) received from the repair control device 2.

Figure 2:
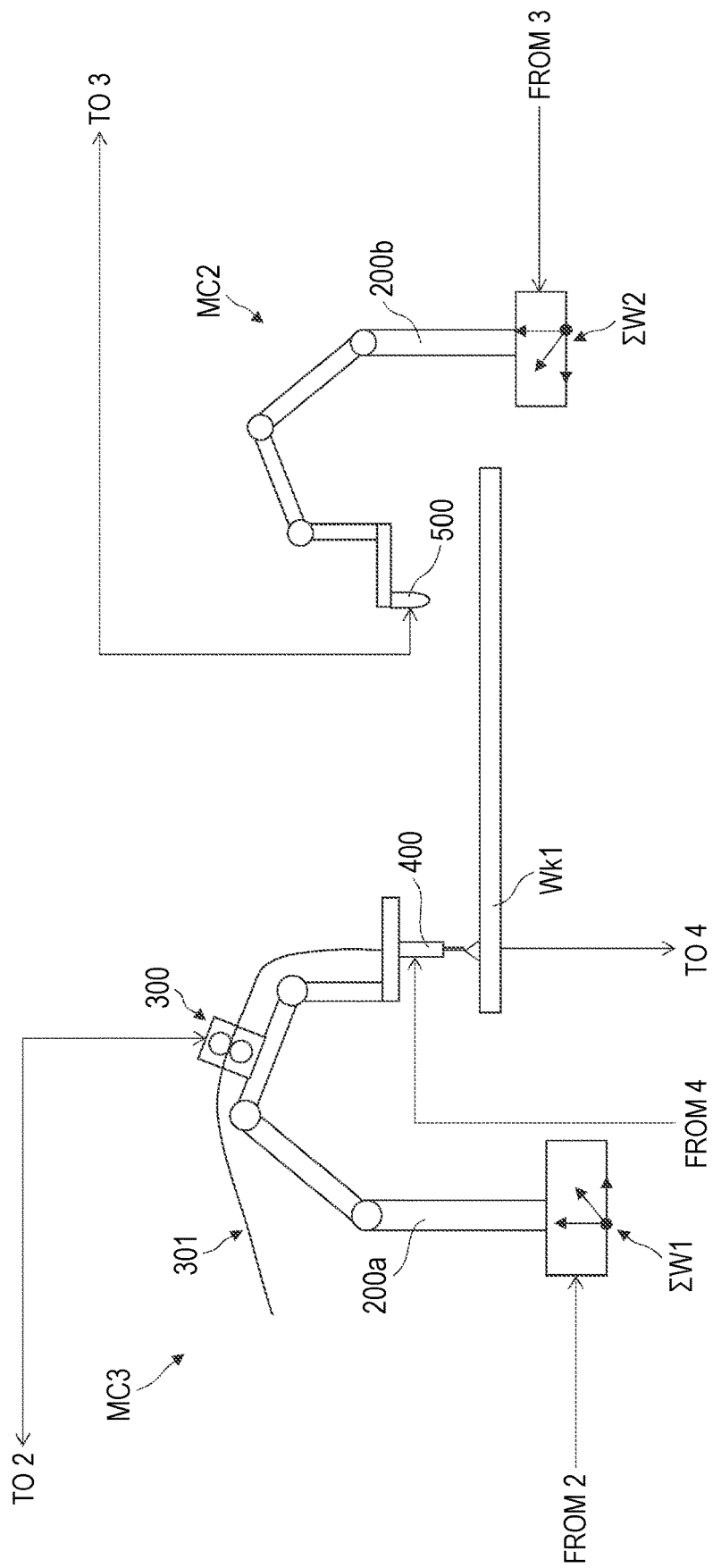
FIG. 2 is a schematic diagram showing an example of a use case of an inspection robot and a repair welding robot.

FIG. 2 is a schematic diagram showing an example of a use case of the inspection robot MC2 and the repair welding robot MC3. A welding robot shown in FIG. 2 may be a robot in which the welding robot MC1 and the repair welding robot MC3 are integrated, or may be the repair welding robot MC3. In the following description, the welding robot shown in FIG. 2 is the repair welding robot MC3. The inspection control device 5 shown in FIG. 2 executes control based on an inspection coordinate system $\Sigma W2$ preset in the inspection robot MC2. On the other hand, the repair control device 2 executes control based on a repair welding coordinate system $\Sigma W1$ preset in the repair welding robot MC3.

The inspection robot MC2 detects a shape of a weld bead in a welded portion based on a control signal received from the inspection control device 5, and acquires shape data for each weld bead based on a detection result. The inspection robot MC2 transmits the acquired shape data for each weld bead to the inspection device 3. The inspection robot MC2 includes a manipulator 200b and a shape detection unit 500.

The manipulator 200b is a so-called robot arm, and is a robot having articulated axes. The manipulator 200b controls a position of the shape detection unit 500 based on a control signal received from the inspection control device 5.

The shape detection unit 500 is, for example, a three-dimensional shape measurement sensor, and includes a laser light source (not shown) that can scan a welded portion of the workpiece Wk1 based on position information of the welded portion transmitted from the inspection control device 5, and a camera (not shown) that can image an imaging region including the periphery of the welded portion and image a reflection trajectory (that is, a shape line of the welded portion) of reflected laser light among laser light emitted to the welded portion. The shape detection unit 500 transmits shape data (image data) of the welded portion based on the laser light captured by the camera to the inspection device 3.

The above-described camera (not shown) includes at least a lens (not shown) and an image sensor (not shown). The image sensor is, for example, a solid-state imaging element such as a charged-coupled device (CCD) or a complementary metal oxide semiconductor (CMOS), and converts an optical image formed on an imaging surface into an electric signal.

The repair welding robot MC3 executes a repair welding on the defective portion based on the inspection result of the welded portion (that is, information about the defective portion) received from the repair control device 2. The repair welding robot MC3 includes a manipulator 200a, a wire feeding device 300, a welding wire 301, and a welding torch 400.

The manipulator 200a controls a position and an angle of the welding torch 400 based on a control signal that is related to a repair welding and is received from the repair control device 2. The wire feeding device 300 controls a feeding speed of the welding wire 301 based on a control signal received from the repair control device 2. The wire feeding device 300 may include a sensor that can detect a remaining amount of the welding wire 301.

The welding wire 301 is fed toward a repair welding portion by the wire feeding device 300. The welding wire 301 is melted by arc heat generated between a tip end of the welding wire 301 and the workpiece Wk1 by power supplied from a welding power source device 4 via the welding torch 400, and joins welded portions.

Figure 3:
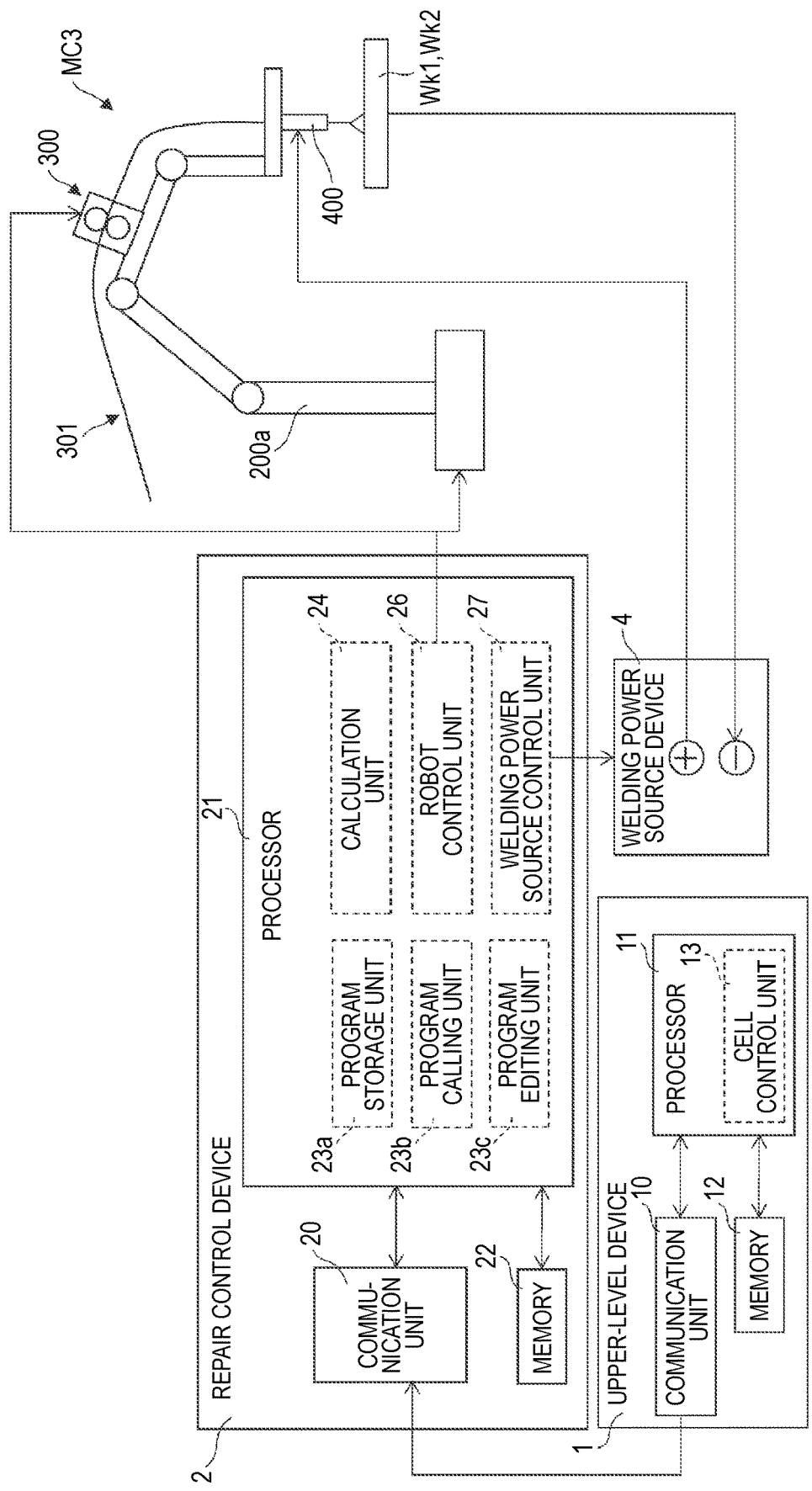
FIG. 3 is a diagram showing an example of an internal configuration of a welding system in the repair welding robot according to the first embodiment.

The welding torch 400 holds the welding wire 301 and is supplied with power from the welding power source device 4 (see FIG. 3). The welding torch 400 is moved by the manipulator 200a so that the welded portions can be welded.

FIG. 3 is a diagram showing an example of an internal configuration of the welding system 1000 in the repair welding robot MC3 according to the first embodiment. The repair welding robot MC3 executes a repair welding on a defective portion based on a control signal from the repair control device 2. The monitor MN1, the interface UI1, and the external storage ST are omitted in FIG. 3 in order to make the description easy to understand.

The upper-level device 1 generates a control signal for executing a repair welding based on an input operation of a user (operator) or information preset by the user (operator), and transmits the generated control signal to the repair control device 2. The upper-level device 1 includes a communication unit 10, a processor 11, and a memory 12.

The communication unit 10 is communicably connected to the repair control device 2. The communication unit 10 transmits a control signal for executing a repair welding to the repair control device 2. The control signal for executing a repair welding includes a control signal for controlling each of the manipulator 200a, the wire feeding device 300, and the welding power source device 4.

The processor 11 is configured with, for example, a central processing unit (CPU) or a field programmable gate array (FPGA), and executes various processings and controls in cooperation with the memory 12. Specifically, the processor 11 implements a function of a cell control unit 13 by referring to a program and data stored in the memory 12 and executing the program.

The cell control unit 13 generates a control signal for enabling control of each control device such as executing a repair welding and an inspection on a welded portion, based on an input operation of a user (operator) using the interface UI1 and information preset by the user (operator) and stored in the external storage ST. The control signal generated by the cell control unit 13 is transmitted to the repair control device 2 via the communication unit 10.

The memory 12 includes, for example, a random access memory (RAM) serving as a work memory used when each processing of the processor 11 is executed, and a read only memory (ROM) that stores a program and data for defining an operation of the processor 11. Data or information generated or acquired by the processor 11 is temporarily stored in the RAM. A program that defines an operation of the processor 11 is written into the ROM.

The memory 12 stores type information that is assigned to each workpiece Wk1 and is input by a user, a workpiece S/N (Serial Number) assigned to each workpiece Wk1 in advance, a welding line ID that is assigned to each welding line and is set by a user, and the like.

Next, the repair control device 2 will be described. The repair control device 2 controls the manipulator 200a, the wire feeding device 300, and the welding power source device 4 based on control signals received from the upper-level device 1. The repair control device 2 includes a communication unit 20, a processor 21, a memory 22, a program storage unit 23a, a program calling unit 23b, a program editing unit 23c, a calculation unit 24, a robot control unit 26, and a welding power source control unit 27.

The communication unit 20 is communicably connected to the upper-level device 1. The communication unit 20 receives a control signal for executing a repair welding from the upper-level device 1. The communication unit 20 receives position information of a defective portion that does not satisfy an inspection condition among welded portions and a defect factor from the inspection control device 5 via the upper-level device 1.

The processor 21 is configured with, for example, a CPU or an FPGA, and executes various processings and controls in cooperation with the memory 22. Specifically, the processor 21 refers to a program and data stored in the memory 22, and executes the program to implement functions of units. The units are the program storage unit 23a, the program calling unit 23b, the program editing unit 23c, the calculation unit 24, the robot control unit 26, and the welding power source control unit 27. The functions of units include, for example, a function of editing and calling a repair welding program that is used to execute a repair welding and is stored in advance, a function of generating a control signal for controlling each of the manipulator 200a, the wire feeding device 300, and the welding power source device 4 based on the called repair welding program, and the like.

The repair welding program is a program for executing a repair welding according to repair welding conditions (for example, a position of a defective portion, a repair welding method, and the like) set for each defective portion, and the control signal is a control signal for controlling the welding power source device 4, the manipulator 200a, the wire feeding device 300, the welding torch 400, the shape detection unit 500, and the like.

The program storage unit 23a stores the repair welding program received from the upper-level device 1. The repair welding program is a program for executing a repair welding according to welding conditions (for example, a height, a width, a shape, and the like of a weld bead) set for each welded portion. The repair welding program is stored in the program storage unit 23a, is referred to by the program calling unit 23b, and is edited by the program editing unit 23c.

The program calling unit 23b calls, from the program storage unit 23a, the repair welding program for executing a repair welding corresponding to a welded portion based on a control signal received from the upper-level device 1 via the communication unit 20. The program calling unit 23b outputs the called repair welding program to the program editing unit 23c.

The program editing unit 23c edits the repair welding program for executing a repair welding corresponding to a welded portion based on the control signal received from the upper-level device 1 via the communication unit 20. The program editing unit 23c edits the repair welding program called by the program calling unit 23b corresponding to the welded portion. The program editing unit 23c outputs the edited repair welding program to the calculation unit 24 and stores the edited repair welding program in the program storage unit 23a.

The calculation unit 24 executes a calculation for controlling the manipulator 200a and the wire feeding device 300 by the robot control unit 26 based on the repair welding program input from the program editing unit 23c. The calculation unit 24 calculates power to be supplied to the welding torch 400, power supply time, and the like that are controlled by the welding power source device 4 based on the input repair welding program. The calculation unit 24 outputs a calculation result to the robot control unit 26 and the welding power source control unit 27.

The robot control unit 26 generates a control signal for driving each of the manipulator 200a and the wire feeding device 300 based on the repair welding program and the calculation result input from the calculation unit 24.

The robot control unit 26 generates a control signal based on a coordinate system (hereinafter, referred to as a repair welding coordinate system ΣW1) between the manipulator 200a and a workpiece fixing base PsF or a positioner PsR on which the workpiece Wk1 is installed, using the manipulator 200a and the welding torch 400, and transmits the control signal to the manipulator 200a.

The welding power source control unit 27 drives the welding power source device 4 based on the repair welding program and the calculation result input from the calculation unit 24. Specifically, the welding power source control unit 27 controls the power supplied to the welding torch 400 and the power supply time.

The memory 22 includes, for example, a RAM serving as a work memory used when each processing of the processor 21 is executed, and a ROM that stores a program and data for defining an operation of the processor 21. Data or information generated or acquired by the processor 21 is temporarily stored in the RAM. A program that defines an operation of the processor 21 is written into the ROM.

The memory 22 stores type information that is assigned to each workpiece Wk1 and is received from the upper-level device 1, a workpiece S/N (Serial Number) assigned to each workpiece Wk1 in advance, a welding line ID that is assigned to each welding line and is set by a user, and the like. The memory 22 also stores information about the repair welding coordinate system ΣW1 preset in the repair welding robot MC3.

The welding power source device 4 controls the power supplied to the welding torch 400, the power supply time, and the like based on a control signal input from the repair control device 2.

Figure 4:
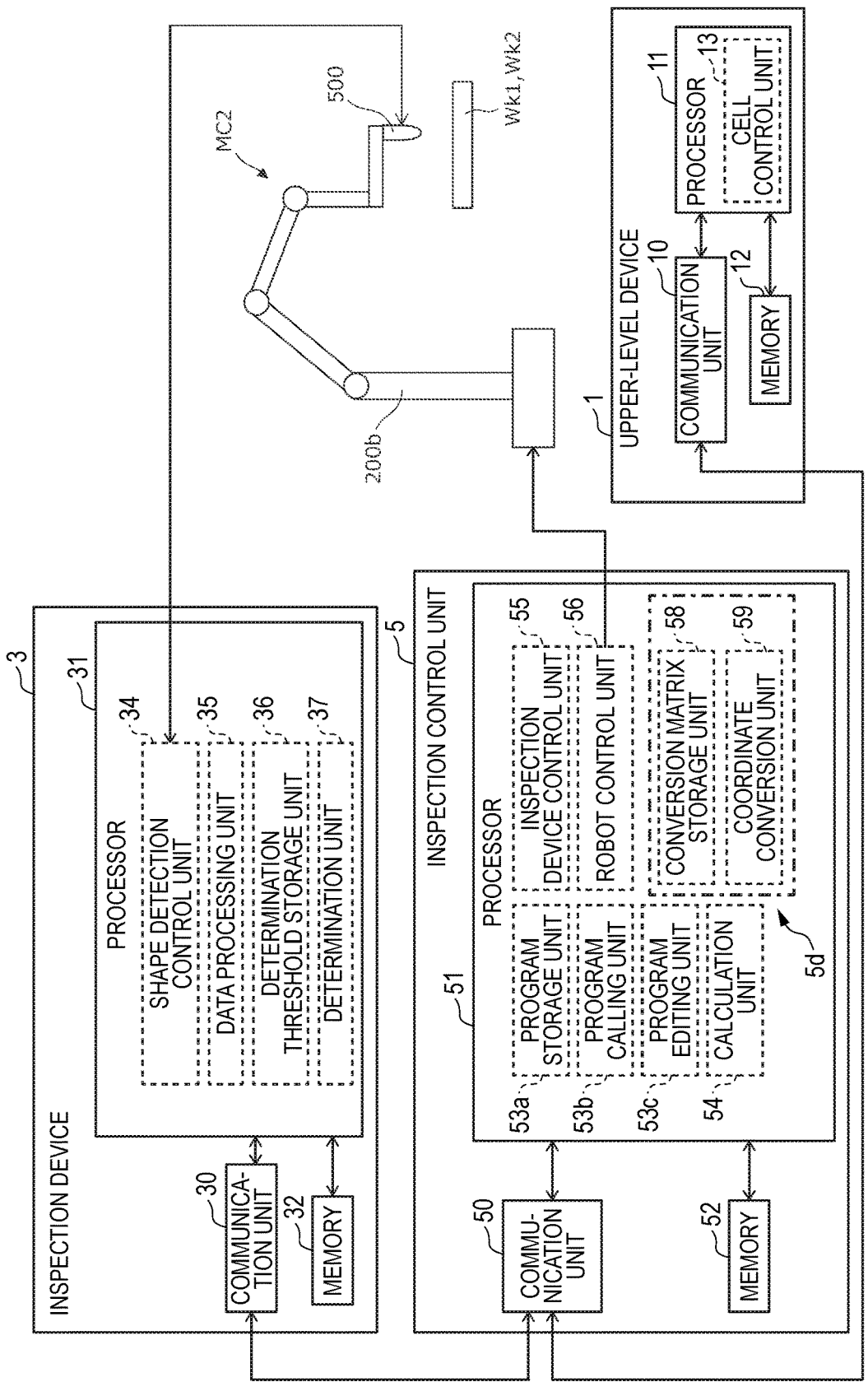
FIG. 4 is a diagram showing an example of an internal configuration of a welding system in the inspection robot according to the first embodiment.

FIG. 4 is a diagram showing an example of an internal configuration of the welding system 1000 in the inspection robot MC2 according to the first embodiment. The inspection robot MC2 is controlled based on a control signal from the inspection control device 5, and executes an inspection on a welded portion. In FIG. 4, the monitor MN1, the interface UI1, the external storage ST, and the configuration related to the inspection on the welded portion are omitted in order to make the description easy to understand. The description of configurations the same as those in FIG. 3 and having the same function will be simplified or omitted, and different contents will be described.

The upper-level device 1 generates a control signal for executing an inspection on a welded portion based on an input operation of a user (an operator) or information preset by the user (the operator), and transmits the generated control signal to the inspection control device 5. The upper-level device 1 includes the communication unit 10, the processor 11, and the memory 12.

The communication unit 10 is communicably connected to the inspection control device 5 so as to control the inspection robot MC2. The communication unit 10 may be communicably connected to the inspection device 3. The communication unit 10 transmits a control signal for executing an inspection on a welded portion to the inspection control device 5. Here, the control signal for executing an inspection on the welded portion is a signal for controlling each of the manipulator 200b, the shape detection unit 500, and the inspection device 3. The communication unit 10 receives information about an inspection result of the welded portion from the inspection device 3 via the communication unit 50 in the inspection control device 5. The received inspection result is transmitted from the communication unit 10 to the monitor MN1 and is displayed on the monitor MN1.

To control the inspection robot MC2, the cell control unit 13 generates a control signal for executing an inspection on a welded portion based on an input operation of a user (an operator) using the interface UI1 or information that is preset by the user (the operator) and is stored in the external storage ST. The cell control unit 13 transmits the generated control signal to the inspection control device 5.

To control the inspection robot MC2, the memory 12 may store information related to the inspection result of the welded portion generated by the inspection device 3.

Next, the inspection control device 5 will be described. The inspection control device 5 controls the manipulator 200b based on the control signal received from the upper-level device 1. The inspection control device 5 includes a communication unit 50, a processor 51, a memory 52, a program storage unit 53a, a program calling unit 53b, a program editing unit 53c, a calculation unit 54, an inspection device control unit 55, a robot control unit 56, and a conversion unit 5d.

The communication unit 50 is communicably connected to the upper-level device 1 and the inspection device 3. The communication unit 50 receives a control signal for executing an inspection on the welded portion from the upper-level device 1. The communication unit 50 transmits, to the inspection device 3, a control signal that is related to an inspection corresponding to a welded portion and is generated by each unit of the processor 51. The communication unit 50 transmits an inspection result (for example, position information of a defective portion, a defect factor, and the like) of a welded portion received from the inspection device 3 to the upper-level device 1.

The processor 51 is configured with, for example, a CPU or an FPGA, and executes various processings and controls in cooperation with the memory 52. Specifically, the processor 51 implements functions of units by referring to a program and data stored in the memory 52 and executing the program. The units are the program storage unit 53a, the program calling unit 53b, the program editing unit 53c, the calculation unit 54, the robot control unit 56, and the conversion unit 5d. The functions of units include, for example, a function of editing and calling an inspection program for executing an inspection on a welded portion, a function of generating a control signal for controlling the manipulator 200b based on the called inspection program, and the like.

The inspection program is a program for executing an inspection on each welded portion, and is a control signal for controlling each of the inspection device 3, the manipulator 200b, the shape detection unit 500, and the like.

The program storage unit 53a stores the inspection program received from the upper-level device 1. The inspection program is a program for executing an inspection according to an inspection condition (for example, a height, a width, a shape, and the like of a weld bead) set for each welded portion. The inspection program is stored in the program storage unit 53a, is referred to by the program calling unit 53b, and is edited by the program editing unit 53c. The inspection program includes an inspection program generated corresponding to an inspection condition for executing an inspection after a welding and an inspection program generated corresponding to an inspection condition for executing an inspection after a repair welding, and these inspection programs may be stored as different inspection programs.

The program calling unit 53b calls, from the program storage unit 53a, an inspection program for executing an inspection corresponding to a welded portion based on a control signal received from the upper-level device 1 via the communication unit 50. The program calling unit 53b outputs the called inspection program to the program editing unit 53c.

The program editing unit 53c edits the inspection program for executing a inspection corresponding to a welded portion based on the control signal received from the upper-level device 1 via the communication unit 50. The program editing unit 53c edits the inspection program called by the program calling unit 53b corresponding to a welded portion. The program editing unit 53c outputs the edited inspection program to the calculation unit 54.

The calculation unit 54 executes a calculation for controlling each of the inspection device 3 and the shape detection unit 500 by the inspection device control unit 55. The calculation unit 54 executes a calculation for controlling the manipulator 200b by the robot control unit 56 based on the inspection program input from the program editing unit 53c. The calculation unit 54 outputs the inspection program including a calculation result to the inspection device control unit 55 and the robot control unit 56.

Based on the inspection program input from the calculation unit 54, the inspection device control unit 55 transmits, to the inspection device 3, information such as position information and an inspection condition for each welded portion necessary for executing an inspection on the welded portion. The inspection condition may be an inspection condition in which an inspection condition after a welding and an inspection condition after a repair welding are different from each other.

The robot control unit 56 generates a control signal for driving the manipulator 200b based on the inspection program input from the calculation unit 54.

The robot control unit 56 generates a control signal based on a coordinate system (hereinafter, referred to as an inspection coordinate system $\Sigma W2$) between the manipulator 200b and the workpiece fixing base PsF or the positioner PsR on which the workpiece Wk1 is installed, using the manipulator 200b and the shape detection unit 500, and transmits the control signal to the manipulator 200b.

The memory 52 includes, for example, a RAM serving as a work memory used when each processing of the processor 51 is executed, and a ROM that stores a program and data for defining an operation of the processor 51. Data or information generated or acquired by the processor 51 is temporarily stored in the RAM. A program that defines an operation of the processor 51 is written into the ROM. The memory 52 stores information about the inspection coordinate system $\Sigma W2$ set in advance in the inspection robot MC2.

The conversion unit 5d converts position information of a defective portion based on the inspection coordinate system $\Sigma W2$ into position information of a defective portion based on the repair welding coordinate system $\Sigma W1$, based on the repair welding coordinate system $\Sigma W1$ and the inspection coordinate system $\Sigma W2$ preset for each robot. The conversion unit 5d includes a conversion matrix storage unit 58 and a coordinate conversion unit 59.

The conversion matrix storage unit 58 derives and stores a conversion matrix for converting position information (coordinate information) of a defective portion based on the inspection coordinate system $\Sigma W2$ acquired by the inspection device 3 into position information (coordinate information) based on the repair welding coordinate system $\Sigma W1$ in which the repair welding robot MC3 can execute a repair welding. Specifically, the conversion matrix storage unit 58 derives a conversion matrix corresponding to position information (coordinate information) based on respective coordinate systems obtained by the repair welding coordinate system $\Sigma W1$ and the inspection coordinate system $\Sigma W2$ in a state in which the welding torch 400 held by the repair welding robot MC3 and the shape detection unit 500 held by the inspection robot MC2 are respectively positioned at positions of three different points relative to the same workpiece Wk1. The conversion matrix is referred to by the coordinate conversion unit 59. The position information of a defective portion based on the inspection coordinate system $\Sigma W2$ is an example of inspection coordinate system defective portion position information. The position information of a defective portion based on the repair welding coordinate system $\Sigma W1$ is an example of welding coordinate system defective portion position information.

The coordinate conversion unit 59 refers to the conversion matrix stored in the conversion matrix storage unit 58, and converts the position information (coordinate information) of a defective portion acquired by the inspection device 3 into the position information (coordinate information) based on the repair welding coordinate system $\Sigma W1$ in which the repair welding robot MC3 can execute a repair welding. The coordinate conversion unit 59 associates the converted position information (coordinate information) of a defective portion with another piece of information (for example, a defect factor) related to the defective portion, and transmits the associated information to the repair control device 2 via the upper-level device 1.

Next, the inspection device 3 will be described. The inspection device 3 inspects (determines) whether there is a defective portion in welded portions based on shape data of a weld bead for each of the welded portions acquired by the shape detection unit 500. The inspection device 3 includes a communication unit 30, a processor 31, a memory 32, a shape detection control unit 34, a data processing unit 35, a determination threshold storage unit 36, and a determination unit 37.

The communication unit 30 is communicably connected to the inspection control device 5. The communication unit 50 receives, from the inspection control device 5, information such as position information and an inspection condition necessary for executing an inspection on a welded portion. The communication unit 30 transmits an inspection result of the welded portion to the upper-level device 1 via the communication unit 50 of the inspection control device 5.

The processor 31 is configured with, for example, a CPU or an FPGA, and executes various processings and controls in cooperation with the memory 32. Specifically, the processor 31 implements functions of units by referring to a program and data stored in the memory 32 and executing the program. The units are the shape detection control unit 34, the data processing unit 35, the determination threshold storage unit 36, and the determination unit 37. The functions of units include, for example, a function of controlling the shape detection unit 500 based on a control signal that is related to an inspection corresponding to a welded portion and is received from the inspection control device 5, a function of generating image data based on the shape data of a weld bead received from the shape detection unit 500, a function of executing an inspection on a welded portion based on the generated image data, and the like.

The memory 32 includes, for example, a RAM serving as a work memory used when each processing of the processor 31 is executed, and a ROM that stores a program and data for defining an operation of the processor 31. Data or information generated or acquired by the processor 31 is temporarily stored in the RAM. A program that defines an operation of the processor 31 is written into the ROM. The memory 32 stores information about the inspection coordinate system ΣW2 preset in the inspection robot MC2.

The shape detection control unit 34 controls the shape detection unit 500 based on the shape data of a weld bead in a welded portion received from the shape detection unit 500 and the control signal that is related to an inspection corresponding to a welded portion and is received from the inspection control device 5. When the shape detection unit 500 is located at a position where the shape detection unit 500 can image a welded portion (can detect a shape of the welded portion), the shape detection control unit 34 controls the shape detection unit 500 to emit a laser beam so as to acquire the shape data of the weld bead in the welded portion. The shape detection control unit 34 receives the shape data acquired by the shape detection unit 500, and outputs the shape data to the data processing unit 35.

The data processing unit 35 converts the shape data of the weld bead in the welded portion input from the shape detection control unit 34 into image data. The shape data is, for example, point cloud data of shape lines including a reflection trajectory of the laser beam emitted to a surface of the weld bead. The data processing unit 35 executes a statistical processing on the input shape data, and generates image data related to the shape of the weld bead in the welded portion. In order to emphasize a position and a shape of the weld bead, the data processing unit 35 may execute an edge emphasis correction in which a peripheral edge portion of the weld bead is emphasized. The data processing unit 35 outputs the generated image data to the determination unit 37.

The determination threshold storage unit 36 stores an inspection condition set for each welded portion in order to execute a defect determination (that is, inspection) corresponding to the welded portion. The inspection condition is stored as a threshold for each inspection item, and is, for example, a threshold related to a positional deviation of a welded portion, a threshold related to a height of a weld bead, a threshold related to a width of a weld bead, and the like. The determination threshold storage unit 36 stores, as each threshold after a repair welding, an allowable range (for example, a minimum allowable value, a maximum allowable value, or the like related to the height of the weld bead) in which the welded portion satisfies quality required by a customer. The threshold may be set as an inspection condition of which an inspection condition after a welding and an inspection condition after a repair welding are different from each other.

The determination unit 37 determines whether there is a defective portion in the welded portions based on the image data of the weld bead in the welded portions input from the data processing unit 35 and the inspection condition stored in the determination threshold storage unit 36. When it is determined that there is a defective portion, the determination unit 37 measures a position of the defective portion (a start position and an end position of the defective portion), analyzes the defective portion, and estimates a defect factor serving as an example of a defect type. The determination unit 37 generates the position information of the measured defective portion and the estimated defect factor as an inspection result of the welded portions, and transmits the generated inspection result to the inspection control device 5.

The determination unit 37 stores an upper limit value of the number of times of inspections for the same workpiece Wk1. Accordingly, the inspection device 3 can determine that it is difficult or it is impossible to correct the defective portion by a repair welding when the number of times of inspections exceeds the predetermined number of times during correcting the defective portion by a repair welding, and a reduction in the operation rate of the welding system 1000 can be prevented. The determination unit 37 generates an alert when the number of times of inspections on the same workpiece Wk1 exceeds a preset upper limit value of the number of inspections. The generated alert is transmitted to the upper-level device 1 via the inspection control device 5. The alert transmitted to the upper-level device 1 is transmitted to and displayed on the monitor MN1, and a user is notified of the alert.

When the determination unit 37 determines that there is no defective portion in the welded portions, the determination unit 37 generates an alert for notifying that there is no defective portion, and transmits the generated alert to the upper-level device 1 via the inspection control device 5. The alert transmitted to the upper-level device 1 is transmitted to and displayed on the monitor MN1.

Figure 5:
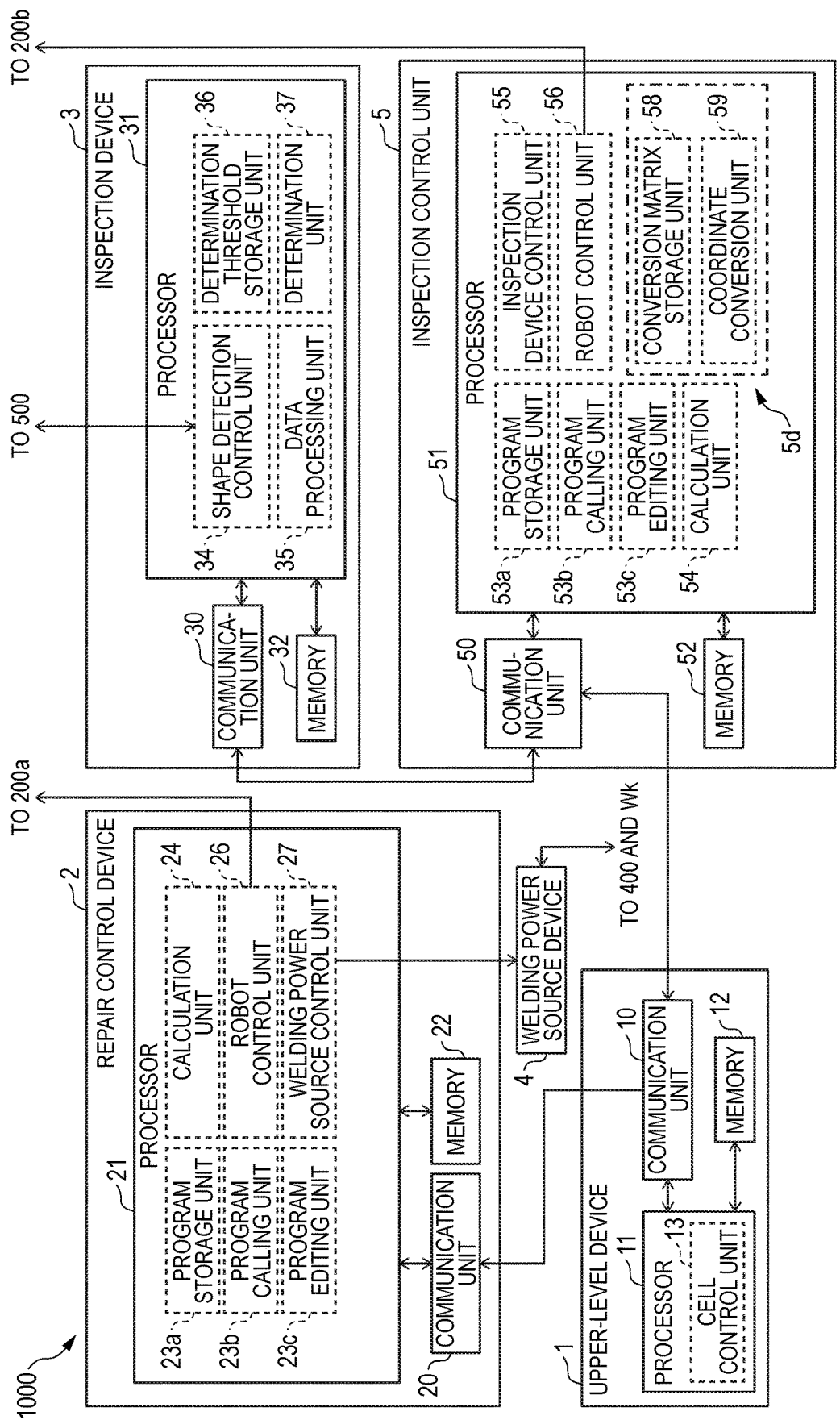
FIG. 5 is a diagram showing an example of an internal configuration of a welding system according to the first embodiment.

FIG. 5 is a diagram showing an example of an internal configuration of the welding system 1000 according to the first embodiment. The welding system 1000 shown in FIG.

5 is an example of an internal configuration in a case where the conversion unit 5d of the inspection control device 5 converts the position information of a defective portion based on the inspection coordinate system ΣW2 acquired by the inspection device 3 into the position information of a defective portion based on the repair welding coordinate system ΣW1. The repair control device 2 shown in FIG. 5 executes control for executing a repair welding based on the received and converted position information of a defective portion based on the repair welding coordinate system ΣW1.

Figure 6A:
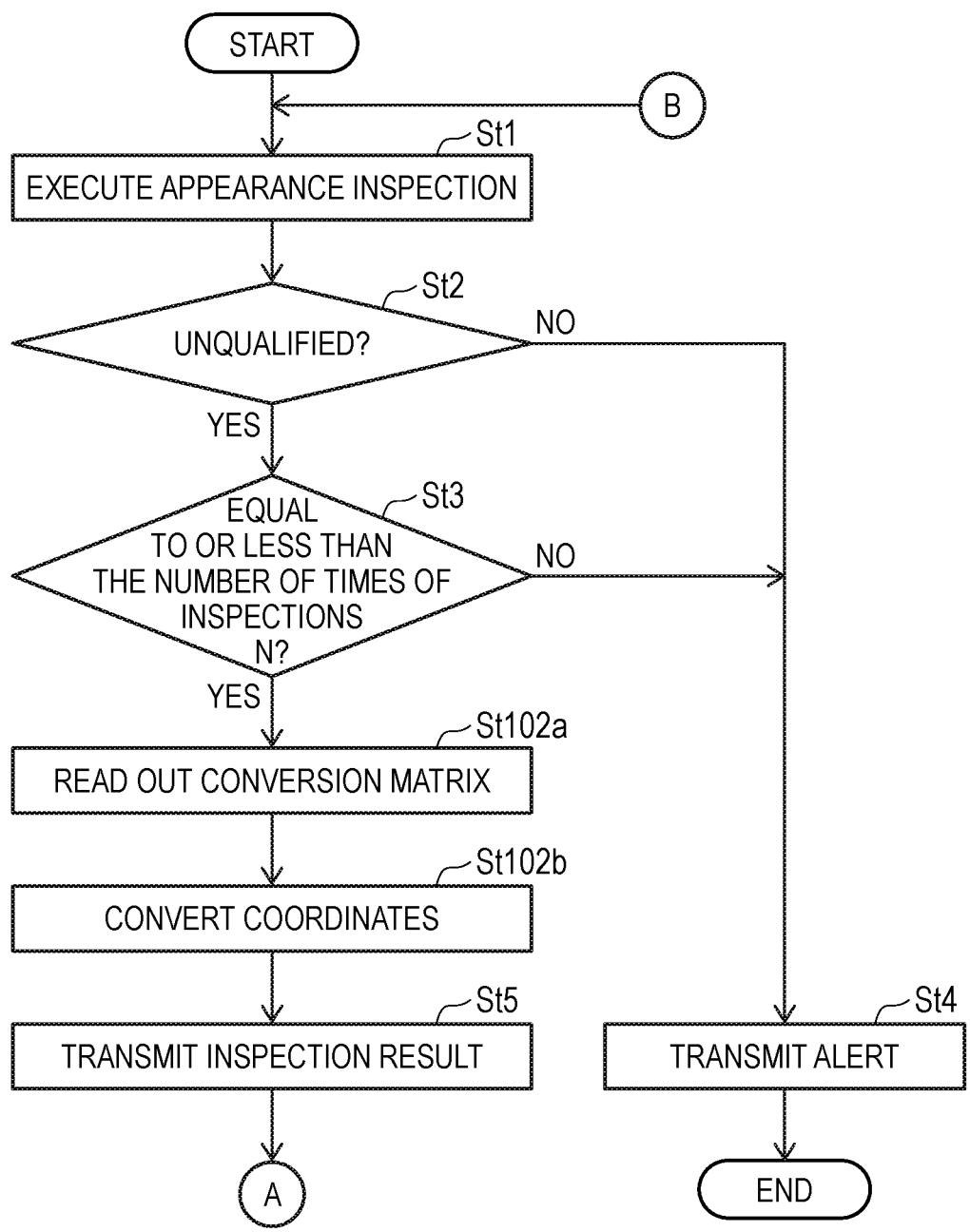
FIG. 6A is a flowchart showing an example of an operation procedure of an inspection control device and an inspection device according to the first embodiment.
Figure 6B:
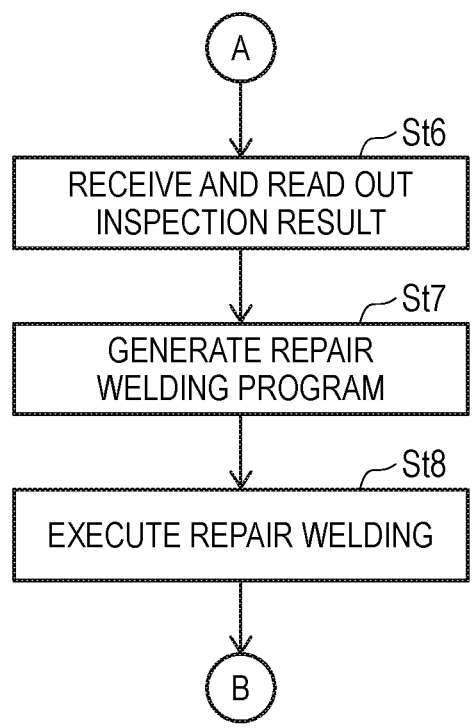
FIG. 6B is a flowchart showing an example of an operation procedure of a repair control device according to the first embodiment.

Next, an example of an operation procedure of the welding system 1000 will be described with reference to FIGS. 6A and 6B. FIG. 6A is a flowchart showing an example of an operation procedure of the inspection control device 5 and the inspection device 3 according to the first embodiment. FIG. 6B is a flowchart showing an example of an operation procedure of the repair control device 2 according to the first embodiment.

First, an example of an operation procedure of the inspection control device 5 and the inspection device 3 will be described.

The inspection device 3 executes an appearance inspection on the workpiece Wk1 after a welding based on the inspection condition that is set for each welded portion and is received from the upper-level device 1 (St1). Specifically, the inspection device 3 inspects (determines) whether there is a defective portion in welded portions based on the inspection condition and the image data that is generated based on the shape data of a weld bead received from the shape detection unit 500.

The inspection device 3 determines whether there is a defective portion (unqualified portion) that does not satisfy the inspection condition in the welded portions (St2).

When it is determined that there is a defective portion (unqualified portion) (St2, YES) based on a determination result of the processing in step St2, the inspection device 3 determines whether the current number of times of inspections on the workpiece Wk1 is equal to or less than the number of times of inspections N serving as an upper limit value of the number of times of inspections set by a user (St3).

On the other hand, when it is determined that there is no defective portion (unqualified portion) (St2, NO) based on the determination result of the processing in step St2, the inspection device 3 generates an alert for notifying that there is no defective portion and there is no need to execute a repair welding. The inspection device 3 transmits the generated alert to the upper-level device 1 via the inspection control device 5. The alert transmitted to the upper-level device 1 is displayed on the monitor MN1 and a user is notified of the alert (St4). When the processing proceeds to the processing in step St4, the inspection device 3 ends the inspection on the workpiece Wk1.

When it is determined that the current number of times of inspections on the workpiece Wk1 is equal to or less than N (St3, YES) based on the determination result of the processing in step St3, the inspection device 3 transmits an inspection result including position information of a defective portion, a defect factor, and the like to the inspection control device 5. The inspection control device 5 reads out a conversion matrix R so as to convert the received position information of a defective portion based on the inspection coordinate system ΣW2 into position information of a defective portion based on the repair welding coordinate system ΣW1 (St102a).

The inspection control device 5 converts the position information of a defective portion based on the inspection coordinate system ΣW2 into the position information of a defective portion based on the repair welding coordinate system ΣW1 by using the conversion matrix R that was read out (St102b).

Here, a method for converting the position information based on the inspection coordinate system ΣW2 into the position information based on the repair welding coordinate system ΣW1 will be described. (Expression 1) is a determinant for converting the position information based on the inspection coordinate system ΣW2 into the position information based on the repair welding coordinate system ΣW1. Coordinates $W_1$ are a matrix indicating position information (coordinates) of a defective portion based on the repair welding coordinate system ΣW1. Coordinates $W_2$ are a matrix indicating position information (coordinates) of a defective portion based on the inspection coordinate system ΣW2. The conversion matrix R is a conversion matrix for converting the position information based on the inspection coordinate system ΣW2 into the position information based on the repair welding coordinate system ΣW1.

The conversion matrix R is a conversion matrix derived based on the inspection coordinate system ΣW2 preset in the inspection control device 5 and the repair welding coordinate system ΣW1 preset in the repair control device 2, and can convert the position information based on the inspection coordinate system ΣW2 into the position information based on the repair welding coordinate system ΣW1.

[Expression 1]

$$W_1 = RW_2 \qquad (1)$$

On the other hand, when it is determined that the current number of times of inspections on the workpiece Wk1 is not equal to or less than N times (St3, NO) based on the determination result of the processing in step St3, the inspection device 3 generates an alert for notifying that it is difficult to correct the defective portion even when a repair welding is executed for the current number of times. The inspection device 3 transmits the generated alert to the upper-level device 1 via the inspection control device 5. The alert transmitted to the upper-level device 1 is displayed on the monitor MN1 and a user is notified of the alert (St4). When the processing proceeds to the processing in step St4, the inspection device 3 ends the inspection on the workpiece Wk1.

The inspection control device 5 generates an inspection result including the converted position information of the defective portion based on the repair welding coordinate system ΣW1, a defect factor, and the like, and transmits the inspection result to the repair control device 2 via the upper-level device 1 (St5).

As described above, the inspection control device 5 and the inspection device 3 in the welding system 1000 according to the first embodiment end the inspection on the welded portion. Next, an example of an operation procedure of the repair control device 2 will be described.

The repair control device 2 receives and reads out the inspection result including the position information of the defective portion based on the repair welding coordinate system ΣW1 converted by the inspection control device 5, the defect factor, and the like (St6).

The repair control device 2 calls and edits a repair welding program based on the received inspection result, and generates the repair welding program corresponding to the defective portion (St7).

The repair control device 2 controls the manipulator 200a, the wire feeding device 300, and the welding power source device 4 based on the generated repair welding program (St8).

As described above, the repair control device 2 in the welding system 1000 according to the first embodiment ends the repair welding on the defective portion. After the processing in step St8 is completed, the processing proceeds to the processing in step St1, and the welding system 1000 causes the inspection device 3 to execute an inspection on the welded portion again. At this time, the inspection device 3 may inspect only the welded portion subjected to the repair welding.

(First Modification of First Embodiment)

In the welding system 1000 according to the first embodiment, the inspection control device 5 converts the position information in the inspection coordinate system $\Sigma W2$ into the position information in the repair welding coordinate system $\Sigma W1$. An example of the welding system 1000 according to a first modification of the first embodiment will be described in which the position information is converted in both the inspection control device 5 and the repair control device 2 in a similar manner. As an example in which the position information is converted by the inspection control device 5 and the repair control device 2 as described above, an inspection step and a repair welding step may be executed in separate steps (that is, the inspection robot MC2 and the repair welding robot MC3 executes processings in different cells).

Figure 7:
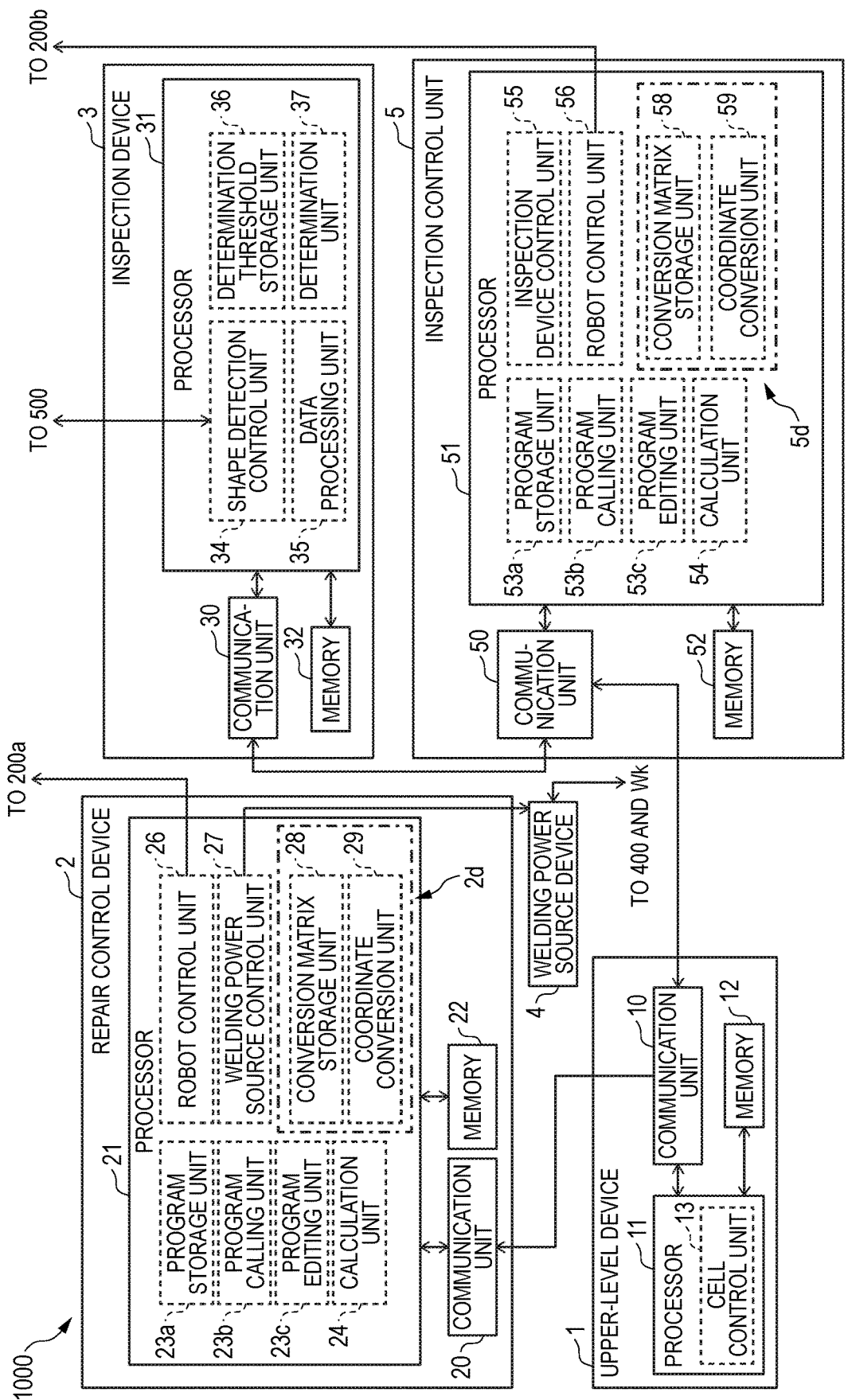
FIG. 7 is a diagram showing an example of an internal configuration of a welding system according to a first modification of the first embodiment.

FIG. 7 is a diagram showing an example of an internal configuration of the welding system 1000 according to the first modification of the first embodiment. The internal configuration of the welding system 1000 according to the first modification of the first embodiment is substantially the same as the internal configuration of the welding system 1000 according to the first embodiment. Since the same components as those in the first embodiment are denoted by the same reference numerals, description thereof will be omitted.

In the upper-level device 1, position information of a workpiece Wk2 and position information of a jig (not shown) for fixing a position of the workpiece Wk2 are preset by a user. The upper-level device 1 transmits these pieces of information to the repair control device 2 and the inspection control device 5.

The repair control device 2 according to the first modification of the first embodiment sets a coordinate system based on a relative positional relationship between the workpiece Wk2 or the jig (not shown) for fixing a position of the workpiece Wk2 and the workpiece fixing base PsF or the positioner PsR (see FIGS. 8 to 10B).

The repair control device 2 sets a workpiece coordinate system $\Sigma Wk1$ in a repair welding step based on the relative positional relationship between the workpiece Wk2 and the workpiece fixing base PsF or the positioner PsR. The repair control device 2 may set the workpiece coordinate system $\Sigma Wk1$ in the repair welding step based on the relative positional relationship between the jig for fixing a position of the workpiece Wk2 and the workpiece fixing base PsF or the positioner PsR. Accordingly, the repair control device 2 can derive a determinant capable of converting the position information of a defective portion based on the repair welding coordinate system $\Sigma W1$ into the position information of a defective portion based on the workpiece coordinate system $\Sigma Wk1$ according to the relative positional relationship between the manipulator 200a and the workpiece fixing base PsF or the positioner PsR. The workpiece coordinate system $\Sigma Wk1$ is an example of a workpiece coordinate system $\Sigma Wk$ and a workpiece coordinate system $\Sigma Wk2$ is an example of a workpiece coordinate system.

The repair control device 2 further includes a conversion unit 2d.

The conversion unit 2d converts the position information of a defective portion based on the workpiece coordinate system $\Sigma Wk1$ in the repair welding steps into the position information of a defective portion based on the repair welding coordinate system $\Sigma W1$. The conversion unit 2d includes a conversion matrix storage unit 28 and a coordinate conversion unit 59.

The conversion matrix storage unit 28 stores the set repair welding coordinate system $\Sigma W1$ and workpiece coordinate system $\Sigma Wk1$, and a conversion matrix capable of converting the position information of a defective portion based on the repair welding coordinate system $\Sigma W1$ into the position information of a defective portion based on the workpiece coordinate system $\Sigma Wk1$.

The coordinate conversion unit 29 can convert position information of a defective portion based on the workpiece coordinate system $\Sigma Wk2$ in an inspection step received from the inspection control device 5 to be described later into the position information of a defective portion based on the workpiece coordinate system $\Sigma Wk1$ in a repair welding step, and can further convert the position information of a defective portion based on the workpiece coordinate system $\Sigma Wk2$ into the position information of a defective portion based on the repair welding coordinate system $\Sigma W1$, with reference to the conversion matrix storage unit 28.

Similarly, the inspection control device 5 according to the first modification of the first embodiment sets a coordinate system based on the relative positional relationship between the workpiece Wk2 or the jig (not shown) for fixing a position of the workpiece Wk2 and the workpiece fixing base PsF or the positioner PsR (see FIGS. 8 to 10B).

The inspection control device 5 sets the workpiece coordinate system $\Sigma Wk2$ in an inspection step based on the relative positional relationship between the workpiece Wk2 and the workpiece fixing base PsF or the positioner PsR. The inspection control device 5 may set the workpiece coordinate system $\Sigma Wk2$ in the inspection step based on the relative positional relationship between the jig for fixing a position of the workpiece Wk2 and the workpiece fixing base PsF or the positioner PsR. Accordingly, the inspection control device 5 can derive a conversion matrix capable of converting the position information of a defective portion based on the inspection coordinate system $\Sigma W2$ into the position information of a defective portion based on the workpiece coordinate system $\Sigma Wk2$ according to the relative positional relationship between the manipulator 200a and the workpiece fixing base PsF or the positioner PsR.

The conversion matrix storage unit 58 stores the set inspection coordinate system $\Sigma W2$ and workpiece coordinate system $\Sigma Wk2$, and a conversion matrix capable of converting the position information of a defective portion based on the inspection coordinate system $\Sigma W2$ into the position information of a defective portion based on the workpiece coordinate system $\Sigma Wk2$.

The coordinate conversion unit 59 can convert the position information of a defective portion based on the inspection coordinate system $\Sigma W2$ in an inspection step received from the inspection device 3 to be described later into the position information of a defective portion based on the workpiece coordinate system $\Sigma Wk2$ in an inspection step, and can further convert the position information of a defective portion based on the inspection coordinate system $\Sigma W2$ into the position information of a defective portion based on the workpiece coordinate system ΣWk1 in the repair welding step, with reference to the conversion matrix storage unit 58.

As described above, in the welding system 1000 according to the first modification of the first embodiment, when the inspection control device 5 and the repair control device 2 convert the position information of a defective portion through the workpiece coordinate systems ΣWk1 and ΣWk2 (that is, the inspection control device 5 and the repair control device 2 execute the inspection step and the repair welding step in separate steps), the repair control device 2 can execute a repair welding without using the position information in the inspection coordinate system ΣW2.

Figure 8:
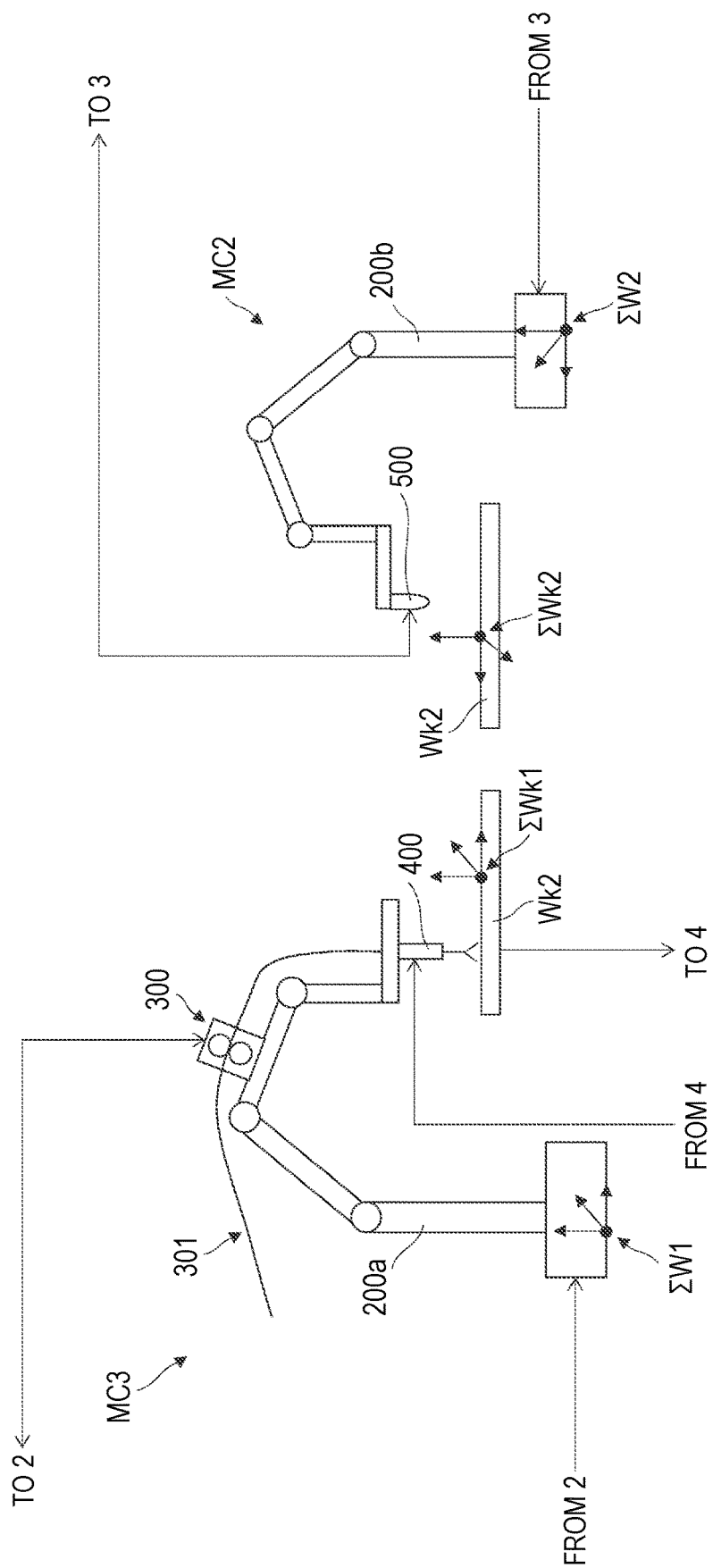
FIG. 8 shows an example of a use case of an inspection robot and a repair welding robot that are installed in different cells.

FIG. 8 is a schematic diagram showing an example of a use case of the inspection robot MC2 and the repair welding robot MC3 installed in different cells. The inspection robot MC2 and the repair welding robot MC3 shown in FIG. 8 are installed in different cells (steps), and execute an inspection and a repair welding on the same workpiece Wk2 sent to the respective cells (steps). The repair welding coordinate system ΣW1 is preset in the repair welding robot MC3. Similarly, the inspection coordinate system ΣW2 is preset in the inspection robot MC2.

In such a case, a relative positional relationship between the inspection control device 5 that controls the inspection robot MC2 and the repair control device 2 that controls the repair welding robot MC3 is defined using coordinate systems set for the workpiece Wk2. The workpiece coordinate system ΣWk1 in the repair welding step and the workpiece coordinate system ΣWk2 in the inspection step are set as coordinate systems based on the workpiece Wk2.

Figure 9:
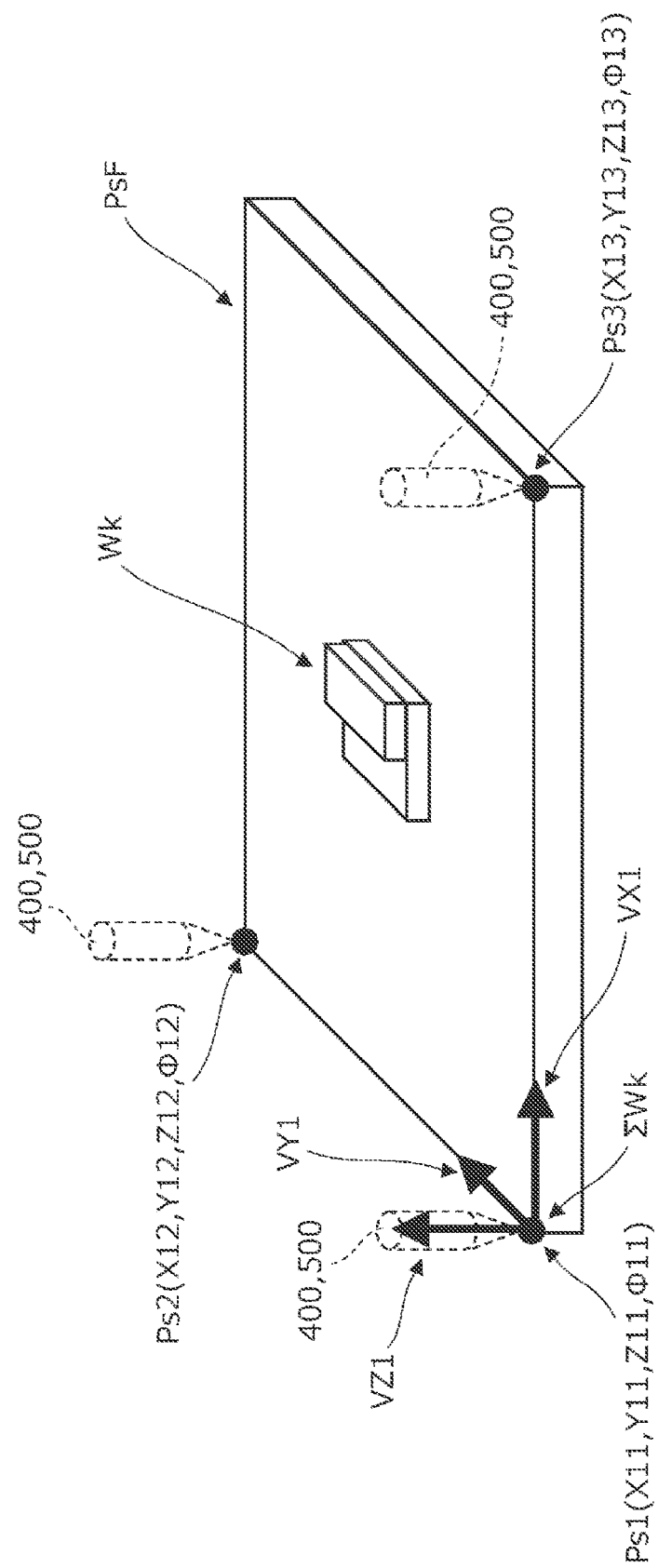
FIG. 9 shows an example of setting workpiece coordinate systems.

Next, an example of setting the workpiece coordinate systems ΣWk1 and ΣWk2 will be described with reference to FIG. 9. FIG. 9 is a diagram showing an example of setting the workpiece coordinate systems ΣWk1 and ΣWk2 on the workpiece fixing base PsF. The workpiece fixing base PsF fixes a workpiece Wk when an inspection or a repair welding is executed. The repair control device 2 sets the workpiece coordinate system ΣWk1 in the repair welding step based on the relative positional relationship between the manipulator 200*a* and the workpiece fixing base PsF. The inspection control device 5 sets the workpiece coordinate system ΣWk2 in the inspection step based on the relative positional relationship between the manipulator 200*b* and the workpiece fixing base PsF.

Hereinafter, an example of setting the workpiece coordinate system ΣWk1 in the repair control device 2 in the repair welding step will be described.

The robot control unit 26 in the repair control device 2 controls the manipulator 200*a* to maintain a posture of the welding torch 400 held by the manipulator 200*a* in a manner of being perpendicular to the workpiece fixing base PsF. The robot control unit 26 sets a reference point Ps1 on the workpiece fixing base PsF to have coordinates (X11, Y11, Z11). The robot control unit 26 measures a rotation angle Φ11 at the reference point Ps1 when the welding torch 400 is positioned perpendicular to the reference point Ps1 on the workpiece fixing base PsF with reference to an initial rotation angle (an angle at the time of initial setting) of the welding torch 400 held by the manipulator 200*a*. Further, the robot control unit 26 associates the set coordinates with the measured rotation angle, and stores the reference point Ps1 having the coordinates (X11, Y11, Z11, Φ11) in the memory 22.

After the coordinates (X11, Y11, Z11, Φ11) of the reference point Ps1 are stored, the robot control unit 26 measures coordinates (X12, Y12, Z12) at another reference point Ps2 on the same workpiece fixing base PsF with reference to the coordinates (X11, Y11, Z11, Φ11) of the reference point Ps1. The robot control unit 26 measures a rotation angle Φ12 when the welding torch 400 is positioned perpendicular to the reference point Ps2 on the workpiece fixing base PsF with reference to an initial rotation angle (an angle at the time of initial setting) of the welding torch 400 held by the manipulator 200*a*. Further, the robot control unit 26 associates the set coordinates with the measured rotation angle, and stores the reference point Ps2 having the coordinates (X12, Y12, Z12, Φ12) in the memory 22. After the coordinates (X12, Y12, Z12, Φ12) of the reference point Ps2 are stored, the robot control unit 26 measures coordinates (X13, Y13, Z13) at another reference point Ps3 on the same workpiece fixing base PsF with reference to the coordinates (X11, Y11, Z11, Φ11) of the reference point Ps1. The robot control unit 26 measures a rotation angle Φ13 when the welding torch 400 is positioned perpendicular to the reference point Ps3 on the workpiece fixing base PsF with reference to an initial rotation angle (an angle at the time of initial setting) of the welding torch 400 held by the manipulator 200*a*. Further, the robot control unit 26 associates the set coordinates with the measured rotation angle, and stores the reference point Ps3 having the coordinates (X13, Y13, Z13, Φ13) in the memory 22.

The robot control unit 26 calculates a plane of the workpiece fixing base PsF based on the coordinates of each of the three reference points Ps1, Ps2, and Ps3, and sets a unit vector in a normal vector that passes through the reference point Ps1 on the workpiece fixing base PsF and is normal to the plane as a Z axis of the workpiece coordinate system ΣWk1. The robot control unit 26 sets a unit vector that passes through the reference point Ps1 of the workpiece fixing base PsF and extends toward the reference point Ps3 as an X axis of the workpiece coordinate system ΣWk1.

The robot control unit 26 sets a vector based on a cross product of the unit vector of the set X axis and the unit vector of the set Z axis in the workpiece coordinate system ΣWk1 as a Y axis of the workpiece coordinate system ΣWk1. As described above, the workpiece coordinate system ΣWk1 is set as a vector (VX1, VY1, VZ1) with the reference point Ps1 serving as an origin. When setting the X axis as described above, the reference point used in the setting may be changed corresponding to a position of the set reference point. For example, when positions of the reference point Ps2 and the reference point Ps3 are switched, the X axis of the workpiece coordinate system ΣWk1 may be set by a unit vector extending toward the reference point Ps2.

An example of setting the workpiece coordinate system ΣWk2 in an inspection step is the same as the example described above, and the inspection control device 5 sets the workpiece coordinate system ΣWk2 based on the three reference points on the workpiece fixing base PsF. In the setting of the workpiece coordinate system ΣWk2, the inspection control device 5 sets the workpiece coordinate system ΣWk2 by matching a tip portion of the shape detection unit 500 with each of the three reference points Ps1, Ps2, and Ps3.

Figure 10A:
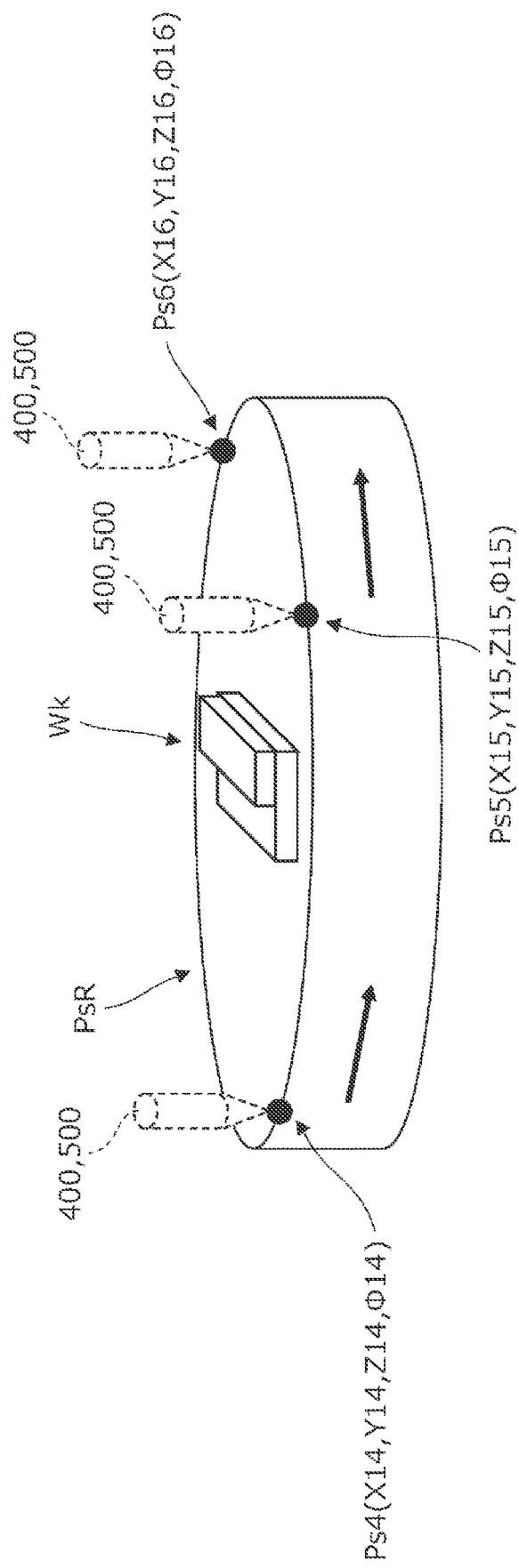
FIG. 10A shows an example of setting coordinates of each of a plurality of reference points on a positioner.
Figure 10B:
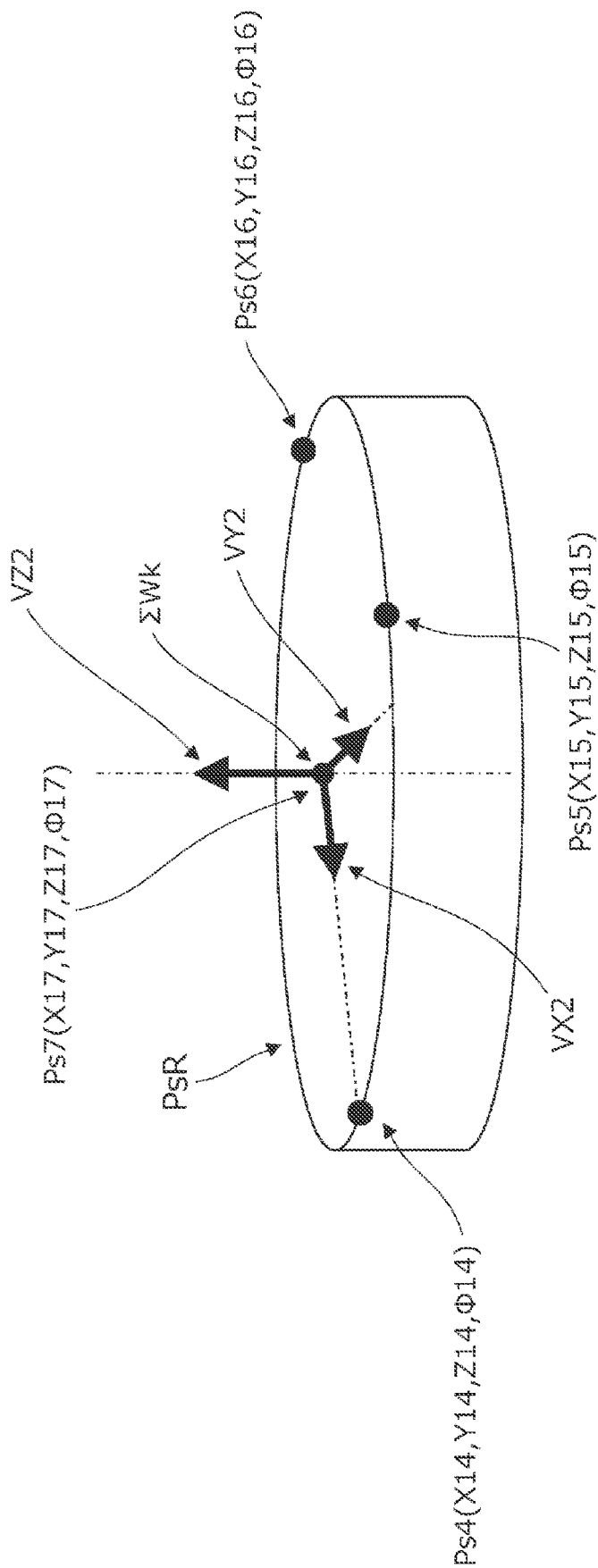
FIG. 10B is a diagram showing an example of setting a coordinate system on the positioner.

An example of setting a coordinate system when the workpiece Wk1 is fixed to the positioner PsR will be described with reference to FIGS. 10A and 10B. FIG. 10A is a diagram showing an example of setting coordinates of each of a plurality of reference points Ps4, Ps5, and Ps6 on the positioner PsR. FIG. 10B is a diagram showing an example of setting a coordinate system on the positioner PsR. The positioner PsR rotates while fixing the workpiece Wk1 fixed on the positioner PsR, so that a position and a posture of the positioner PsR can be changed in order to facilitate a welding corresponding to a welded portion. The repair control device 2 sets the workpiece coordinate system ΣWk1 in the repair welding step based on the relative positional relationship between the manipulator 200a and the positioner PsR. The inspection control device 5 sets the workpiece coordinate system ΣWk2 in the inspection step based on the relative positional relationship between the manipulator 200b and the positioner PsR.

Hereinafter, an example of setting the workpiece coordinate system ΣWk1 in the repair control device 2 will be described.

The robot control unit 26 in the repair control device 2 controls the manipulator 200a to maintain a posture of the welding torch 400 held by the manipulator 200a in a manner of being perpendicular to the positioner PsR. The robot control unit 26 sets the reference point Ps4 having coordinates (X14, Y14, Z14) at a peripheral portion of the positioner PsR. The robot control unit 26 measures a rotation angle Φ14 when the welding torch 400 is positioned perpendicular to the reference point Ps4 on the positioner PsR with reference to an initial rotation angle (an angle at the time of initial setting) of the welding torch 400 held by the manipulator 200a. Further, the robot control unit 26 associates the set coordinates with the measured rotation angle, and stores the reference point Ps4 having the coordinates (X14, Y14, Z14, Φ14) in the memory 22.

After the coordinates (X14, Y14, Z14, Φ14) of the reference point Ps4 are stored, the robot control unit 26 measures coordinates (X15, Y15, Z15) at another reference point Ps5 at a peripheral portion of the same positioner PsR with reference to the coordinates (X14, Y14, Z14, Φ14) of the reference point Ps4. The robot control unit 26 measures a rotation angle Φ15 when the welding torch 400 is positioned perpendicular to the reference point Ps5 on the positioner PsR with reference to an initial rotation angle (an angle at the time of initial setting) of the welding torch 400 held by the manipulator 200a. Further, the robot control unit 26 associates the set coordinates with the measured rotation angle, and stores the reference point Ps5 having the coordinates (X15, Y15, Z15, Φ15) in the memory 22.

After the coordinates (X15, Y15, Z15, Φ15) of the reference point Ps5 are stored, the robot control unit 26 measures coordinates (X16, Y16, Z16) at another reference point Ps6 at a peripheral portion of the same positioner PsR with reference to the coordinates (X14, Y14, Z14, Φ14) of the reference point Ps4. The robot control unit 26 measures a rotation angle Φ16 when the welding torch 400 is positioned perpendicular to the reference point Ps6 on the positioner PsR with reference to an initial rotation angle (an angle at the time of initial setting) of the welding torch 400 held by the manipulator 200a. Further, the robot control unit 26 associates the set coordinates with the measured rotation angle, and stores the reference point Ps6 having the coordinates (X16, Y16, Z16, Φ16) in the memory 22.

The robot control unit 26 calculates coordinates (X17, Y17, Z17, Φ17) of a rotation center Ps7 of the positioner PsR based on the coordinates of each of the three reference points Ps4, Ps5, Ps6 located at peripheral portions of the positioner PsR.

The robot control unit 26 calculates a plane on the positioner PsR based on the coordinates of each of the three reference points Ps4, Ps5, and Ps6, and sets a unit vector in a normal vector that passes through the rotation center Ps7 of the positioner PsR and is normal to the plane as a Z axis of the workpiece coordinate system ΣWk1. The robot control unit 26 sets a unit vector that passes through the rotation center Ps7 of the positioner PsR and extends toward the reference point Ps4 as an X axis of the workpiece coordinate system ΣWk1.

The robot control unit 26 sets a vector based on a cross product of the unit vector of the set X axis and the unit vector of the set Z axis in the workpiece coordinate system ΣWk1 as a Y axis of the workpiece coordinate system ΣWk1. As described above, the workpiece coordinate system ΣWk1 is set as a vector (VX2, VY2, VZ2) with the rotation center Ps7 serving as an origin.

An example of setting the workpiece coordinate system ΣWk2 in the inspection step is the same as the example described above, and the inspection control device 5 sets the workpiece coordinate system ΣWk2 based on the three reference points Ps4, Ps5, and Ps6 on the positioner PsR (that is, the relative positional relationship between the manipulator 200a and the positioner PsR).

Figure 11A:
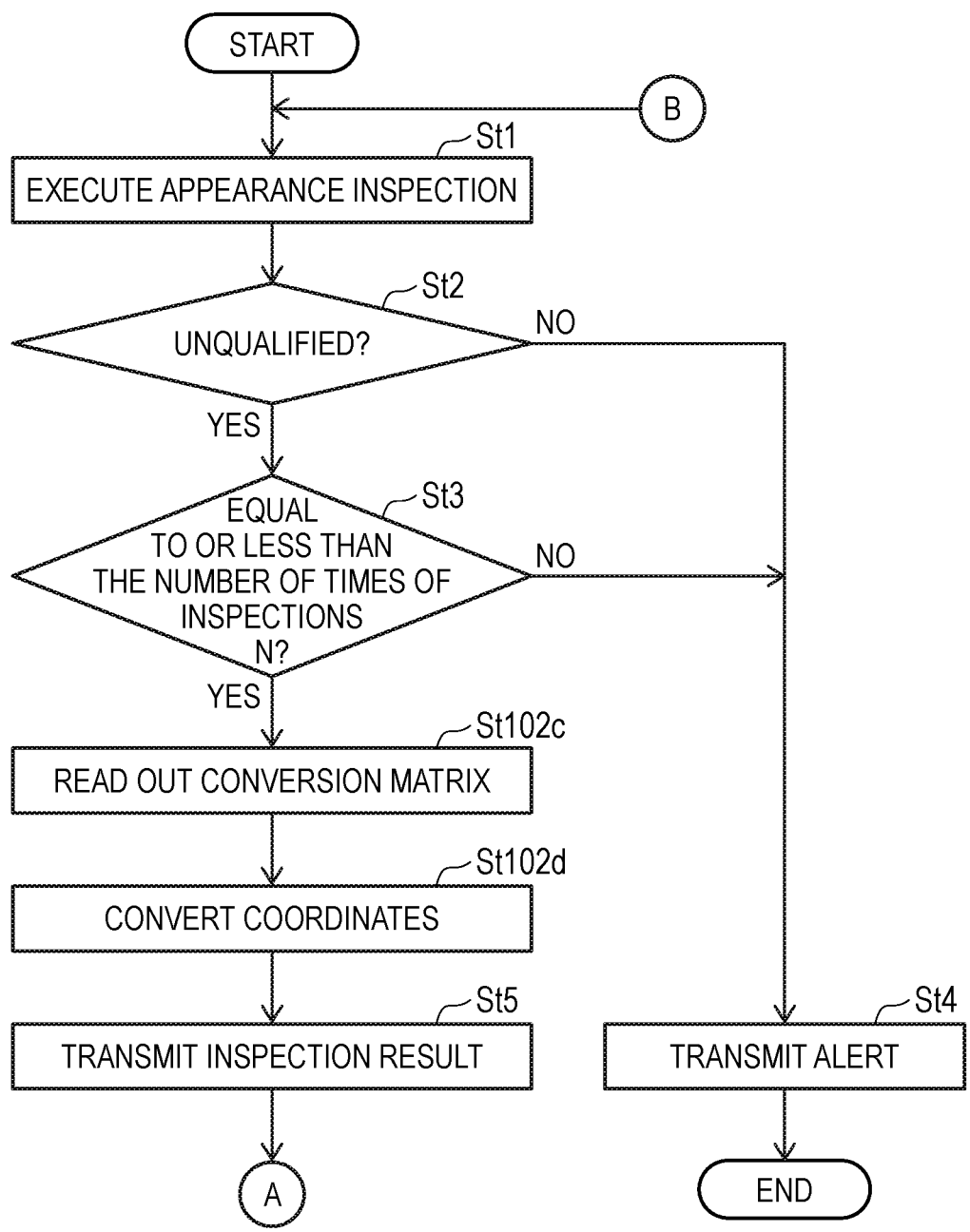
FIG. 11A is a flowchart showing an example of an operation procedure of an inspection control device and an inspection device according to the first modification of the first embodiment.
Figure 11B:
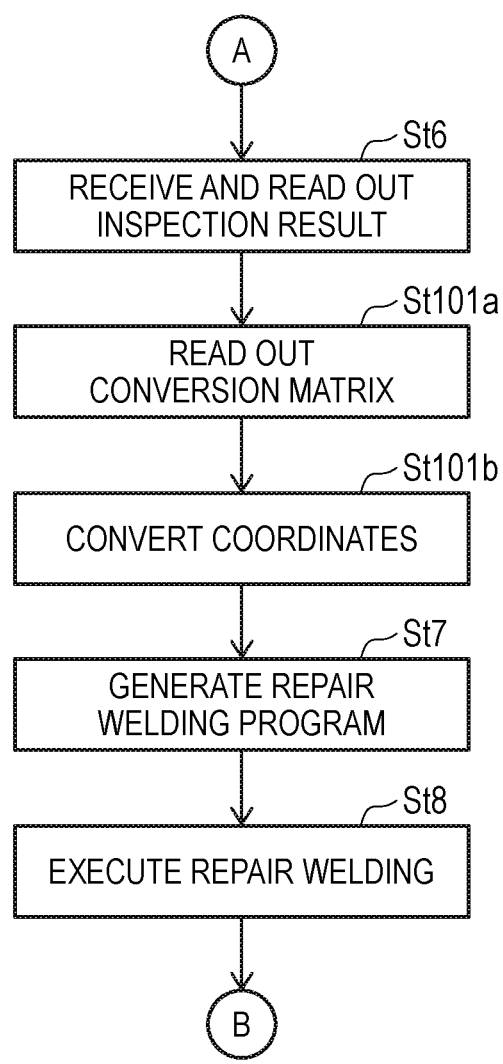
FIG. 11B is a flowchart showing an example of an operation procedure of a repair control device according to the first modification of the first embodiment.

An example of an operation procedure of the welding system 1000 according to the first modification of the first embodiment will be described with reference to FIGS. 11A and 11B. FIG. 11A is a flowchart showing an example of an operation procedure of the inspection control device 5 and the inspection device 3 according to the first modification of the first embodiment. FIG. 11B is a flowchart showing an example of an operation procedure of the repair control device 2 according to the first modification of the first embodiment.

First, an example of an operation procedure of the inspection control device 5 and the inspection device 3 will be described. Since processings in step St1 to step St4 in the example of an operation procedure of the inspection control device 5 and the inspection device 3 are the same as those in the example of the operation procedure according to the first embodiment, description thereof will be omitted.

When it is determined that the current number of times of inspections on the workpiece Wk2 is equal to or less than N (St3, YES) based on the determination result of the processing in step St3, the inspection device 3 transmits an inspection result including position information of a defective portion, a defect factor, and the like to the inspection control device 5. The inspection control device 5 reads out a plurality of conversion matrices $S_1$ and $S_2$ so as to convert the received position information of a defective portion based on the inspection coordinate system ΣW2 into position information of a defective portion based on the repair welding coordinate system ΣW1 (St102c).

The inspection control device 5 converts the position information of a defective portion based on the inspection coordinate system ΣW2 into the position information of a defective portion based on the workpiece coordinate system ΣWk2 by using the conversion matrix $S_1$ that was read out. Further, the inspection control device 5 converts the position information of a defective portion based on the workpiece coordinate system ΣWk2 into the position information of a defective portion based on the workpiece coordinate system ΣWk1 by using the conversion matrix $S_2$ that was read out (St102d).

Here, a method for converting the position information based on the inspection coordinate system ΣW2 into the position information based on the repair welding coordinate system ΣW1 by the inspection control device 5 and the repair control device 2 will be described. (Expression 2), (Expression 3), and (Expression 4) are each a conversion determinant for converting the position information based on the inspection coordinate system ΣW2 into the position information based on the repair welding coordinate system ΣW1. Coordinates $W_1$ are a matrix indicating position information (coordinates) of a defective portion based on the repair welding coordinate system ΣW1. Coordinates $V_1$ are a matrix indicating position information (coordinates) of a defective portion based on the workpiece coordinate system ΣWk1 in the repair welding step. Coordinates $V_2$ are a matrix indicating position information (coordinates) of a defective portion based on the workpiece coordinate system ΣWk2 in the inspection step. Coordinates $W_2$ are a matrix indicating position information (coordinates) of a defective portion based on the inspection coordinate system ΣW2. The conversion matrix $S_1$ is a conversion matrix for converting the position information of a defective portion based on the inspection coordinate system ΣW2 into the position information of a defective portion based on the repair welding coordinate system ΣW1.

The (Expression 2) is a determinant for converting the position information based on the inspection coordinate system ΣW2 into the position information based on the workpiece coordinate system ΣWk2 in the inspection step. The (Expression 3) is a determinant for converting the position information based on the workpiece coordinate system ΣWk2 in the inspection step into the position information based on the workpiece coordinate system ΣWk1 in the repair welding step. The (Expression 4) is a determinant for converting the position information based on the workpiece coordinate system ΣWk1 in the repair welding step into the position information based on the repair welding coordinate system ΣW1.

The conversion matrix $S_1$ is derived based on the inspection coordinate system ΣW2 and the workpiece coordinate system ΣWk2 that are preset. The conversion matrix $S_2$ is derived based on the workpiece coordinate system ΣWk2 and the workpiece coordinate system ΣWk1 that are preset. A conversion matrix $S_3$ is derived based on the workpiece coordinate system ΣWk1 and the repair welding coordinate system ΣW1 that are preset. The plurality of the derived conversion matrices $S_1$ and $S_2$ are stored in and are referred to by the inspection control device 5. The derived conversion matrix $S_3$ is stored in and is referred to by the repair control device 2.

[Expression 2]

$$V_2 = S_1 W_2 \quad (2)$$

[Expression 3]

$$V_1 = S_2 V_2 \quad (3)$$

[Expression 4]

$$W_1 = S_3 V_1 \quad (4)$$

Although an example is described in the conversion processing of the position information of a defective portion shown in step St102d, in which the inspection control device 5 converts the position information of a defective portion based on the workpiece coordinate system ΣWk2 into the position information of a defective portion based on the workpiece coordinate system ΣWk1, the present invention is not limited thereto. For example, the inspection control device 5 may transmit the position information of a defective portion based on the workpiece coordinate system ΣWk2 to the repair control device 2.

On the other hand, when it is determined that the current number of times of inspections on the workpiece Wk2 is not equal to or less than N times (St3, NO) based on the determination result of the processing in step St3, the inspection device 3 generates an alert for notifying that it is difficult to correct the defective portion even when a repair welding is executed for the current number of times. The inspection device 3 transmits the generated alert to the upper-level device 1 via the inspection control device 5. The alert transmitted to the upper-level device 1 is displayed on the monitor MN1 and a user is notified of the alert (St4). When the processing proceeds to the processing in step St4, the inspection device 3 ends the inspection on the workpiece Wk2.

The inspection control device 5 generates an inspection result including the converted position information of the defective portion based on the workpiece coordinate system ΣWk1, a defect factor, and the like, and transmits the inspection result to the repair control device 2 via the upper-level device 1 (St5).

As described above, the inspection device 3 in the welding system 1000 according to the first modification of the first embodiment ends the inspection on the welded portion. Next, an example of an operation procedure of the repair control device 2 will be described. Since processings in step St7 to step St8 in the example of an operation procedure of the repair control device 2 are the same as those in the example of the operation procedure according to the first embodiment, description thereof will be omitted.

The repair control device 2 receives and reads out the inspection result including the position information of a defective portion based on the workpiece coordinate system ΣWk1 converted by the inspection control device 5, the defect factor, and the like (St6).

The repair control device 2 reads out the conversion matrix $S_3$ so as to convert the position information of a defective portion based on the workpiece coordinate system ΣWk1 included in the received inspection result into the position information of a defective portion based on the repair welding coordinate system ΣW1 (St101a).

The inspection control device 5 converts the position information of a defective portion based on the workpiece coordinate system ΣWk1 into the position information of a defective portion based on the repair welding coordinate system ΣW1 by using the conversion matrix $S_3$ that was read out (St101b).

Although an example is described in the conversion processing of the position information shown in step St101b, in which the repair control device 2 converts the position information of a defective portion based on the workpiece coordinate system ΣWk2 into the position information of a defective portion based on the repair welding coordinate system ΣW1, the present invention is not limited thereto. For example, the repair control device 2 may receive the position information of a defective portion based on the workpiece coordinate system ΣWk2 from the inspection control device 5, and may execute a processing of converting the position information of a defective portion based on the workpiece coordinate system ΣWk2 into the position information of a defective portion based on the workpiece coordinate system ΣWk1.

As described above, the repair control device 2 in the welding system 1000 according to the first modification of the first embodiment ends the repair welding on the defective portion. After the processing in step St8 is completed, the processing proceeds to the processing in step St1, and the welding system 1000 causes the inspection device 3 to execute an inspection on the welded portion again. At this time, the inspection device 3 may inspect only the welded portion subjected to the repair welding.

Second Embodiment

In the welding system 1000 according to the first embodiment, the inspection control device 5 converts the position information of a defective portion based on the inspection coordinate system ΣW2 into the position information of a defective portion based on the repair welding coordinate system ΣW1. In the welding system 1000 according to a second embodiment, the repair control device 2 converts the position information of a defective portion based on the inspection coordinate system ΣW2 into the position information of a defective portion based on the repair welding coordinate system ΣW1.

Figure 12:
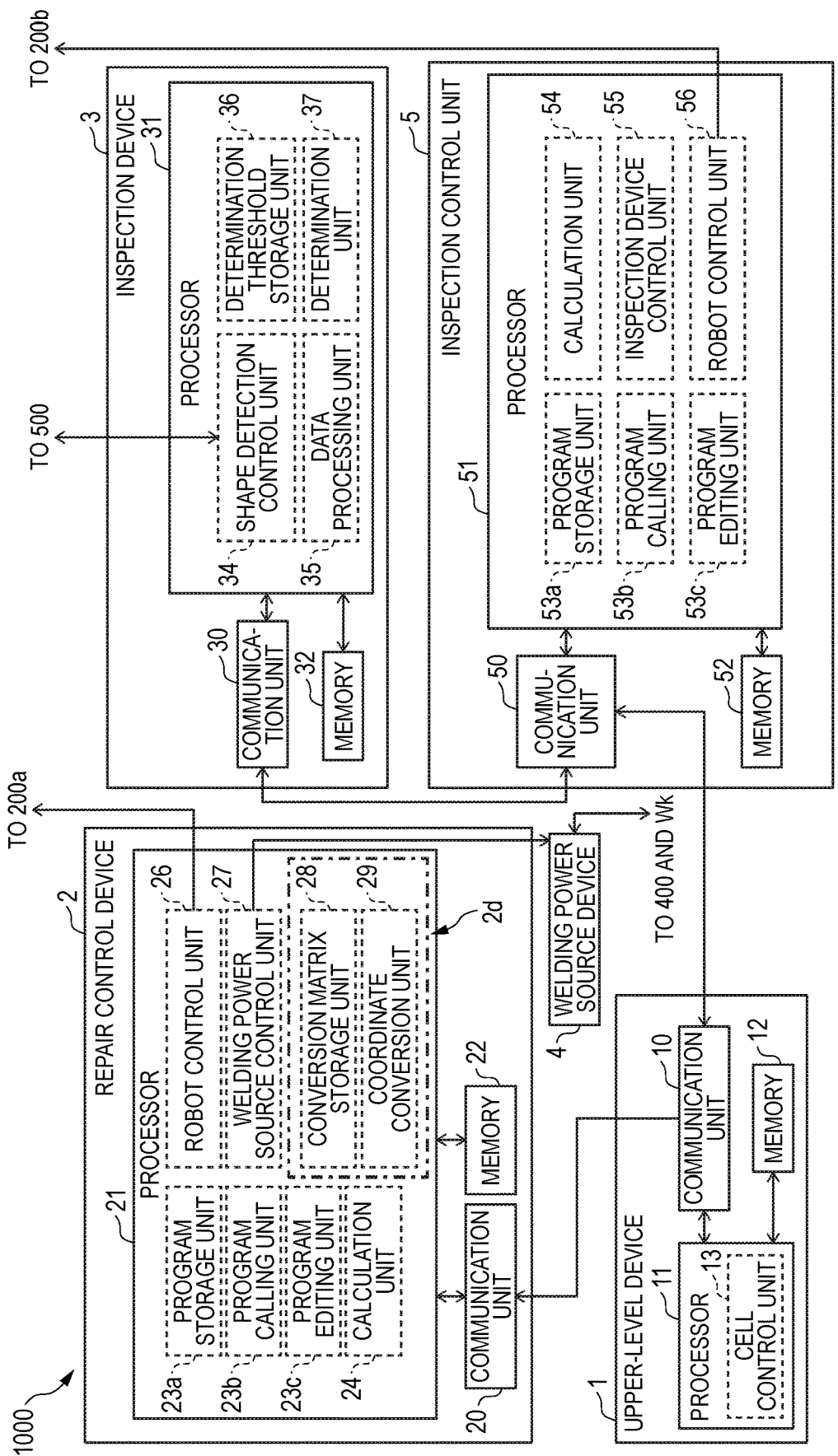
FIG. 12 is a diagram showing an example of an internal configuration of a welding system according to a second embodiment.

FIG. 12 is a diagram showing an example of an internal configuration of the welding system 1000 according to the second embodiment. The internal configuration of the welding system 1000 according to the first modification of the first embodiment is substantially the same as the internal configuration of the welding system 1000 according to the first embodiment. Since the same components as those in the first embodiment are denoted by the same reference numerals, description thereof will be omitted.

The repair control device 2 according to the second embodiment further includes the conversion unit 2d. The repair control device 2 receives setting information of the inspection coordinate system ΣW2 from the inspection control device 5.

The conversion matrix storage unit 28 stores the set repair welding coordinate system ΣW1 and the inspection coordinate system ΣW2, and a conversion matrix capable of converting position information of a defective portion based on the repair welding coordinate system ΣW1 into position information of a defective portion based on the inspection coordinate system ΣW2.

The coordinate conversion unit 29 can convert the position information based on the inspection coordinate system ΣW2 received from the inspection control device 5 to be described later into the position information based on the repair welding coordinate system ΣW1 with reference to the conversion matrix storage unit 28.

Figure 13A:
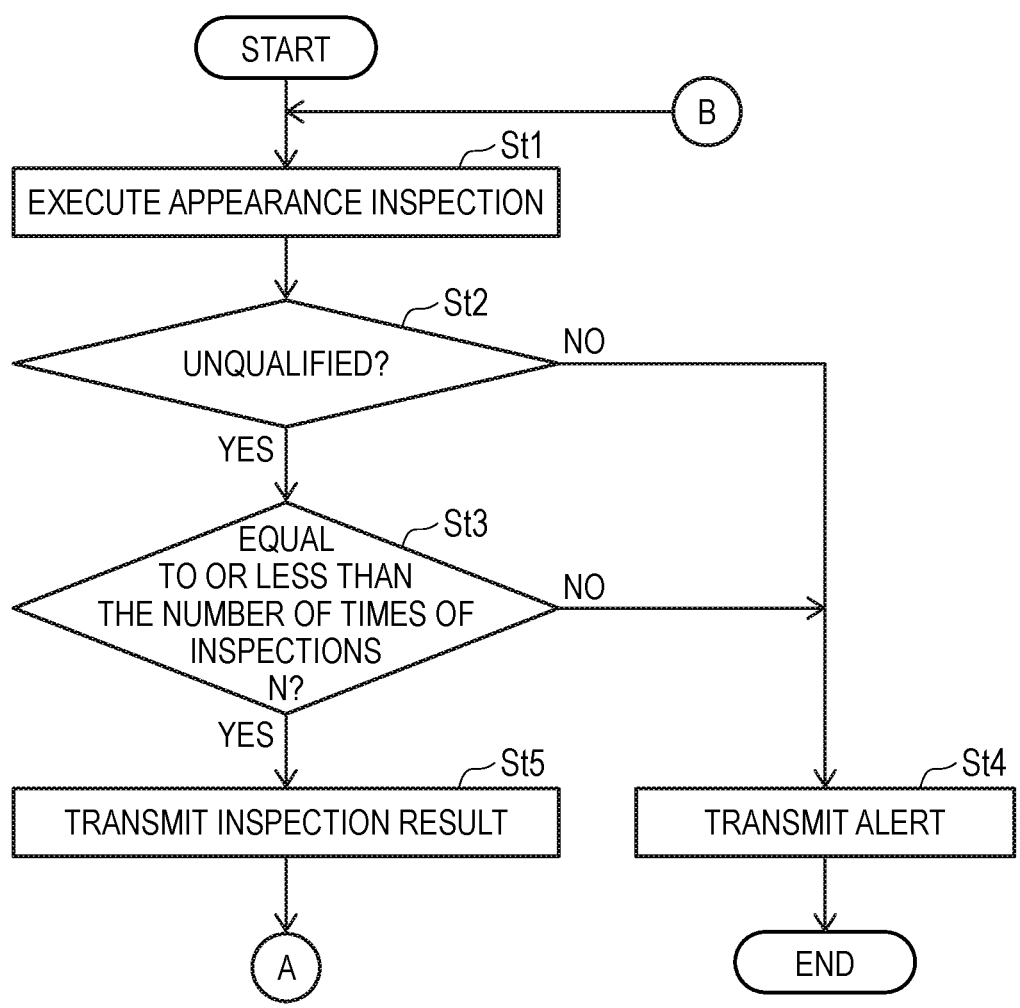
FIG. 13A is a flowchart showing an example of an operation procedure of an inspection control device and an inspection device according to the second embodiment.
Figure 13B:
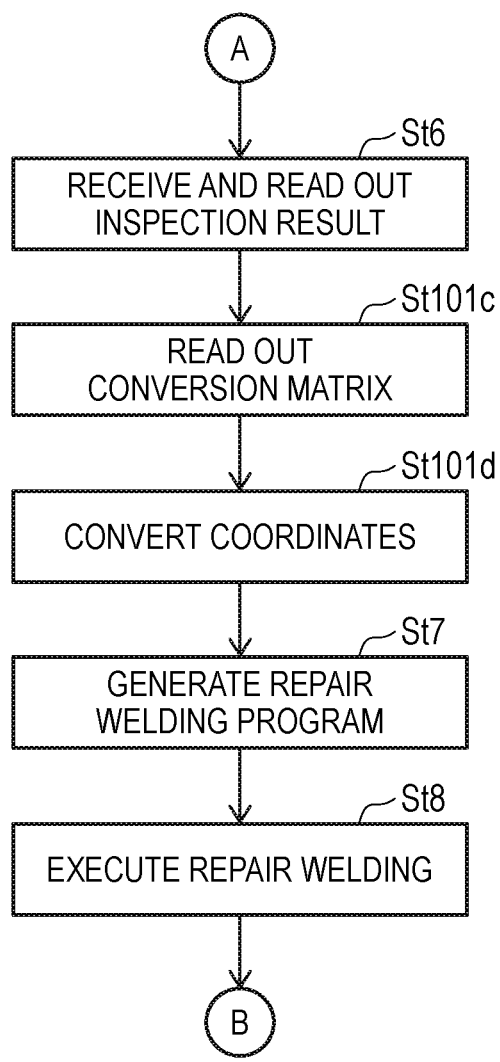
FIG. 13B is a flowchart showing an example of an operation procedure of a repair control device according to the second embodiment.

An example of an operation procedure of the welding system 1000 according to the second embodiment will be described with reference to FIGS. 13A and 13B. FIG. 13A is a flowchart showing an example of an operation procedure of the inspection control device 5 and the inspection device 3 according to the second embodiment. FIG. 13B is a flowchart showing an example of an operation procedure of the repair control device 2 according to the second embodiment.

Since processings in step St102a and step St 102b in the first embodiment is no longer necessary, and processings in step St1 to step St4 in the example of an operation procedure of the inspection control device 5 and the inspection device 3 are the same as those in the example of the operation procedure according to the first embodiment, description thereof will be omitted.

The inspection control device 5 transmits the inspection result that includes the position information of a defective portion based on the inspection coordinate system ΣW2, the defect factor, and the like and that is received from the inspection device 3 to the repair control device 2 via the upper-level device 1 (St5).

The repair control device 2 receives and reads out the inspection result that includes the position information of a defective portion based on the inspection coordinate system ΣW2, the defect factor, and the like and that is received from the inspection control device 5(St6).

The repair control device 2 reads out the conversion matrix R so as to convert the received position information of a defective portion based on the inspection coordinate system ΣW2 into the position information of a defective portion based on the repair welding coordinate system ΣW1 (St101c).

The repair control device 2 converts the position information of a defective portion based on the inspection coordinate system ΣW2 into the position information of a defective portion based on the repair welding coordinate system ΣW1 using the conversion matrix R that was read out (St101d).

Here, since a method for converting the position information based on the inspection coordinate system ΣW2 into the position information based on the repair welding coordinate system ΣW1 is the same as the conversion method using the (Expression 1) described in the processing of step St102b in the flowchart shown in FIG. 6A, description thereof will be omitted.

The repair control device 2 calls and edits a repair welding program based on the inspection result converted in the processing in step St101c, and generates the repair welding program corresponding to a defective portion (St7).

The repair control device 2 controls the manipulator 200a, the wire feeding device 300, and the welding power source device 4 based on the generated repair welding program (St8).

As described above, the repair control device 2 in the welding system 1000 according to the second embodiment ends the repair welding on the defective portion. After the processing in step St8 is completed, the processing proceeds to the processing in step St1, and the welding system 1000 causes the inspection device 3 to execute an inspection on the welded portion again. At this time, the inspection device 3 may inspect only the welded portion subjected to the repair welding. Accordingly, the repair control device 2 in the welding system 1000 according to the second embodiment can execute an inspection and a repair welding by different robots, and can execute a repair welding even when the inspection control device 5 does not convert position information into position information in a welding robot coordinate system.

Third Embodiment

In the welding system 1000 according to the first embodiment, the first modification of the first embodiment, and the second embodiment, the position information of a defective portion is converted by one of the inspection control device 5 and the repair control device 2, or is converted by both the inspection control device 5 and the repair control device 2. In the welding system 1000 according to a third embodiment, the upper-level device 1 that controls the repair control device 2 and the inspection control device 5 converts the position information of a defective portion based on the inspection coordinate system ΣW2 into the position information of a defective portion based on the repair welding coordinate system ΣW1 by the repair control device 2.

In the following description, a case where an inspection step and a repair welding step are executed in different steps (that is, the inspection robot MC2 and the repair welding robot MC3 execute processings in different cells) will be described with reference to the drawings.

Figure 14:
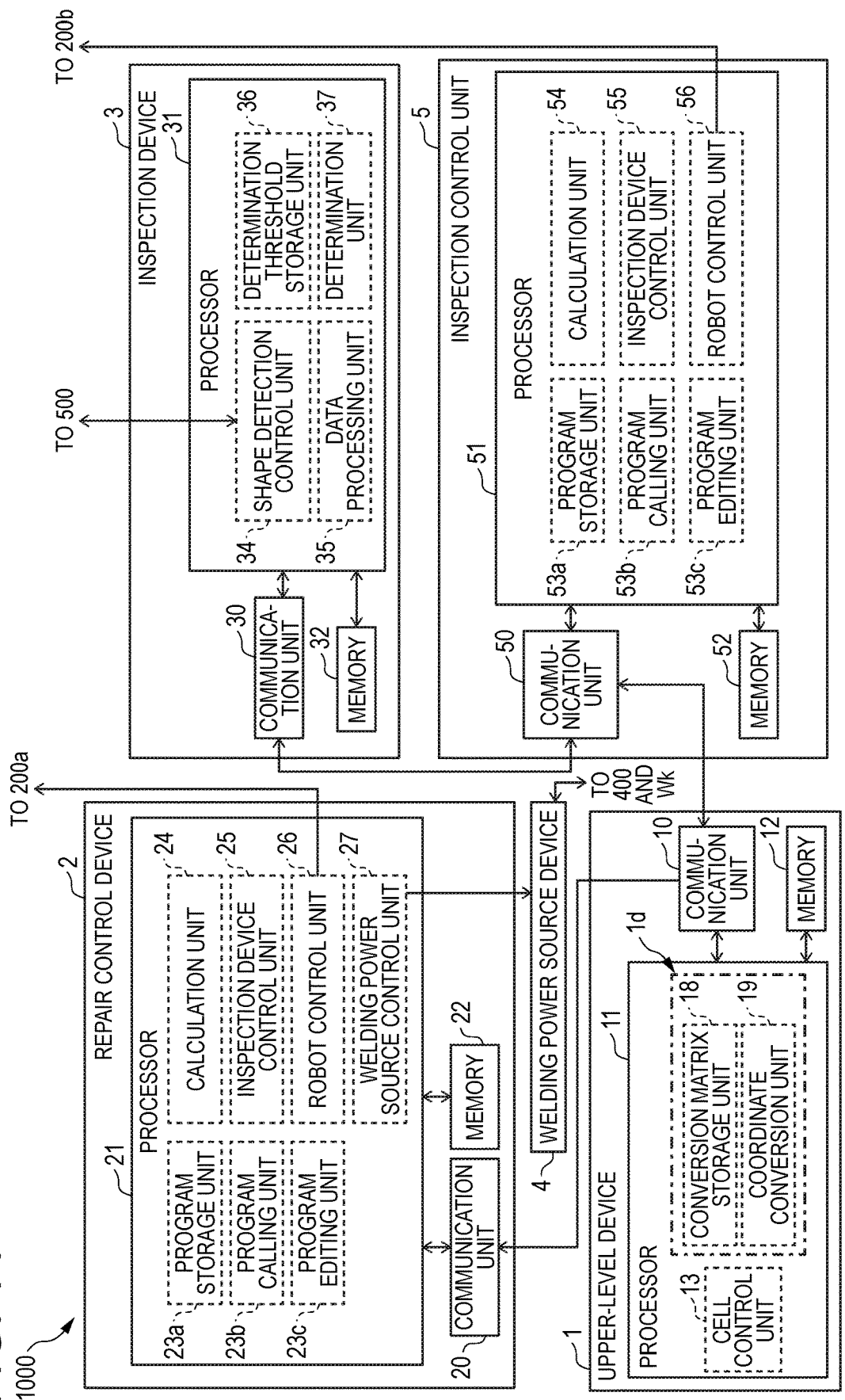
FIG. 14 is a diagram showing an example of an internal configuration of a welding system according to a third embodiment.

FIG. 14 is a diagram showing an example of an internal configuration of the welding system 1000 according to the third embodiment. The internal configuration of the welding system 1000 according to the third embodiment is substantially the same as the internal configuration of the welding system 1000 according to the first embodiment, the first modification of the first embodiment, and the second embodiment. Since the same components as those in the first embodiment, the first modification of the first embodiment, and the second embodiment are denoted by the same reference numerals, description thereof will be omitted.

The upper-level device 1 acquires the inspection coordinate system $\Sigma W2$ preset in the inspection robot MC2 and the repair welding coordinate system $\Sigma W1$ preset in the repair welding robot MC3, and stores the coordinate systems in the memory 12.

When the inspection step and the repair welding step are executed in different steps (that is, the inspection robot MC2 and the repair welding robot MC3 execute processings in different cells), the upper-level device 1 further acquires the workpiece coordinate system $\Sigma Wk1$ in the repair welding step and the workpiece coordinate system $\Sigma Wk2$ in the inspection step, and stores the acquired workpiece coordinate system $\Sigma Wk1$ and the workpiece coordinate system $\Sigma Wk2$ in the memory 12.

The upper-level device 1 according to the third embodiment further includes a conversion unit 1d.

The conversion unit 1d converts the position information of a defective portion based on the inspection coordinate system $\Sigma W2$ into the position information of a defective portion based on the repair welding coordinate system $\Sigma W1$ according to the repair welding coordinate system $\Sigma W1$ and the inspection coordinate system $\Sigma W2$ preset for each robot. The conversion unit 1d includes a conversion matrix storage unit 18 and a coordinate conversion unit 19.

The conversion matrix storage unit 18 stores a conversion matrix capable of converting the position information of a defective portion based on the preset inspection coordinate system $\Sigma W2$ into the position information of a defective portion based on the repair welding coordinate system $\Sigma W1$.

The coordinate conversion unit 19 refers to the conversion matrix storage unit 18 to convert the position information of a defective portion based on the inspection coordinate system $\Sigma W2$ into the position information of a defective portion based on the repair welding coordinate system $\Sigma W1$.

When the inspection step and the repair welding step are executed in different steps (that is, the inspection robot MC2 and the repair welding robot MC3 execute processings in different cells), a conversion processing of workpiece coordinate systems is added to the conversion processing in the conversion unit 1d described above. Specifically, the conversion unit 1d converts the position information of a defective portion based on the inspection coordinate system $\Sigma W2$ into the position information of a defective portion based on the workpiece coordinate system $\Sigma Wk2$, further converts the position information of a defective portion based on the workpiece coordinate system $\Sigma Wk2$ into the position information of a defective portion based on the workpiece coordinate system $\Sigma Wk1$, and then converts the position information of a defective portion based on the workpiece coordinate system $\Sigma Wk1$ into the position information of a defective portion based on the repair welding coordinate system $\Sigma W1$.

Figure 15A:
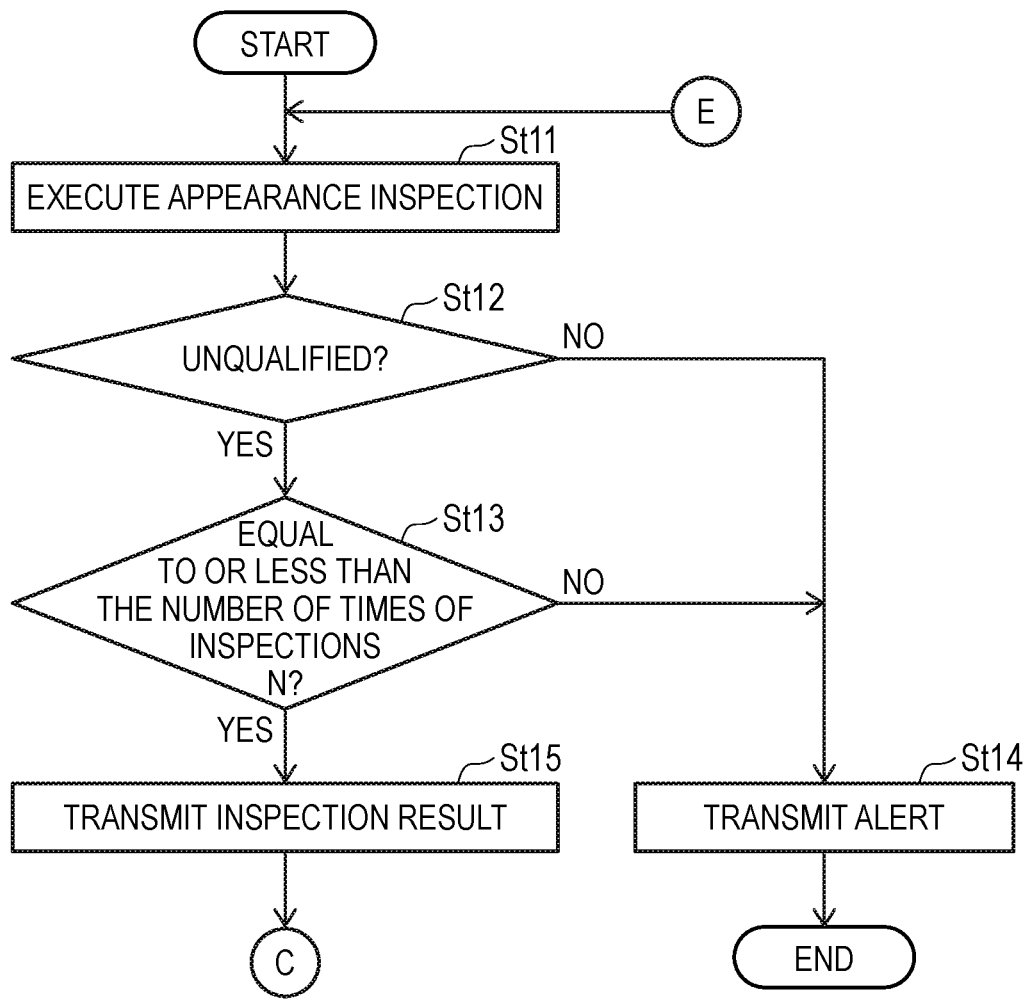
FIG. 15A is a flowchart showing an example of an operation procedure of an inspection control device and an inspection device according to the third embodiment.
Figure 15B:
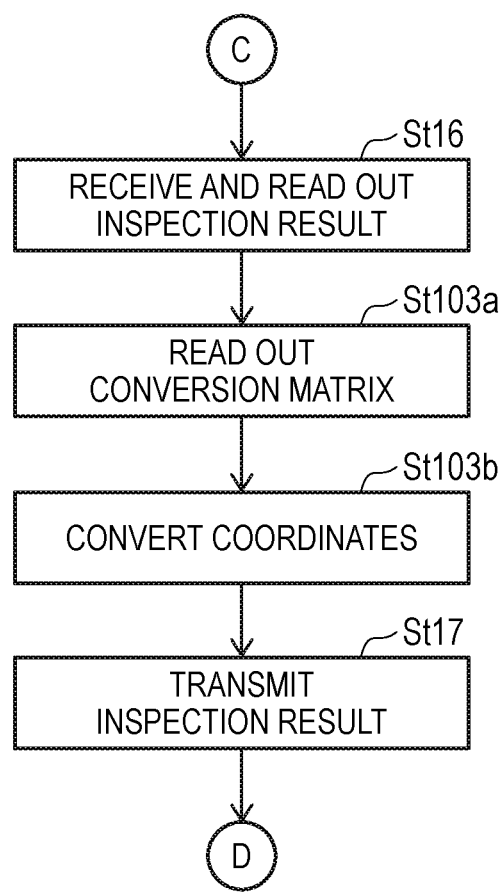
FIG. 15B is a flowchart showing an example of an operation procedure of an upper-level device according to the third embodiment.
Figure 15C:
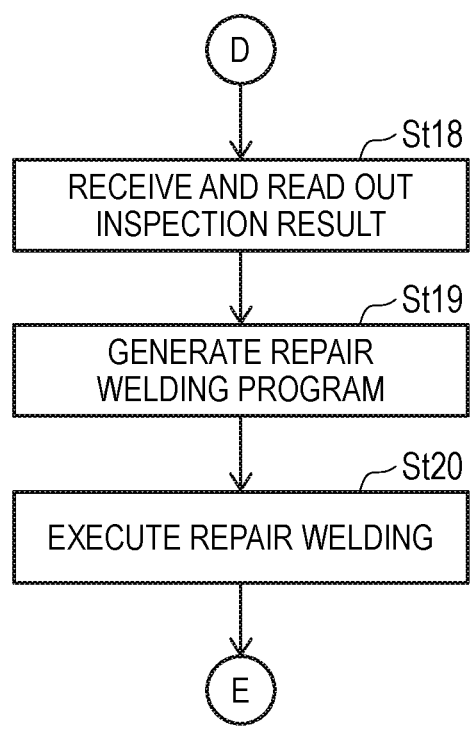
FIG. 15C is a flowchart showing an example of an operation procedure of a repair control device according to the third embodiment.

An example of an operation procedure of the welding system 1000 according to the third embodiment will be described with reference to FIGS. 15A, 15B, and 15C. FIG. 15A is a flowchart showing an example of an operation procedure of the inspection control device 5 and the inspection device 3 according to the third embodiment. FIG. 15B is a flowchart showing an example of an operation procedure of the upper-level device 1 according to the third embodiment. FIG. 15C is a flowchart showing an example of an operation procedure of the repair control device 2 according to the third embodiment.

First, an example of an operation procedure of the inspection control device 5 and the inspection device 3 will be described.

The inspection device 3 executes an appearance inspection on the workpiece Wk2 after a welding based on an inspection condition set for each welded portion received from the upper-level device 1 (St11). Specifically, the inspection device 3 inspects (determines) whether there is a defective portion in the welded portions based on the inspection condition and the image data that is generated based on the shape data of a weld bead received from the shape detection unit 500.

The inspection device 3 determines whether there is a defective portion (unqualified portion) that does not satisfy the inspection condition in the welded portions (St12).

When it is determined that there is a defective portion (unqualified portion) (St12, YES) based on a determination result of the processing in step St12, the inspection device 3 determines whether the current number of times of inspections on the workpiece Wk2 is equal to or less than the number of times of inspections N serving as an upper limit value of the number of times of inspections set by a user (St13).

On the other hand, when it is determined that there is no defective portion (unqualified portion) (St12, NO) based on the determination result of the processing in step St12, the inspection device 3 generates an alert for notifying that there is no defective portion and there is no need to execute a repair welding. The inspection device 3 transmits the generated alert to the upper-level device 1 via the inspection control device 5. The alert transmitted to the upper-level device 1 is displayed on the monitor MN1 and a user is notified of the alert (St14). When the processing proceeds to the processing in step St14, the inspection device 3 ends the inspection on the workpiece Wk2.

On the other hand, when it is determined that the current number of times of inspections on the workpiece Wk2 is not equal to or less than N times (St13, NO) based on the determination result of the processing in step St13, the inspection device 3 generates an alert for notifying that it is difficult to correct the defective portion even when a repair welding is executed for the current number of times. The inspection device 3 transmits the generated alert to the upper-level device 1 via the inspection control device 5. The alert transmitted to the upper-level device 1 is displayed on the monitor MN1 and a user is notified of the alert (St14). When the processing proceeds to the processing in step St14, the inspection device 3 ends the inspection on the workpiece Wk2.

The inspection control device 5 generates an inspection result including the converted position information of the defective portion based on the repair welding coordinate system $\Sigma W1$, a defect factor, and the like, and transmits the inspection result to the repair control device 2 via the upper-level device 1 (St15).

As described above, the inspection control device 5 and the inspection device 3 in the welding system 1000 according to the third embodiment end the inspection on the welded portion. Next, an example of an operation procedure of the upper-level device 1 will be described.

The upper-level device 1 receives and reads the inspection result including the position information of a defective portion based on the inspection coordinate system ΣW2, the defect factor, and the like from the inspection control device 5 (St16).

The upper-level device 1 reads out the conversion matrix R so as to convert the received position information of a defective portion based on the inspection coordinate system ΣW2 into the position information of a defective portion based on the repair welding coordinate system ΣW1 (St103*a*).

The upper-level device 1 converts the position information of a defective portion based on the inspection coordinate system ΣW2 into the position information of a defective portion based on the repair welding coordinate system ΣW1 by using the conversion matrix R that was read out and the (Expression 1) (St103*b*).

When the inspection step and the repair welding step are executed in different steps (that is, the inspection robot MC2 and the repair welding robot MC3 execute processings in different cells), the upper-level device 1 reads the plurality of conversion matrices $S_1$, $S_2$, and $S_3$ in the processing in step St103*a*. Further, the upper-level device 1 converts the position information of a defective portion based on the inspection coordinate system ΣW2 into the position information of a defective portion based on the repair welding coordinate system ΣW1 by using the plurality of conversion matrices $S_1$, $S_2$, and $S_3$ and the (Expression 2) to the (Expression 4).

The upper-level device 1 generates an inspection result including the converted position information of a defective portion based on the repair welding coordinate system ΣW1, a defect factor, and the like, and transmits the inspection result to the repair control device 2 (St17).

As described above, the upper-level device 1 in the welding system 1000 according to the third embodiment ends the conversion of the position information of a defective portion. Next, an example of an operation procedure of the repair control device 2 will be described.

The repair control device 2 receives and reads out the inspection result including the position information of a defective portion based on the repair welding coordinate system ΣW1 converted by the upper-level device 1, the defect factor, and the like (St18).

The repair control device 2 calls and edits a repair welding program based on the received inspection result, and generates the repair welding program corresponding to a defective portion (St19).

The repair control device 2 controls the manipulator 200*a*, the wire feeding device 300, and the welding power source device 4 based on the generated repair welding program (St20).

As described above, the repair control device 2 in the welding system 1000 according to the third embodiment ends the repair welding on the defective portion. After the processing in step St20 is completed, the processing proceeds to the processing in step St11, and the welding system 1000 causes the inspection device 3 to execute an inspection on the welded portion again. At this time, the inspection device 3 may inspect only the welded portion subjected to the repair welding.

Therefore, in the welding system 1000 according to the third embodiment, the inspection and the repair welding are respectively executed by different robots, and even when each of the robots does not have a coordinate conversion function, a repair welding can be executed by using the upper-level device 1.

First Modification of Third Embodiment

In the welding system 1000 according to the third embodiment, the upper-level device 1 that controls the repair control device 2 and the inspection control device 5 converts the position information of a defective portion in the inspection coordinate system ΣW2 into the position information of a defective portion in the repair welding coordinate system ΣW1 by the repair control device 2. In the welding system 1000 according to a first modification of the third embodiment, the inspection control device 5 and the upper-level device 1 convert position information when the inspection step and the repair welding step are executed in different steps (that is, the inspection robot MC2 and the repair welding robot MC3 execute processings in different cells).

The welding system 1000 according to the first modification of the third embodiment is not limited to a case where the inspection step and the repair welding step are executed in different steps (that is, the inspection robot MC2 and the repair welding robot MC3 execute processings in different cells), and the inspection robot MC2 and the repair welding robot MC3 may execute processings in the same step.

Figure 16:
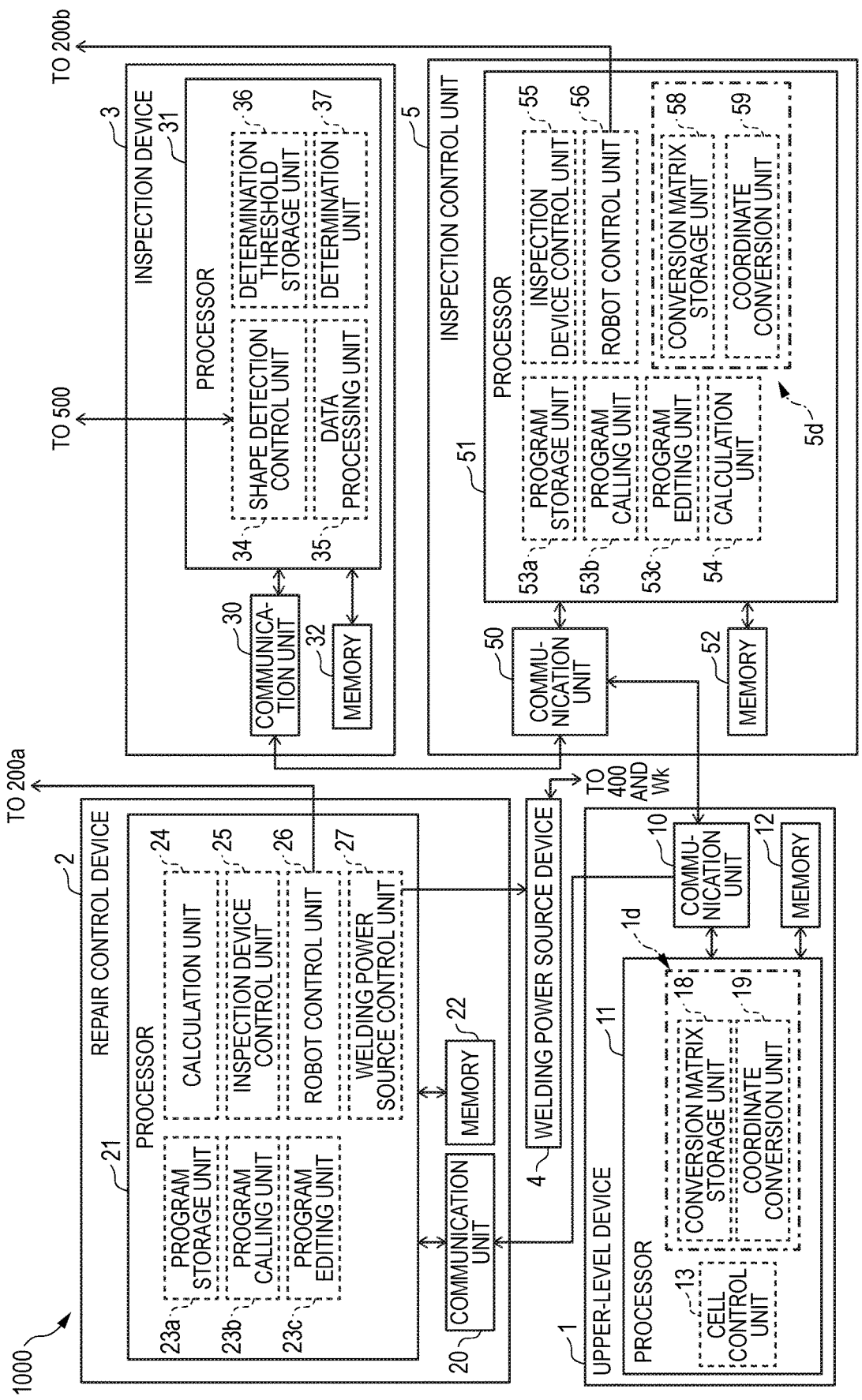
FIG. 16 is a diagram showing an example of an internal configuration of a welding system according to a first modification of the third embodiment.

FIG. 16 is a diagram showing an example of an internal configuration of the welding system 1000 according to the first modification of the third embodiment. Since the internal configuration of the welding system 1000 according to the first modification of the third embodiment is substantially the same as the internal configuration of the welding system 1000 according to the third embodiment and the same components as those in the third embodiment are denoted by the same reference numerals, description thereof will be omitted.

The upper-level device 1 acquires the workpiece coordinate system ΣWk2 in the inspection step set by the inspection control device 5, the workpiece coordinate system ΣWk1 in the repair welding step, and the repair welding coordinate system ΣW1 preset in the repair welding robot MC3, and stores these coordinate systems in the memory 12.

The upper-level device 1 according to the first modification of the third embodiment may not store the workpiece coordinate system ΣWk2 in the memory 12. In this case, the upper-level device 1 transmits the information of the workpiece coordinate system ΣWk1 to the inspection control device 5, and the inspection control device 5 converts the position information of a defective portion from the position information of a defective portion based on the workpiece coordinate system ΣWk2 into the position information of a defective portion based on the workpiece coordinate system ΣWk1.

The conversion unit 1*d* converts the position information of a defective portion based on the workpiece coordinate system ΣWk2 in the inspection step into the position information of a defective portion based on the workpiece coordinate system ΣWk1 in the repair welding step. Further, the conversion unit 1*d* converts the position information of a defective portion based on the workpiece coordinate system ΣWk1 into the position information of a defective portion based on the repair welding coordinate system ΣW1. The conversion unit 1*d* transmits the converted position information of a defective portion to the repair control device 2.

When the upper-level device 1 receives an inspection result including the position information of the defective portion based on the workpiece coordinate system ΣWk1 from the inspection control device 5, the conversion unit 1*d* may convert the position information of a defective portion based on the workpiece coordinate system ΣWk1 into the position information of a defective portion based on the repair welding coordinate system $\Sigma W1$.

The conversion matrix storage unit 18 derives and stores a conversion matrix capable of converting the position information of a defective portion based on the preset workpiece coordinate system $\Sigma Wk2$ into the position information of a defective portion based on the workpiece coordinate system $\Sigma Wk1$. The conversion matrix storage unit 18 derives and stores a conversion matrix capable of converting the position information of a defective portion based on the workpiece coordinate system $\Sigma Wk1$ into the position information of a defective portion based on the repair welding coordinate system $\Sigma W1$.

When the upper-level device 1 receives an inspection result including the position information of a defective portion based on the workpiece coordinate system $\Sigma Wk1$ from the inspection control device 5, the conversion matrix storage unit 18 may not derive and store the conversion matrix capable of converting the position information of a defective portion based on the preset workpiece coordinate system $\Sigma Wk2$ into the position information of a defective portion based on the workpiece coordinate system $\Sigma Wk1$.

The coordinate conversion unit 19 refers to the conversion matrix stored in the conversion matrix storage unit 18, converts the position information of a defective portion based on the workpiece coordinate system $\Sigma Wk2$ into the position information of a defective portion based on the workpiece coordinate system $\Sigma Wk1$, and further converts the position information of a defective portion based on the workpiece coordinate system $\Sigma Wk1$ into the position information of a defective portion based on the repair welding coordinate system $\Sigma W1$.

The inspection control device 5 stores the inspection coordinate system $\Sigma W2$ preset in the inspection robot MC2 and the workpiece coordinate system $\Sigma Wk2$ set for the workpiece Wk2 in the inspection step. The inspection control device 5 transmits information of the workpiece coordinate system $\Sigma Wk2$ to the upper-level device 1.

The conversion unit 5d converts the position information of a defective portion based on the inspection coordinate system $\Sigma W2$ preset in the inspection robot MC2 into the position information of a defective portion based on the workpiece coordinate system $\Sigma Wk2$ in the inspection step. The conversion unit 5d may further convert the position information of a defective portion based on the workpiece coordinate system $\Sigma Wk2$ in the inspection step into the position information of a defective portion based on the workpiece coordinate system $\Sigma Wk1$ in the repair welding step. The conversion unit 5d transmits the converted position information of a defective portion to the upper-level device 1.

The conversion matrix storage unit 58 derives and stores a conversion matrix capable of converting the position information of a defective portion based on the inspection coordinate system $\Sigma W2$ preset in the inspection robot MC2 into the position information of a defective portion based on the workpiece coordinate system $\Sigma Wk2$ in the inspection step. The conversion matrix storage unit 58 may derive and store a conversion matrix capable of converting the position information of a defective portion based on the workpiece coordinate system $\Sigma Wk2$ in the inspection step into the position information of a defective portion based on the workpiece coordinate system $\Sigma Wk1$ in the repair welding step.

The coordinate conversion unit 59 converts the position information of a defective portion based on the inspection coordinate system $\Sigma W2$ into the position information of a defective portion based on the workpiece coordinate system $\Sigma Wk2$ with reference to the conversion matrix stored in the conversion matrix storage unit 58. The coordinate conversion unit 59 may convert the position information of a defective portion based on the workpiece coordinate system $\Sigma Wk2$ into the position information of a defective portion based on the workpiece coordinate system $\Sigma Wk1$.

Figure 17A:
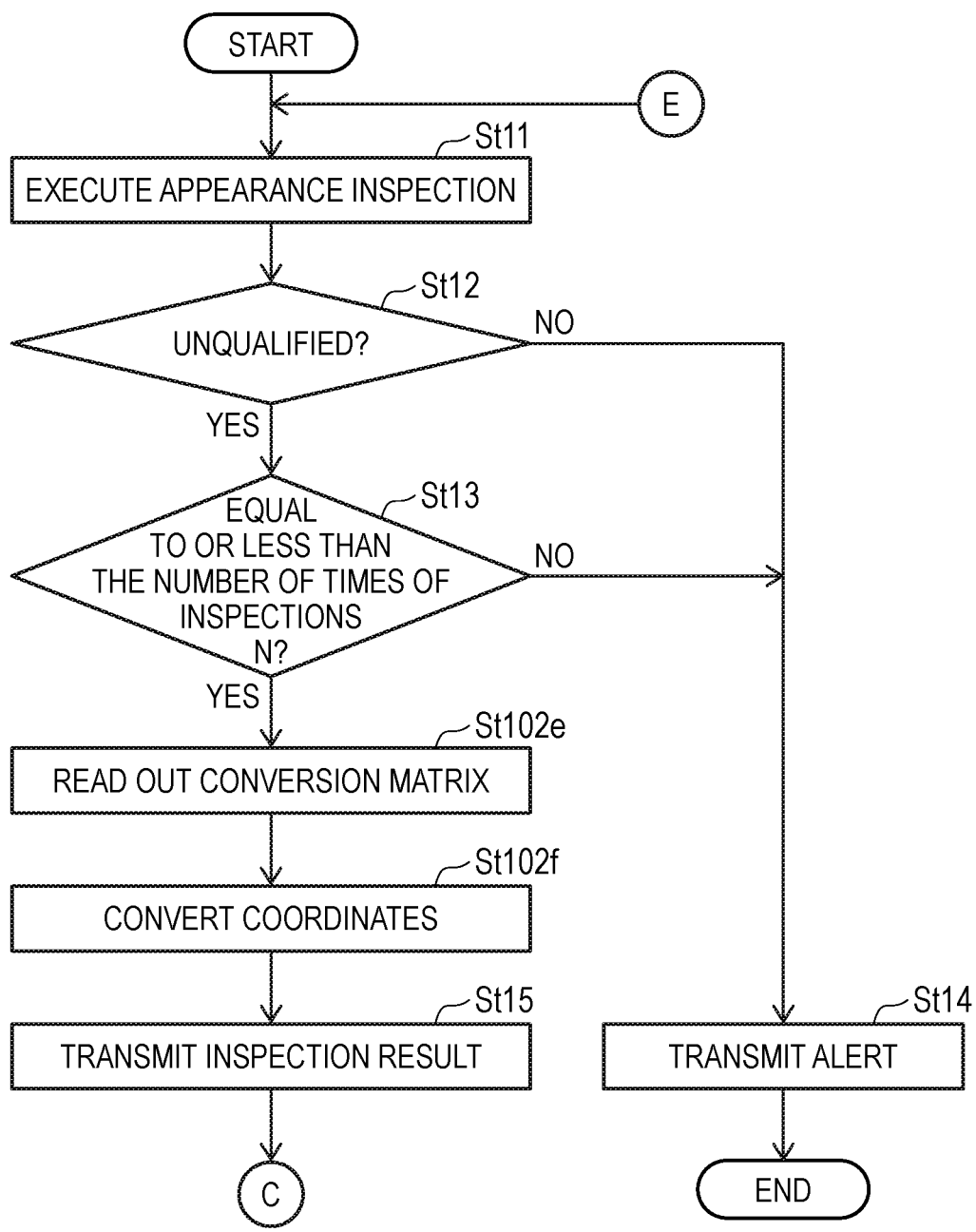
FIG. 17A is a flowchart showing an example of an operation procedure of an inspection control device and an inspection device according to the first modification of the third embodiment.
Figure 17B:
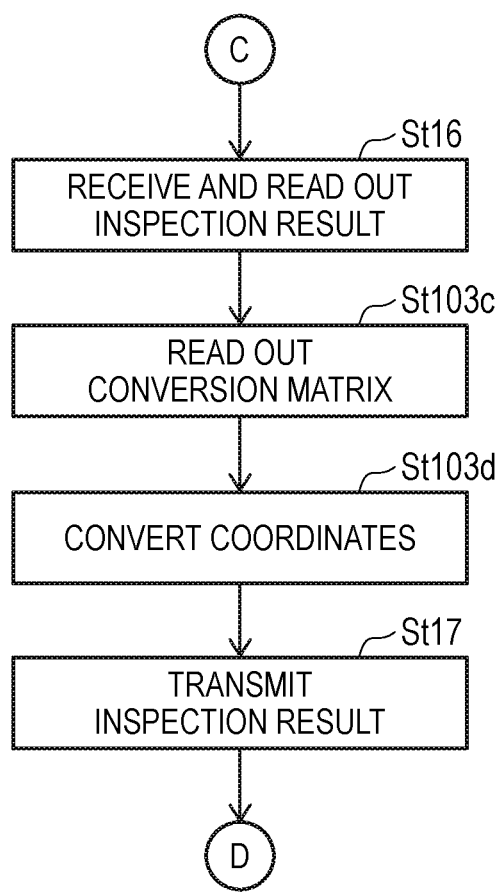
FIG. 17B is a flowchart showing an example of an operation procedure of the upper-level device according to the first modification of the third embodiment.

An example of an operation procedure of the welding system 1000 according to the first modification of the third embodiment will be described with reference to FIGS. 17A and 17B. FIG. 17A is a flowchart showing an example of an operation procedure of the inspection control device 5 and the inspection device 3 according to the first modification of the third embodiment. FIG. 17B is a flowchart showing an example of an operation procedure of the upper-level device 1 according to the first modification of the third embodiment. The flowchart showing an example of an operation procedure of the repair control device 2 according to the first modification of the third embodiment has the same contents as the flowchart shown in FIG. 15C, and thus the illustration and description thereof will be omitted.

First, an example of an operation procedure of the inspection control device 5 and the inspection device 3 will be described. Since processings in step St11 to step St14 in the example of an operation procedure of the inspection control device 5 and the inspection device 3 are the same as those in the example of the operation procedure according to the third embodiment, description thereof will be omitted.

The inspection control device 5 reads out the conversion matrix $S_1$ so as to convert the received position information of a defective portion based on the inspection coordinate system $\Sigma W2$ into the position information of a defective portion based on the workpiece coordinate system $\Sigma Wk2$ (St102e).

The inspection control device 5 converts the position information of a defective portion based on the inspection coordinate system $\Sigma W2$ into the position information of a defective portion based on the workpiece coordinate system $\Sigma Wk2$ by using the conversion matrix $S_1$ that was read out and the (Expression 2) (St102f).

The inspection control device 5 generates an inspection result including the converted position information of a defective portion based on the workpiece coordinate system $\Sigma Wk2$, a defect factor, and the like, and transmits the inspection result to the upper-level device 1 (St15).

As described above, the inspection control device 5 and the inspection device 3 in the welding system 1000 according to the first modification of the third embodiment end the inspection on the welded portion. Next, an example of an operation procedure of the upper-level device 1 will be described.

The upper-level device 1 receives and reads out the inspection result that includes the position information of a defective portion based on the workpiece coordinate system $\Sigma Wk2$, the defect factor, and the like and that is received from the inspection control device 5 (St16).

The upper-level device 1 reads out the plurality of conversion matrices $S_2$ and $S_3$ so as to convert the received position information of a defective portion based on the workpiece coordinate system $\Sigma Wk2$ into the position information of a defective portion based on the repair welding coordinate system $\Sigma W1$ (St103c).

The upper-level device 1 converts the position information of a defective portion based on the workpiece coordinate system $\Sigma Wk2$ into the position information of a defective portion based on the workpiece coordinate system $\Sigma Wk1$ by using the conversion matrix $S_2$ that was read out and the (Expression 3). The upper-level device 1 further converts the position information of a defective portion based on the workpiece coordinate system ΣWk1 into the position information of a defective portion based on the repair welding coordinate system ΣW1 by using the conversion matrix $S_3$ that was read out and the (Expression 4) (St103*d*).

The upper-level device 1 generates an inspection result including the converted position information of a defective portion based on the repair welding coordinate system ΣW1, a defect factor, and the like, and transmits the inspection result to the repair control device 2 (St17).

As described above, the upper-level device 1 in the welding system 1000 according to the third embodiment ends the conversion of the position information of a defective portion.

Accordingly, in an example of an operation procedure shown in the flowcharts in FIGS. 17A and 17B, the welding system 1000 can reduce a processing load required for converting the position information of a defective portion in the inspection control device 5 and a time required for the processing. In the welding system 1000, the inspection and the repair welding can be executed by different robots, and even when each of the robots does not have a coordinate conversion function, the repair welding can be executed by using the upper-level device 1.

Although an example of an operation procedure of the welding system 1000 in a case where the inspection control device 5 converts the position information of a defective portion into the position information of a defective portion based on the workpiece coordinate system ΣWk2 and transmits the converted position information of a defective portion to the upper-level device 1 has been described in the flowcharts shown in FIGS. 17A and 17B, it is needless to say that the present invention is not limited thereto. For example, the inspection control device 5 may convert the position information of a defective portion into the position information of a defective portion based on the workpiece coordinate system ΣWk1 and transmit the converted position information of a defective portion to the upper-level device 1.

Second Modification of Third Embodiment

In the welding system 1000 according to the third embodiment, the upper-level device 1 that controls the repair control device 2 and the inspection control device 5 converts the position information of a defective portion in the inspection coordinate system ΣW2 into the position information of a defective portion in the repair welding coordinate system ΣW1 by the repair control device 2. An example of the welding system 1000 according to a second modification of the third embodiment will be described in which the upper-level device 1 and the repair control device 2 convert the position information of a defective portion.

The welding system 1000 according to the second modification of the third embodiment is not limited to a case where the inspection step and the repair welding step are executed in different steps (that is, the inspection robot MC2 and the repair welding robot MC3 execute processings in different cells), and the inspection robot MC2 and the repair welding robot MC3 may execute processings in the same step.

Figure 18:
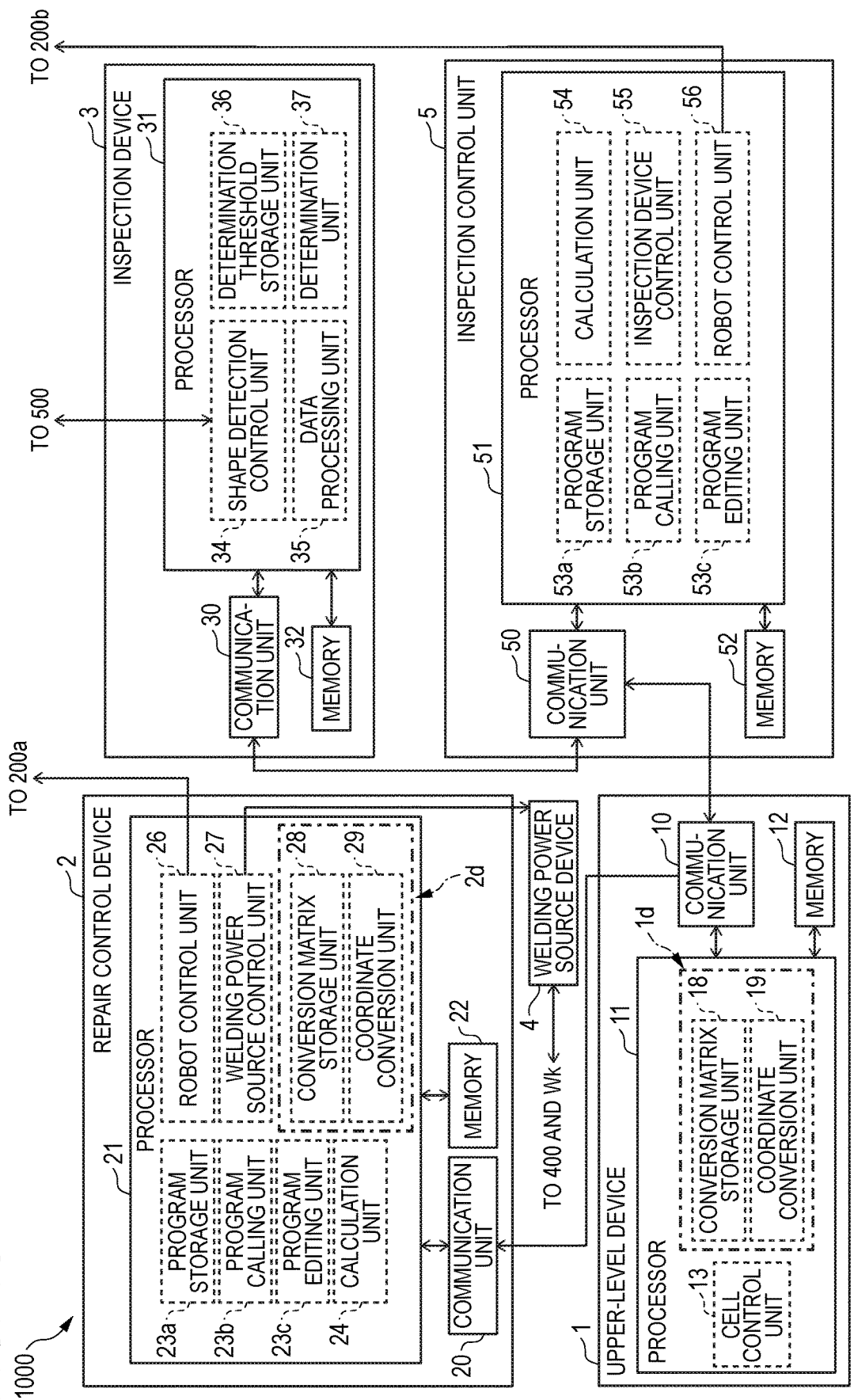
FIG. 18 is a diagram showing an example of an internal configuration of a welding system according to a second modification of the third embodiment.

FIG. 18 is a diagram showing an example of an internal configuration of the welding system 1000 according to the second modification of the third embodiment. Since the internal configuration of the welding system 1000 according to the second modification of the third embodiment is substantially the same as the internal configuration of the welding system 1000 according to the third embodiment and the same components as those in the third embodiment are denoted by the same reference numerals, description thereof will be omitted.

The upper-level device 1 acquires the inspection coordinate system ΣW2 preset in the inspection robot MC2, the workpiece coordinate system ΣWk2 in the inspection step, and the workpiece coordinate system ΣWk1 in the repair welding step, and stores these coordinate systems in the memory 12.

The upper-level device 1 according to the second modification of the third embodiment may not store the workpiece coordinate system ΣWk1. In this case, the upper-level device 1 transmits information about the workpiece coordinate system ΣWk1 to the inspection control device 5, and the repair control device 2 converts the position information of a defective portion from the position information of a defective portion based on the workpiece coordinate system ΣWk2 into the position information of a defective portion based on the workpiece coordinate system ΣWk1.

The conversion unit 1*d* converts the position information of a defective portion based on the inspection coordinate system ΣW2 into the position information of a defective portion based on the workpiece coordinate system ΣWk2 in the inspection step. Further, the conversion unit 1*d* converts the position information of a defective portion based on the workpiece coordinate system ΣWk2 into the position information of a defective portion based on the workpiece coordinate system ΣWk1. The conversion unit 1*d* transmits the converted position information of a defective portion based on the workpiece coordinate system ΣWk1 to the repair control device 2.

When the upper-level device 1 transmits the inspection result including the position information of a defective portion based on the workpiece coordinate system ΣWk2 to the repair control device 2, the conversion unit 1*d* may not convert the position information of a defective portion based on the workpiece coordinate system ΣWk2 into the position information of a defective portion based on the workpiece coordinate system ΣWk1.

The conversion matrix storage unit 18 derives and stores a conversion matrix capable of converting the position information of a defective portion based on the inspection coordinate system ΣW2 into the position information of a defective portion based on the workpiece coordinate system ΣWk2. The conversion matrix storage unit 18 derives and stores a conversion matrix capable of converting the position information of a defective portion based on the workpiece coordinate system ΣWk2 into the position information of a defective portion based on the workpiece coordinate system ΣWk1.

When the upper-level device 1 transmits the inspection result including the position information of a defective portion based on the workpiece coordinate system ΣWk2 to the repair control device 2, the conversion matrix storage unit 18 may not derive and store the conversion matrix capable of converting the position information of a defective portion based on the workpiece coordinate system ΣWk2 into the position information of a defective portion based on the workpiece coordinate system ΣWk1.

The coordinate conversion unit 19 refers to the conversion matrix stored in the conversion matrix storage unit 18, converts the position information of a defective portion based on the workpiece coordinate system ΣWk2 into the position information of a defective portion based on the workpiece coordinate system ΣWk1, and further converts the position information of a defective portion based on the workpiece coordinate system ΣWk1 into the position information of a defective portion based on the repair welding coordinate system ΣW1.

The repair control device 2 stores the repair welding coordinate system ΣW1 preset in the repair welding robot MC3 and the workpiece coordinate system ΣWk1 set for the workpiece Wk2 in the repair welding step. The repair control device 2 transmits information about the workpiece coordinate system ΣWk1 to the upper-level device 1.

The conversion unit 2d converts the position information of a defective portion based on the workpiece coordinate system ΣWk1 in the repair welding step into the position information of a defective portion based on the repair welding coordinate system ΣW1 preset in the repair welding robot MC3. The conversion unit 2d may further convert the position information of a defective portion based on the workpiece coordinate system ΣWk2 in the inspection step into the position information of a defective portion based on the workpiece coordinate system ΣWk1 in the repair welding step. The repair control device 2 generates a repair welding program based on the converted position information of a defective portion, and executes a repair welding.

The conversion matrix storage unit 28 derives and stores a conversion matrix capable of converting the position information of a defective portion based on the workpiece coordinate system ΣWk1 in the repair welding step into the position information of a defective portion based on the repair welding coordinate system ΣW1 preset in the repair welding robot MC3. The conversion matrix storage unit 28 may derive and store a conversion matrix capable of converting the position information of a defective portion based on the workpiece coordinate system ΣWk2 in the inspection step into the position information of a defective portion based on the workpiece coordinate system ΣWk1 in the repair welding step.

The coordinate conversion unit 29 refers to the conversion matrix stored in the conversion matrix storage unit 28, and converts the position information of a defective portion based on the workpiece coordinate system ΣWk1 into the position information of a defective portion based on the repair welding coordinate system ΣW1. The coordinate conversion unit 29 may convert the position information of a defective portion based on the workpiece coordinate system ΣWk2 into the position information of a defective portion based on the workpiece coordinate system ΣWk1.

Figure 19A:
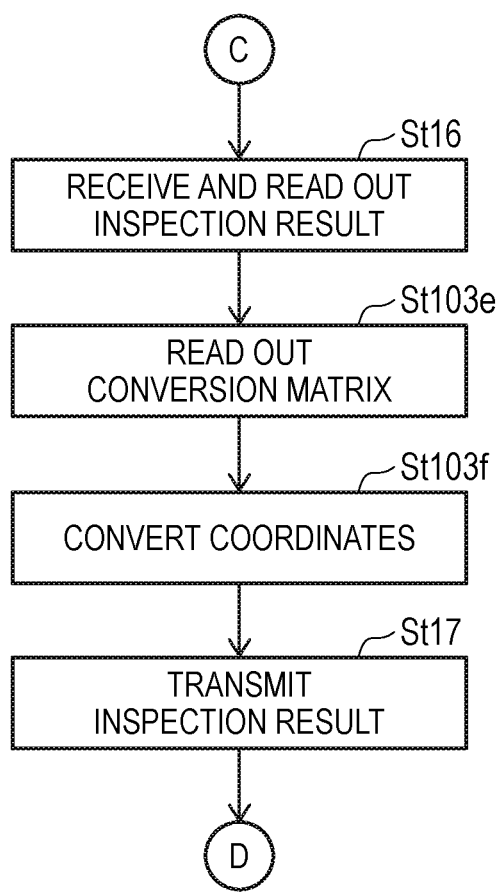
FIG. 19A is a flowchart showing an example of an operation procedure of an upper-level device according to the second modification of the third embodiment.
Figure 19B:
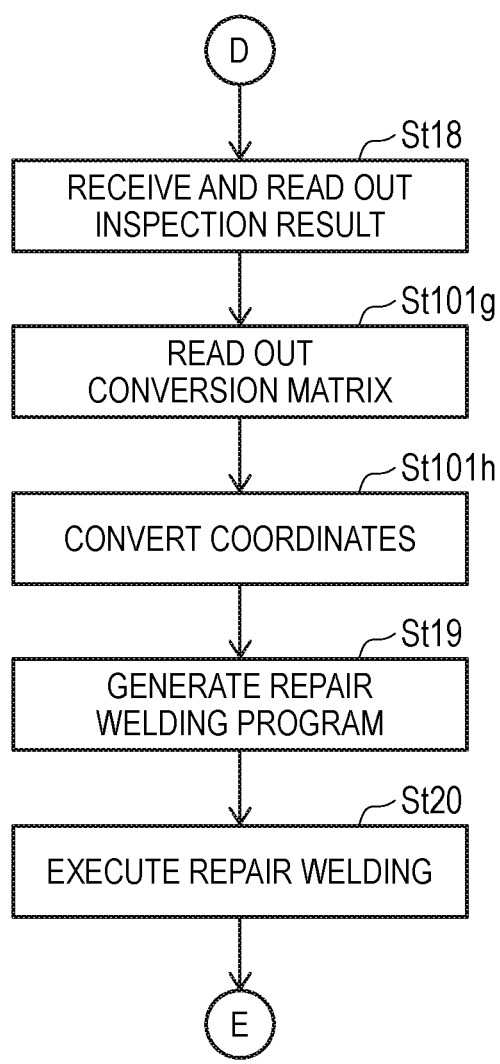
FIG. 19B is a flowchart showing an example of an operation procedure of a repair control device according to the second modification of the third embodiment.

An example of an operation procedure of the welding system 1000 according to the second modification of the third embodiment will be described with reference to FIGS. 19A and 19B. FIG. 19A is a flowchart showing an example of an operation procedure of the upper-level device 1 according to the second modification of the third embodiment. FIG. 19B is a flowchart showing an example of an operation procedure of the repair control device 2 according to the second modification of the third embodiment. The flowchart showing an example of an operation procedure of the inspection control device 5 and the inspection device 3 according to the second modification of the third embodiment has the same contents as the flowchart shown in FIG. 15A, and thus the illustration and description thereof will be omitted.

First, an example of an operation procedure of the upper-level device 1 will be described.

The upper-level device 1 receives and reads out the inspection result that includes the position information of a defective portion based on the inspection coordinate system ΣW2, the defect factor, and the like and that is received from the inspection control device 5 (St16).

The upper-level device 1 reads out the plurality of conversion matrices $S_1$ and $S_2$ so as to convert the received position information of a defective portion based on the inspection coordinate system ΣW2 into the position information of a defective portion based on the workpiece coordinate system ΣWk1 (St103e).

The upper-level device 1 converts the position information of a defective portion based on the inspection coordinate system ΣW2 into the position information of a defective portion based on the workpiece coordinate system ΣWk2 by using the conversion matrix $S_1$ that was read out and the (Expression 2). The upper-level device 1 further converts the position information of a defective portion based on the workpiece coordinate system ΣWk2 into the position information of a defective portion based on the workpiece coordinate system ΣWk1 by using the conversion matrix $S_2$ that was read out and the (Expression 3) (St103f).

The upper-level device 1 generates an inspection result including the converted position information of a defective portion based on the repair welding coordinate system ΣW1, a defect factor, and the like, and transmits the inspection result to the repair control device 2 (St17).

As described above, the upper-level device 1 in the welding system 1000 according to the second modification of the third embodiment ends the conversion of the position information of a defective portion. Next, an example of an operation procedure of the repair control device 2 will be described.

The repair control device 2 receives and reads out the inspection result including the position information of a defective portion based on the workpiece coordinate system ΣWk1 converted by the upper-level device 1, the defect factor, and the like (St18).

The repair control device 2 reads out the conversion matrix $S_3$ so as to convert the received position information of a defective portion based on the workpiece coordinate system ΣWk1 into the position information of a defective portion based on the repair welding coordinate system ΣW1 (St101g).

The repair control device 2 converts the position information of a defective portion based on the workpiece coordinate system ΣWk1 into the position information of a defective portion based on the repair welding coordinate system ΣW1 by using the conversion matrix $S_3$ that was read out and the (Expression 4) (St101h).

The repair control device 2 calls and edits a repair welding program based on the inspection result including the converted position information of a defective portion, the defect factor, and the like, and generates the repair welding program corresponding to the defective portion (St19).

The repair control device 2 controls the manipulator 200a, the wire feeding device 300, and the welding power source device 4 based on the generated repair welding program (St20).

As described above, the repair control device 2 in the welding system 1000 according to the second modification of the third embodiment ends the repair welding on the defective portion.

Accordingly, in an example of an operation procedure shown in the flowcharts in FIGS. 19A and 19B, the welding system 1000 can reduce a processing load required for converting the position information of a defective portion in the repair control device 2 and a time required for the processing. In the welding system 1000, the inspection and the repair welding can be executed by different robots, and even when each of the robots does not have a coordinate conversion function, the repair welding can be executed by using the upper-level device 1.

Although an example of an operation procedure of the welding system 1000 in a case where the upper-level device 1 converts the position information of a defective portion into the position information of a defective portion based on the workpiece coordinate system ΣWk1 and transmits the converted position information of a defective portion to the repair control device 2 has been described in the flowcharts shown in FIGS. 19A and 19B, it is needless to say that the present invention is not limited thereto. For example, the upper-level device 1 may convert the position information of a defective portion into the position information of a defective portion based on the workpiece coordinate system ΣWk2 and transmit the converted position information of a defective portion to the repair control device 2. Accordingly, in the welding system 1000, the inspection and the repair welding can be executed by different robots, and even when each of the robots does not have a coordinate conversion function, the repair welding can be executed by using the upper-level device 1.

Third Modification of Third Embodiment

In the welding system 1000 according to the third embodiment, the upper-level device 1 that controls the repair control device 2 and the inspection control device 5 converts the position information of a defective portion in the inspection coordinate system ΣW2 into the position information of a defective portion in the repair welding coordinate system ΣW1 by the repair control device 2. An example of the welding system 1000 according to a third modification of the third embodiment will be described in which the upper-level device 1, the repair control device 2, and the inspection control device 5 convert the position information of a defective portion.

Figure 20:
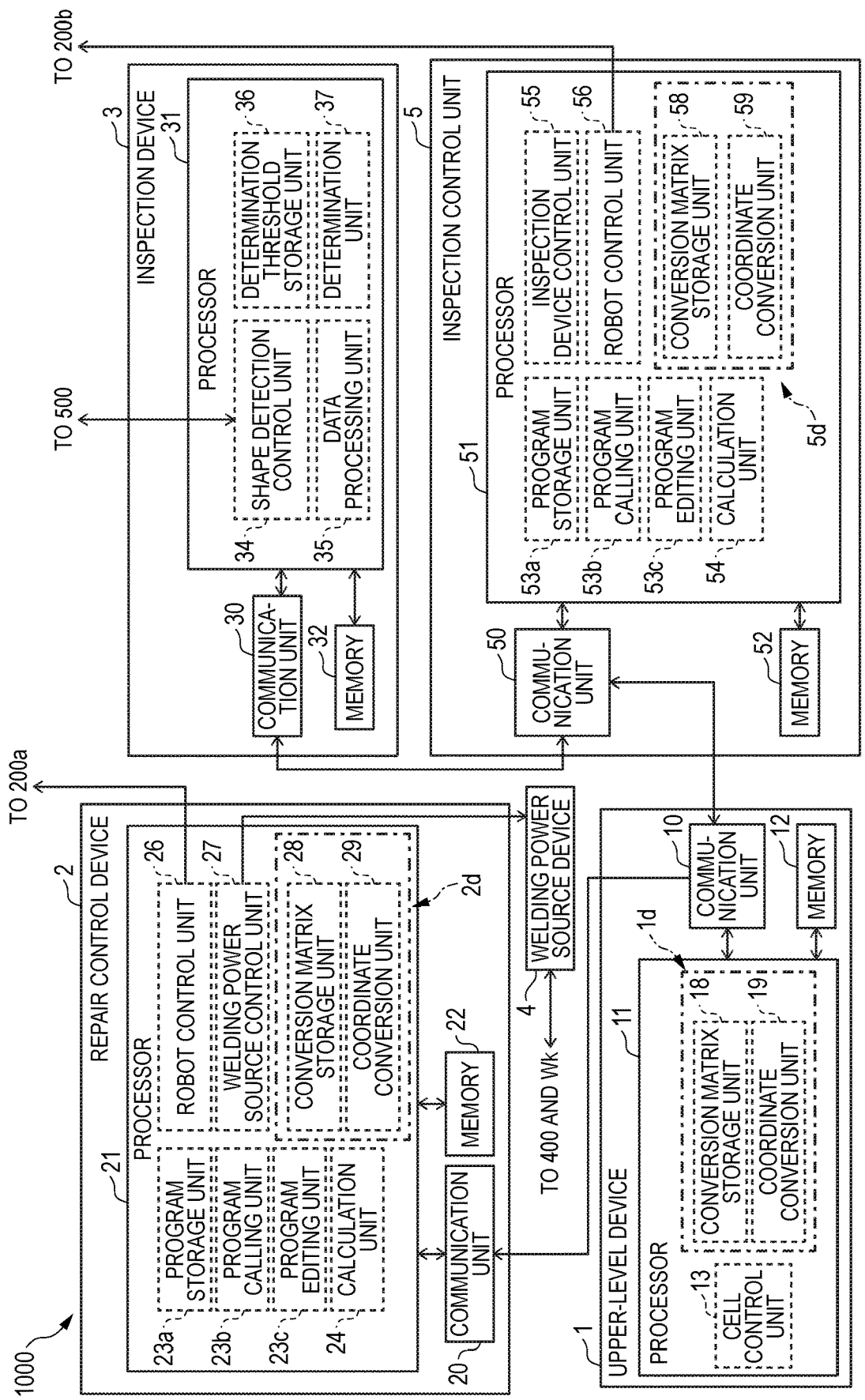
FIG. 20 is a diagram showing an example of an internal configuration of a welding system according to a third modification of the third embodiment.

FIG. 20 is a diagram showing an example of an internal configuration of the welding system 1000 according to the third modification of the third embodiment. Since the internal configuration of the welding system 1000 according to the third modification of the third embodiment is substantially the same as the internal configuration of the welding system 1000 according to the third embodiment and the same components as those in the third embodiment are denoted by the same reference numerals, description thereof will be omitted.

The upper-level device 1 acquires the workpiece coordinate system ΣWk2 in the inspection step and the workpiece coordinate system ΣWk1 in the repair welding step, and stores these coordinate systems in the memory 12.

The conversion unit 1d converts the position information of a defective portion based on the workpiece coordinate system ΣWk2 in the inspection step into the position information of a defective portion based on the workpiece coordinate system ΣWk1 in the repair welding step. The conversion unit 1d transmits the converted position information of a defective portion based on the workpiece coordinate system ΣWk1 to the repair control device 2.

The conversion matrix storage unit 18 derives and stores a conversion matrix capable of converting the position information of a defective portion based on the workpiece coordinate system ΣWk2 into the position information of a defective portion based on the workpiece coordinate system ΣWk1.

The coordinate conversion unit 19 refers to the conversion matrix stored in the conversion matrix storage unit 18, and converts the position information of a defective portion based on the workpiece coordinate system ΣWk2 into the position information of a defective portion based on the workpiece coordinate system ΣWk1.

The repair control device 2 stores the repair welding coordinate system ΣW1 preset in the repair welding robot MC3 and the workpiece coordinate system ΣWk1 set for the workpiece Wk2 in the repair welding step. The repair control device 2 transmits information about the workpiece coordinate system ΣWk1 to the upper-level device 1.

The conversion unit 2d converts the position information of a defective portion based on the workpiece coordinate system ΣWk1 in the repair welding step into the position information of a defective portion based on the repair welding coordinate system ΣW1 preset in the repair welding robot MC3. The repair control device 2 generates a repair welding program based on the converted position information of a defective portion, and executes a repair welding.

The conversion matrix storage unit 28 derives and stores a conversion matrix capable of converting the position information of a defective portion based on the workpiece coordinate system ΣWk1 in the repair welding step into the position information of a defective portion based on the repair welding coordinate system ΣW1 preset in the repair welding robot MC3.

The coordinate conversion unit 29 refers to the conversion matrix stored in the conversion matrix storage unit 28, and converts the position information of a defective portion based on the workpiece coordinate system ΣWk1 into the position information of a defective portion based on the repair welding coordinate system ΣW1.

The inspection control device 5 stores the inspection coordinate system ΣW2 preset in the inspection robot MC2 and the workpiece coordinate system ΣWk2 set for the workpiece Wk2 in the inspection step. The inspection control device 5 transmits information about the workpiece coordinate system ΣWk2 to the upper-level device 1.

The conversion unit 5d converts the position information of a defective portion based on the inspection coordinate system ΣW2 preset in the inspection robot MC2 into the position information of a defective portion based on the workpiece coordinate system ΣWk2 in the inspection step. The inspection control device 5 transmits the inspection result including the converted position information of a defective portion, a defect factor, and the like to the upper-level device 1.

The conversion matrix storage unit 58 derives and stores a conversion matrix capable of converting the position information of a defective portion based on the inspection coordinate system ΣW2 into the position information of a defective portion based on the workpiece coordinate system ΣWk2 in the inspection step.

The coordinate conversion unit 29 refers to the conversion matrix stored in the conversion matrix storage unit 28, and converts the position information of a defective portion based on the inspection coordinate system ΣW2 into the position information of a defective portion based on the workpiece coordinate system ΣWk2 in the inspection step.

Figure 21A:
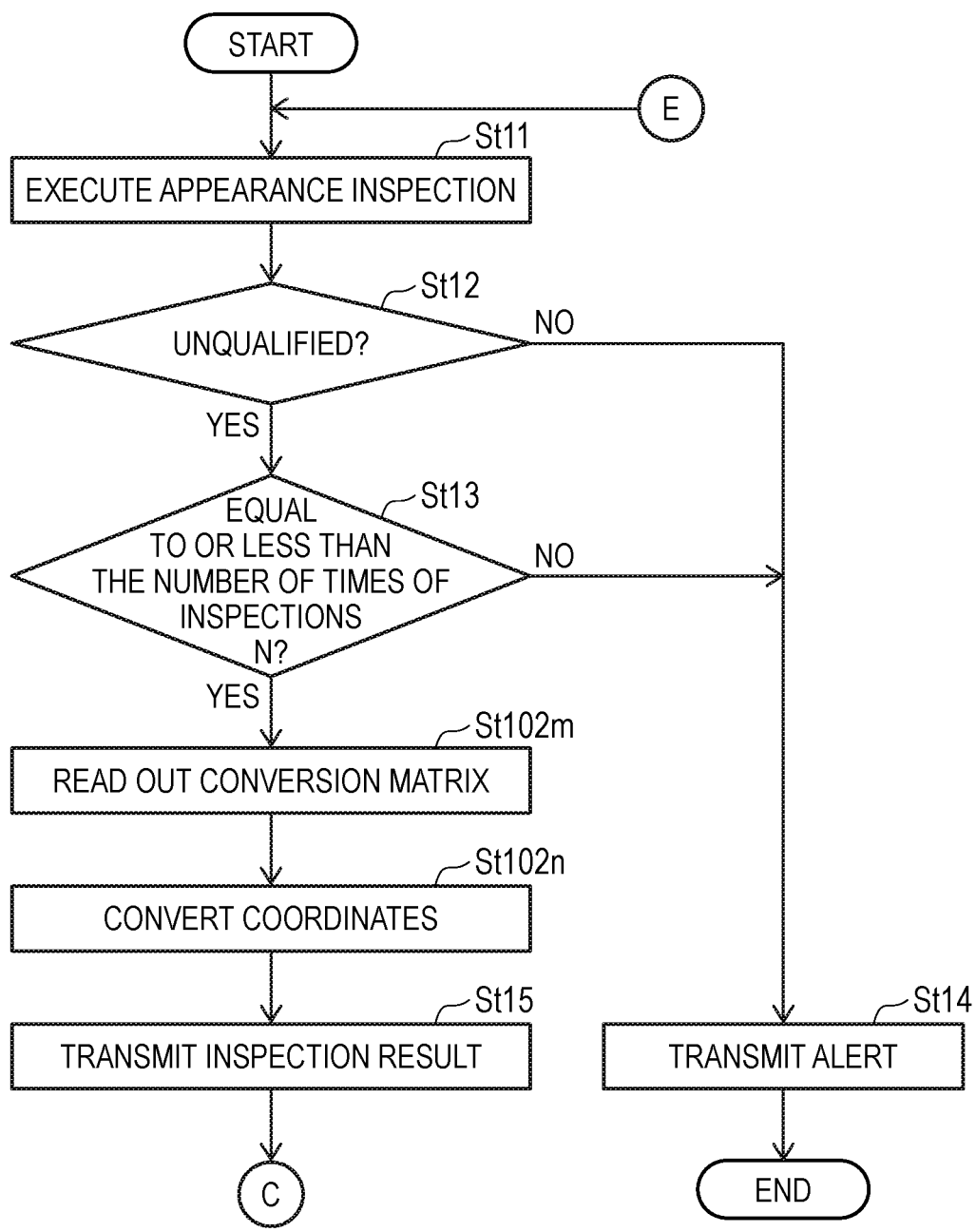
FIG. 21A is a flowchart showing an example of an operation procedure of an inspection control device and an inspection device according to the third modification of the third embodiment.
Figure 21B:
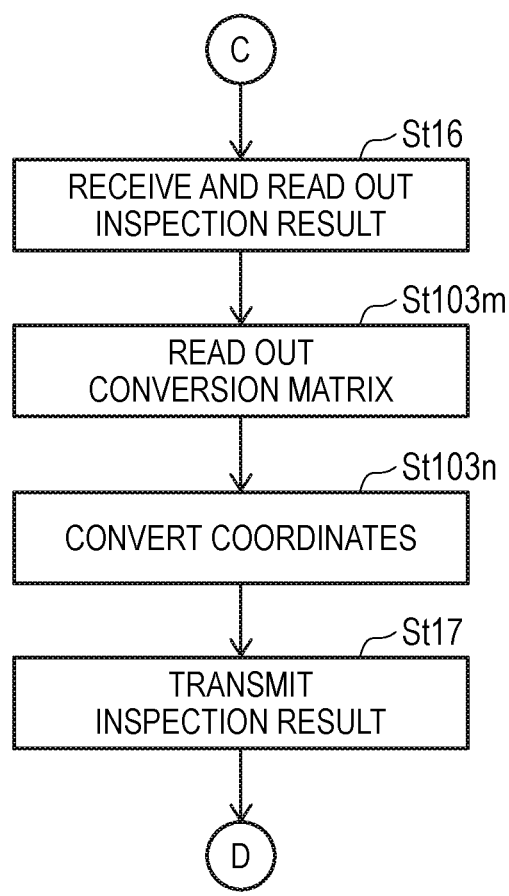
FIG. 21B is a flowchart showing an example of an operation procedure of an upper-level device according to the third modification of the third embodiment.

An example of an operation procedure of the welding system 1000 according to the third modification of the third embodiment will be described with reference to FIGS. 21A and 21B. FIG. 21A is a flowchart showing an example of an operation procedure of the inspection control device 5 and the inspection device 3 according to the third modification of the third embodiment. FIG. 21B is a flowchart showing an example of an operation procedure of the upper-level device 1 according to the third modification of the third embodiment. The flowchart showing an example of an operation procedure of the repair control device 2 according to the third modification of the third embodiment has the same contents as the flowchart shown in FIG. 19B, and thus the illustration and description thereof will be omitted.

First, an example of an operation procedure of the inspection control device 5 and the inspection device 3 will be described. Processings in step SW to step St14 in the example of an operation procedure of the inspection control device 5 and the inspection device 3 are the same as those in the example of the operation procedure according to the third embodiment, and description thereof will be omitted.

The inspection control device 5 reads out the conversion matrix $S_1$ so as to convert the received position information of a defective portion based on the inspection coordinate system $\Sigma W2$ into the position information of a defective portion based on the workpiece coordinate system $\Sigma Wk2$ (St102m).

The inspection control device 5 converts the position information of a defective portion based on the inspection coordinate system $\Sigma W2$ into the position information of a defective portion based on the workpiece coordinate system $\Sigma Wk2$ by using the conversion matrix $S_1$ that was read out and the (Expression 2) (St102n).

The inspection control device 5 generates an inspection result including the converted position information of a defective portion based on the workpiece coordinate system $\Sigma Wk2$, a defect factor, and the like, and transmits the inspection result to the upper-level device 1 (St15).

As described above, the inspection control device 5 and the inspection device 3 in the welding system 1000 according to the third modification of the third embodiment end the inspection on the welded portion. Next, an example of an operation procedure of the upper-level device 1 will be described.

The upper-level device 1 receives and reads out the inspection result that includes the position information of a defective portion based on the workpiece coordinate system $\Sigma Wk2$, the defect factor, and the like and that is received from the inspection control device 5(St16).

The upper-level device 1 reads out the conversion matrix $S_2$ so as to convert the received position information of a defective portion based on the workpiece coordinate system $\Sigma Wk2$ into the position information of a defective portion based on the workpiece coordinate system $\Sigma Wk1$ (St103m).

The upper-level device 1 converts the position information of a defective portion based on the workpiece coordinate system $\Sigma Wk2$ into the position information of a defective portion based on the workpiece coordinate system $\Sigma Wk1$ by using the conversion matrix $S_2$ that was read out and the (Expression 3) (St103n).

The upper-level device 1 generates an inspection result including the converted position information of a defective portion based on the workpiece coordinate system $\Sigma Wk1$, a defect factor, and the like, and transmits the inspection result to the repair control device 2 (St17).

As described above, the upper-level device 1 in the welding system 1000 according to the third modification of the third embodiment ends the conversion of the position information of a defective portion.

Accordingly, in the operation procedure shown in FIGS. 21A and 21B, the inspection and the repair welding can be executed by different robots in the welding system 1000, and even when each of the robots does not have a coordinate conversion function, the repair welding can be executed by using the upper-level device 1.

Although the embodiments have been described above, the plurality of conversion units 1d, 2d, and 5d are not limited to the conversion of the position information of a defective portion, and may convert other position information (for example, position information related to a start position and an end position of an offset amount at the time of a repair welding).

In the embodiments described above, the plurality of conversion matrices $S_1$, $S_2$, and $S_3$ may be two conversion matrices including the conversion matrix $S_1$ for converting the inspection coordinate system $\Sigma W2$ into the workpiece coordinate system $\Sigma Wk$ and the conversion matrix $S_2$ for converting the workpiece coordinate system $\Sigma Wk$ into the repair welding coordinate system $\Sigma W1$. The workpiece coordinate system $\Sigma Wk$ here indicates a coordinate system after executing a conversion from the workpiece coordinate system $\Sigma Wk2$ in the inspection step to the workpiece coordinate system $\Sigma Wk1$ in the repair welding step. In such a case, for example, the conversion from the workpiece coordinate system $\Sigma Wk2$ in the inspection step to the workpiece coordinate system $\Sigma Wk1$ in the repair welding step may be executed in one device (for example, the upper-level device 1, the repair control device 2, and the inspection control device 5).

Although the inspection control device 5 and the inspection device 3 in the embodiments described above are shown and described as separate bodies, the inspection control device 5 may have a configuration and a function of the inspection device 3.

As described above, an inspection device (an example of the inspection control device 5 and the inspection device 3) in the welding system 1000 according to the first embodiment and the first modification of the first embodiment is an inspection device that is connected to the inspection robot MC2 and inspects welded portions of a workpiece. The inspection device 3 determines whether there is a defective portion in the welded portions, and when it is determined that there is a defective portion, the inspection device 3 extracts at least defect type information of the defective portion and inspection coordinate system defective portion position information that is position information of the defective portion based on the inspection coordinate system $\Sigma W2$ of the inspection robot, converts at least the inspection coordinate system defective portion position information into position information corresponding to the repair welding coordinate system $\Sigma W1$ of the repair welding robot MC3, generates welding coordinate system defective portion position information, and transmits at least the defect type information and the welding coordinate system defective portion position information to the repair control device 2 connected to the repair welding robot MC3.

Accordingly, the inspection device in the welding system 1000 according to the first embodiment and the first modification of the first embodiment can execute an inspection and a repair welding by different robots (that is, the inspection robot MC2 and the repair welding robot MC3), and the repair control device 2 can execute a repair welding without using the position information in the inspection coordinate system $\Sigma W2$ of the inspection robot MC2.

The inspection control device 5 and the inspection device 3 according to the first embodiment have the conversion matrix R serving as an example of a first conversion matrix for converting position information in the inspection coordinate system $\Sigma W2$ of the inspection robot MC2 into corresponding position information in the repair welding coordinate system $\Sigma W1$ of the repair welding robot MC3, and convert the inspection coordinate system defective portion position information into the welding robot coordinate system defective portion position information by using the first conversion matrix. Accordingly, in the welding system 1000 according to the embodiments, an inspection and a repair welding can be executed by different robots (that is, the inspection robot MC2 and the repair welding robot MC3), and the repair control device 2 can execute a repair welding without using the position information in the inspection coordinate system ΣW2 of the inspection robot MC2.

The inspection control device 5 and the inspection device 3 according to the first embodiment and the first modification of the first embodiment repeat the determination (that is, the inspection on the welded portions) until it is determined that there is no defective portion that can be corrected by a repair welding. Accordingly, the welding system 1000 according to the embodiments can execute a repair welding on a defective portion that does not satisfy a predetermined determination standard among the welded portions.

The inspection control device 5 and the inspection device 3 according to the first embodiment and the first modification of the first embodiment count the number of times of determination, and when the counted number of times of determination reaches the predetermined number of times, the inspection control device 5 and the inspection device 3 output an alert for notifying that the defective portion cannot be corrected by a repair welding. Accordingly, when the defective portion that does not satisfy the predetermined determination standard among the welded portions is a defective portion that cannot be corrected by a repair welding, the welding system 1000 according to the embodiments can notify a user of an alert without executing an unnecessary repair welding.

The inspection control device 5 and the inspection device 3 according to the first modification of the first embodiment convert the inspection robot coordinate system defective portion position information into position information corresponding to a workpiece coordinate system, and the repair control device 2 converts the position information corresponding to the workpiece coordinate system into position information corresponding to the repair welding coordinate system ΣW1 of the repair welding robot MC3. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), the repair control device 2 can execute a repair welding without using the position information in the inspection coordinate system ΣW2 of the inspection robot MC2.

The inspection control device 5 and the inspection device 3 according to the first modification of the first embodiment have the conversion matrix $S_1$ serving as an example of a second conversion matrix for converting position information in the inspection coordinate system ΣW2 of the inspection robot MC2 into corresponding position information in the workpiece coordinate system ΣWk2, convert the inspection coordinate system defective portion position information into position information of a defective portion corresponding to a workpiece coordinate system by using the second conversion matrix, and transmit the converted position information to the repair control device 2. The repair control device 2 has the conversion matrix $S_3$ serving as an example of a third conversion matrix for converting position information in the workpiece coordinate system ΣWk1 into corresponding position information in the repair welding coordinate system ΣW1 of the repair welding robot MC3, and converts the position information of a defective portion transmitted from the inspection control device 5 into position information of a defective portion corresponding to the repair welding coordinate system ΣW1 of the repair welding robot MC3 by using the third conversion matrix. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), the repair control device 2 can execute a repair welding without using the position information in the inspection coordinate system ΣW2 of the inspection robot MC2.

As described above, the repair control device 2 in the welding system 1000 according to the second embodiment and the first modification of the first embodiment is connected to the repair welding robot MC3 and instructs the execution of a repair welding on a workpiece based on an inspection result of the inspection device (that is, the inspection control device 5 and the inspection device 3). The repair control device 2 receives at least the defect type information of the defective portion and the inspection coordinate system defective portion position information that is position information of the defective portion based on the inspection coordinate system ΣW2 of the inspection robot MC2 from the inspection device connected to the inspection robot MC2, converts at least the inspection coordinate system defective portion position information into position information corresponding to the repair welding coordinate system ΣW1 of the repair welding robot MC3, generates welding coordinate system defective portion position information, and instructs the execution of a repair welding on the defective portion based on at least the defect type information and the welding coordinate system defective portion position information.

Accordingly, the repair control device 2 in the welding system 1000 according to the second embodiment and the first modification of the first embodiment can execute an inspection and a repair welding by different robots (that is, the inspection robot MC2 and the repair welding robot MC3), and can execute a repair welding even when the inspection device (that is, the inspection control device 5 and the inspection device 3) does not convert position information into the position information in the repair welding coordinate system ΣW1 of the repair welding robot MC3.

The repair control device 2 according to the second embodiment has the conversion matrix R serving as an example of a first conversion matrix for converting position information in the inspection coordinate system ΣW2 of the inspection robot MC2 into corresponding position information in the repair welding coordinate system ΣW1 of the repair welding robot MC3, and converts the inspection coordinate system defective portion position information into the welding coordinate system defective portion position information by using the first conversion matrix. Accordingly, in the welding system 1000 according to the embodiment, the inspection and the repair welding can be executed by different robots (that is, the inspection robot MC2 and the repair welding robot MC3), and a repair welding can be executed even when the inspection device (that is, the inspection control device 5 and the inspection device 3) does not convert position information into position information in the repair welding coordinate system $\Sigma W1$ of the repair welding robot MC3.

The inspection control device 5 and the inspection device 3 according to the second embodiment repeat the determination (that is, an inspection on the welded portions) until it is determined that there is no defective portion that can be corrected by a repair welding. Accordingly, the welding system 1000 according to the embodiments can automatically execute a repair welding on a defective portion that does not satisfy a predetermined determination standard among the welded portions.

The inspection control device 5 and the inspection device 2 according to the second embodiment count the number of times of determination, and when the counted number of times of determination reaches the predetermined number of times, the inspection control device 5 and the inspection device 3 output an alert for notifying that the defective portion cannot be corrected by a repair welding. As a result, when the defective portion that does not satisfy the predetermined determination standard among the welded portions is a defective portion that cannot be corrected by a repair welding, the welding system 1000 according to the embodiments can notify a user of the defective portion without executing an unnecessary repair welding.

The inspection control device 5 and the inspection device 3 according to the first modification of the first embodiment convert the inspection coordinate system defective portion position information into position information corresponding to a workpiece coordinate system, and the repair control device 2 converts the position information corresponding to the workpiece coordinate system into position information corresponding to the repair welding coordinate system $\Sigma W1$ of the repair welding robot MC3. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), a repair welding can be executed even when the inspection device (that is, the inspection control device 5 and the inspection device 3) does not convert position information into position information in the repair welding coordinate system $\Sigma W1$ of the repair welding robot MC3.

The inspection control device 5 and the inspection device 3 according to the first modification of the first embodiment have the conversion matrix $S_1$ serving as an example of a second conversion matrix for converting position information in the inspection coordinate system $\Sigma W2$ of the inspection robot MC2 into corresponding position information in the workpiece coordinate system $\Sigma Wk2$, convert inspection coordinate system defective portion position information into position information of a defective portion corresponding to a workpiece coordinate system by using the second conversion matrix, and transmit the converted position information to the repair control device 2. The repair control device 2 has the conversion matrix $S_3$ serving as an example of a third conversion matrix for converting position information in the workpiece coordinate system $\Sigma Wk1$ into corresponding position information in the repair welding coordinate system $\Sigma W1$ of the repair welding robot MC3, and converts the position information of a defective portion transmitted from the inspection control device 5 into position information of a defective portion corresponding to the repair welding coordinate system $\Sigma W1$ of the repair welding robot MC3 by using the third conversion matrix. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), a repair welding can be executed even when the inspection device (that is, the inspection control device 5 and the inspection device 3) does not convert position information into position information in the repair welding coordinate system $\Sigma W1$ of the repair welding robot MC3.

As described above, the upper-level device 1 in the welding system 1000 according to the third embodiment is connected to an inspection device (that is, the inspection control device 5 and the inspection device 3) that is connected to the inspection robot MC2 and inspects a welded portion of a workpiece, and is connected to the repair control device 2 connected to the repair welding robot MC3. The upper-level device 1 acquires an inspection result of the inspection device, and notifies the repair control device 2 of the inspection result. The upper-level device 1 receives, from the inspection device, at least defect type information of a defective portion and inspection coordinate system defective portion position information that is position information of a defective portion based on the inspection coordinate system $\Sigma W2$ of the inspection robot MC2, converts at least the inspection coordinate system defective portion position information into position information corresponding to the repair welding coordinate system $\Sigma W1$ of the repair welding robot MC3, generates welding coordinate system defective portion position information, and transmits at least the defect type information and the welding coordinate system defective portion position information to the repair control device 2.

Accordingly, the upper-level device 1 in the welding system 1000 according to the third embodiment can execute an inspection and a repair welding by different robots (that is, the inspection robot MC2 and the repair welding robot MC3), and a repair welding can be executed by using the upper-level device 1 even when each of the robots does not have a coordinate conversion function.

The upper-level device 1 according to the third embodiment has the conversion matrix R serving as an example of a first conversion matrix for converting position information in the inspection coordinate system $\Sigma W2$ of the inspection robot MC2 into corresponding position information in the repair welding coordinate system $\Sigma W1$ of the repair welding robot MC3, and converts the inspection coordinate system defective portion position information into the welding coordinate system defective portion position information by using the first conversion matrix. Accordingly, the welding system 1000 according to the embodiment can execute an inspection and a repair welding by different robots (that is, the inspection robot MC2 and the repair welding robot MC3), and a repair welding can be executed by using the upper-level device 1 even when each of the robots does not have a coordinate conversion function.

The upper-level device 1 according to the third embodiment converts the inspection coordinate system defective portion position information into position information corresponding to a workpiece coordinate system, and the repair control device 2 converts the position information corresponding to the workpiece coordinate system into position information corresponding to the repair welding coordinate system ΣW1 of the repair welding robot MC3. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), a repair welding can be executed by using the upper-level device 1 even when each of the robots does not have a coordinate conversion function.

The upper-level device 1 according to the third embodiment repeats the determination (that is, an inspection on the welded portions) until it is determined that there is no defective portion that can be corrected by a repair welding. Accordingly, the welding system 1000 according to the embodiments can automatically execute a repair welding on a defective portion that does not satisfy a predetermined determination standard among the welded portions.

The inspection control device 5 and the inspection device 3 according to the third embodiment count the number of times of determination, and when the counted number of times of determination reaches the predetermined number of times, the inspection control device 5 and the inspection device 3 output an alert for notifying that the defective portion cannot be corrected by a repair welding. As a result, when the defective portion that does not satisfy the predetermined determination standard among the welded portions is a defective portion that cannot be corrected by a repair welding, the welding system 1000 according to the embodiment can notify a user of the defective portion without executing an unnecessary repair welding.

The upper-level device 1 according to the third embodiment has the conversion matrix $S_1$ serving as an example of a second conversion matrix for converting the acquired position information in the inspection coordinate system ΣW2 of the inspection robot MC2 into corresponding position information in the workpiece coordinate system ΣWk2, and converts the inspection coordinate system defective portion position information into the welding coordinate system defective portion position information by using the second conversion matrix. The upper-level device 1 has the conversion matrix $S_2$ serving as an example of a third conversion matrix for converting converted position information of a workpiece in an inspection into corresponding position information in the workpiece coordinate system ΣWk1 in a repair welding, and converts the position information of a defective portion into position information of a defective portion corresponding to the workpiece coordinate system ΣWk1 in a repair welding by using the third conversion matrix. The upper-level device 1 has the conversion matrix $S_3$ serving as an example of a fourth conversion matrix for converting position information in the workpiece coordinate system ΣWk1 in a repair welding into corresponding position information in the repair welding coordinate system ΣW1 of the repair welding robot MC3, converts position information of a defective portion into the welding robot coordinate system defective portion position information by using the fourth conversion matrix, and transmits the converted position information to the repair control device 2. Accordingly, in the welding system 1000 according to the embodiment, as an example in which the inspection and the repair welding are executed by different robots (that is, the inspection robot MC2 and the repair welding robot MC3) and the position information is converted by the inspection control device 5 and the repair control device 2, when the inspection step and the repair welding step are executed in different steps (that is, the inspection robot MC2 and the repair welding robot MC3 execute processings in different cells), a repair welding can be executed by using the upper-level device 1 even when each of the robots does not have a coordinate conversion function.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that such changes and the like also belong to the technical scope of the present disclosure. Components in the embodiments described above may be combined freely within a range not departing from the spirit of the invention.

The present disclosure is useful as a repair welding system that can execute an inspection and a repair welding by different robots and a welding device can execute a repair welding without using position information in an inspection robot coordinate system.

What is claimed is:

1. A repair welding system comprising:
   an inspection device configured to be connected to an inspection robot and configured to inspect a welded portion of a workpiece; and
   a welding device configured to be connected to a welding robot and configured to instruct execution of a repair welding on the workpiece based on an inspection result of the inspection device,
   wherein the inspection device determines whether there is a defective portion that does not satisfy a determination standard in the welded portion,
   wherein in a case that there is the defective portion in the welded portion, the inspection device
     extracts at least defect type information of the defective portion and inspection coordinate system defective portion position information that is position information of the defective portion based on a coordinate system of the inspection robot,
     converts at least the inspection coordinate system defective portion position information into position information corresponding to a coordinate system of the welding robot and generates welding coordinate system defective portion position information, and
     transmits at least the defect type information and the welding coordinate system defective portion position information to the welding device connected to the welding robot, and
   wherein the welding device instructs execution of a repair welding on the defective portion based on at least the defect type information and the welding coordinate system defective portion position information.

2. The repair welding system according to claim 1,
   wherein the inspection device has a first conversion matrix for converting position information in the coordinate system of the inspection robot into corresponding position information in the coordinate system of the welding robot, and converts the inspection coordinate system defective portion position information into the welding coordinate system defective portion position information by using the first conversion matrix.

3. The repair welding system according to claim 1, wherein the inspection device repeats the determination until it is determined that there is no defective portion that is correctable by the repair welding.

4. The repair welding system according to claim 1, wherein the inspection device counts a number of times of the determination, and when the counted number of times of the determination reaches a predetermined number of times, the inspection device outputs an alert for notifying that it is impossible to correct the defective portion by the repair welding.

5. The repair welding system according to claim 1, wherein the inspection device converts the inspection coordinate system defective portion position information into position information corresponding to a workpiece coordinate system, and
wherein the welding device converts the position information corresponding to the workpiece coordinate system into position information corresponding to the coordinate system of the welding robot.

6. The repair welding system according to claim 5, wherein the inspection device has a second conversion matrix for converting position information in the coordinate system of the inspection robot into corresponding position information in the workpiece coordinate system, converts the inspection coordinate system defective portion position information into the position information of the defective portion corresponding to the workpiece coordinate system by using the second conversion matrix, and transmits the converted position information to the welding device, and
wherein the welding device has a third conversion matrix for converting position information in the workpiece coordinate system into corresponding position information in the coordinate system of the welding robot, and converts the position information of the defective portion transmitted from the inspection device into position information of the defective portion corresponding to the coordinate system of the welding robot by using the third conversion matrix.

7. A repair welding system comprising:
an inspection device configured to be connected to an inspection robot and configured to inspect a welded portion of a workpiece; and
a welding device configured to be connected to a welding robot and configured to instruct execution of a repair welding on the workpiece based on an inspection result of the inspection device,
wherein the inspection device determines whether there is a defective portion that does not satisfy a determination standard in the welded portion,
wherein in a case that there is the defective portion in the welded portion, the inspection device transmits at least defect type information of the defective portion and inspection coordinate system defective portion position information that is position information of the defective portion based on a coordinate system of the inspection robot to the welding device, and
wherein the welding device
converts at least the inspection coordinate system defective portion position information into position information corresponding to a coordinate system of the welding robot and generates welding coordinate system defective portion position information, and instructs execution of a repair welding on the defective portion based on at least the defect type information and the welding coordinate system defective portion position information.

8. The repair welding system according to claim 7, wherein the welding device has a first conversion matrix for converting position information in the coordinate system of the inspection robot into corresponding position information in the coordinate system of the welding robot, and converts the inspection coordinate system defective portion position information into the welding coordinate system defective portion position information by using the first conversion matrix.

9. The repair welding system according to claim 7, wherein the inspection device repeats the determination until it is determined that there is no defective portion that is correctable by the repair welding.

10. The repair welding system according to claim 7, wherein the inspection device counts a number of times of the determination, and when the counted number of times of the determination reaches a predetermined number of times, the inspection device outputs an alert for notifying that it is impossible to correct the defective portion by the repair welding.

11. The repair welding system according to claim 7, wherein the inspection device converts the inspection coordinate system defective portion position information into position information corresponding to a workpiece coordinate system, and
wherein the welding device converts the position information corresponding to the workpiece coordinate system into position information corresponding to the coordinate system of the welding robot.

12. The repair welding system according to claim 11, wherein the inspection device has a second conversion matrix for converting position information in the coordinate system of the inspection robot into corresponding position information in the workpiece coordinate system, converts the inspection coordinate system defective portion position information into the position information of the defective portion corresponding to the workpiece coordinate system by using the second conversion matrix, and transmits the converted position information to the welding device, and
wherein the welding device has a third conversion matrix for converting position information in the workpiece coordinate system into corresponding position information in the coordinate system of the welding robot, and converts the position information of the defective portion transmitted from the inspection device into position information of the defective portion corresponding to the coordinate system of the welding robot by using the third conversion matrix.

13. A repair welding system comprising:
an inspection device configured to be connected to an inspection robot and configured to inspect a welded portion of a workpiece;
a welding device configured to be connected to a welding robot and configured to instruct execution of a repair welding on the workpiece based on an inspection result of the inspection device; and
an integrated control device configured to be connected to the inspection device and the welding device, configured to acquire the inspection result of the inspection device, and configured to notify the welding device of the inspection result, wherein the inspection device determines whether there is a defective portion that does not satisfy a determination standard in the welded portion, wherein in a case that there is the defective portion in the welded portion, the inspection device transmits at least defect type information of the defective portion and inspection coordinate system defective portion position information that is position information of the defective portion based on a coordinate system of the inspection robot to the welding device, wherein the integrated control device
  converts at least the inspection coordinate system defective portion position information into position information corresponding to a coordinate system of the welding robot and generates welding coordinate system defective portion position information, and
  transmits at least the defect type information and the welding coordinate system defective portion position information to the welding device, and wherein the welding device instructs execution of a repair welding on the defective portion based on at least the defect type information and the welding coordinate system defective portion position information.

14. The repair welding system according to claim 13, wherein the integrated control device has a first conversion matrix for converting position information in the coordinate system of the inspection robot into corresponding position information in the coordinate system of the welding robot, and converts the inspection coordinate system defective portion position information into the welding coordinate system defective portion position information by using the first conversion matrix.

15. The repair welding system according to claim 13, wherein the inspection device repeats the determination until it is determined that there is no defective portion that is correctable by the repair welding.

16. The repair welding system according to claim 13, wherein the inspection device counts a number of times of the determination, and when the counted number of times of the determination reaches a predetermined number of times, the inspection device outputs an alert for notifying that it is impossible to correct the defective portion by the repair welding.

17. The repair welding system according to claim 13, wherein the integrated control device
  converts the inspection coordinate system defective portion position information into position information corresponding to a workpiece coordinate system, and
  converts the position information corresponding to the workpiece coordinate system into position information corresponding to the coordinate system of the welding robot.

18. The repair welding system according to claim 17, wherein the integrated control device
  has a second conversion matrix for converting the acquired position information in the coordinate system of the inspection robot into corresponding position information in the workpiece coordinate system in the inspection, and converts the inspection coordinate system defective portion position information into the welding coordinate system defective portion position information by using the second conversion matrix,
  has a third conversion matrix for converting the converted position information in the workpiece coordinate system in the inspection into corresponding position information in the workpiece coordinate system in the repair welding and converts the position information of the defective portion into position information of the defective portion corresponding to the workpiece coordinate system in the repair welding by using the third conversion matrix, and
  has a fourth conversion matrix for converting the converted position information in the workpiece coordinate system in the repair welding into corresponding position information in the coordinate system of the welding robot and converts the position information of the defective portion into the welding coordinate system defective portion position information by using the fourth conversion matrix, and transmits the welding coordinate system defective portion position information to the welding device.

* * * * *